United States Patent [19]

Leonard et al.

[11] 4,347,765
[45] Sep. 7, 1982

[54] MULTIPLE RATIO OVERDRIVE TRANSMISSION

[75] Inventors: Allan S. Leonard; Ralph C. Bolz; Lawrence D. Burcz, all of Livonia, Mich.

[73] Assignee: Ford Motor Company, Dearborn, Mich.

[21] Appl. No.: 82,399

[22] Filed: Oct. 5, 1979

[51] Int. Cl.³ .................... F16H 47/00; B60K 41/22
[52] U.S. Cl. ........................... 74/869; 74/688; 74/752 C; 74/867; 74/763
[58] Field of Search ............... 74/863, 867, 868, 869, 74/DIG. 1, 733, 752 C, 688, 763, 762

[56] References Cited

U.S. PATENT DOCUMENTS

| | | | |
|---|---|---|---|
| 3,000,230 | 9/1961 | Froslie | 74/752 C X |
| 3,314,307 | 4/1967 | Egbert | 74/763 X |
| 3,491,617 | 1/1970 | Konrad | 74/688 |
| 3,497,043 | 2/1970 | Leonard | 74/869 |
| 3,559,669 | 2/1971 | Dach | 74/763 X |
| 3,656,373 | 4/1972 | Shimosaki | 74/869 |
| 3,670,599 | 6/1972 | Nagamatsu | 74/869 |
| 4,008,630 | 2/1977 | Murakami et al. | 74/869 X |
| 4,090,417 | 5/1978 | Burcz et al. | 74/733 X |
| 4,106,369 | 8/1978 | Taga | 74/869 |
| 4,125,038 | 11/1978 | Hiramatsu | 74/869 |

*Primary Examiner*—Leslie Braun
*Assistant Examiner*—Lawrence J. Gotts
*Attorney, Agent, or Firm*—Donald J. Harrington; Keith L. Zerschling

[57] ABSTRACT

A multiple ratio automotive vehicle transmission having a hydrokinetic torque converter and a compound planetary gear unit that establish a plurality of underdrive ratios, a direct drive ratio and an overdrive ratio, the ratio changes from the first underdrive ratio to a second underdrive ratio from the second underdrive ratio to the direct drive ratio each being established by engagement by a single torque establishing device, brake means for controlling application and release of the torque establishing devices to effect transmission of reaction torque from a reaction element of the gearing to a stationary portion of the mechanism, said controlling means being adapted to establish optimum shift points during ratio changes regardless of the magnitude of the torque being delivered at the instant a ratio shift occurs.

36 Claims, 47 Drawing Figures

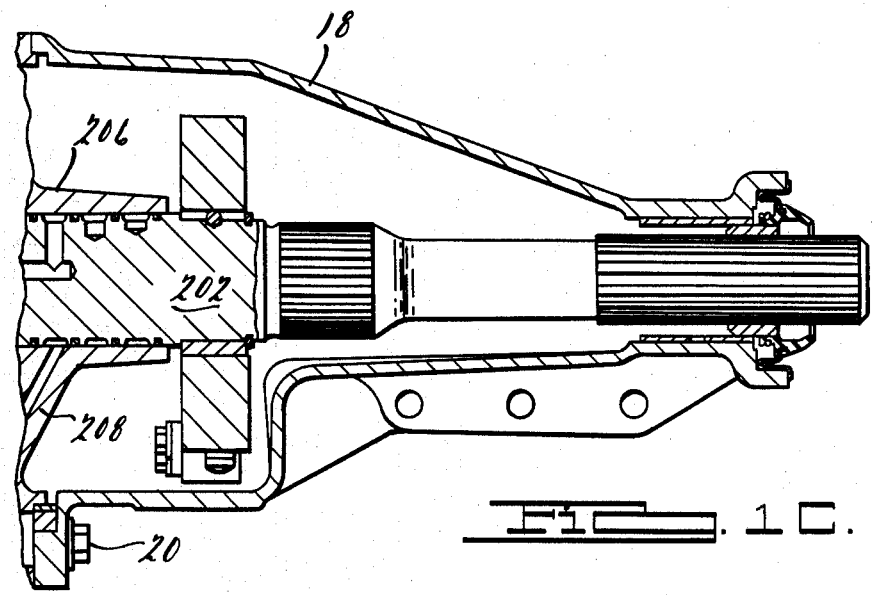
FIG. 1C.
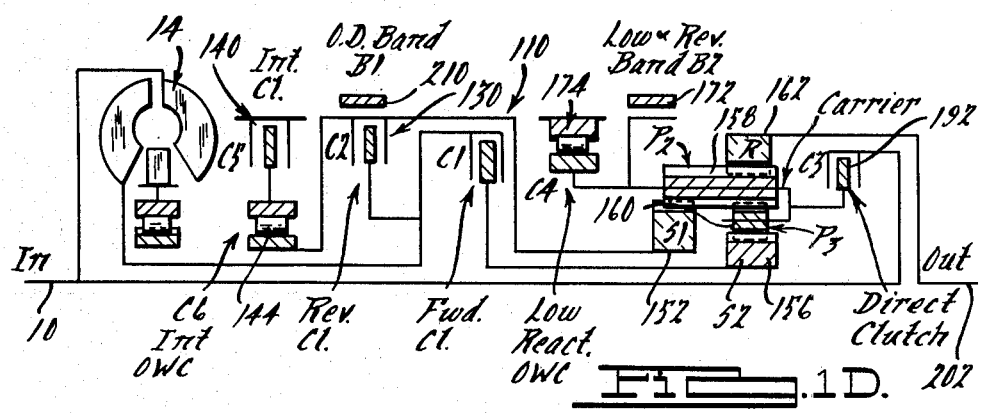
FIG. 1D.
|  |  | B1 | B2 | C1 | C2 | C3 | C4 | C5 | C6 | Ratio |  |
|---|---|---|---|---|---|---|---|---|---|---|---|
| 1st | M |  | × | × |  |  | × |  |  | R2/52 | 2.400 |
|  | D |  |  | × |  |  | × |  |  |  |  |
| 2nd |  |  |  | × |  |  | × | × | × | R(51+52)/52(R+51) | 1.467 |
| 3rd |  |  |  | × | × |  | × |  |  | 1.00 | 1.000 |
| 4th |  | × |  |  | × |  | × |  |  | R/(R+51) | .667 |
| Rev. |  |  | × |  | × |  |  |  |  | R/51 | 2.000 |
FIG. 1E.

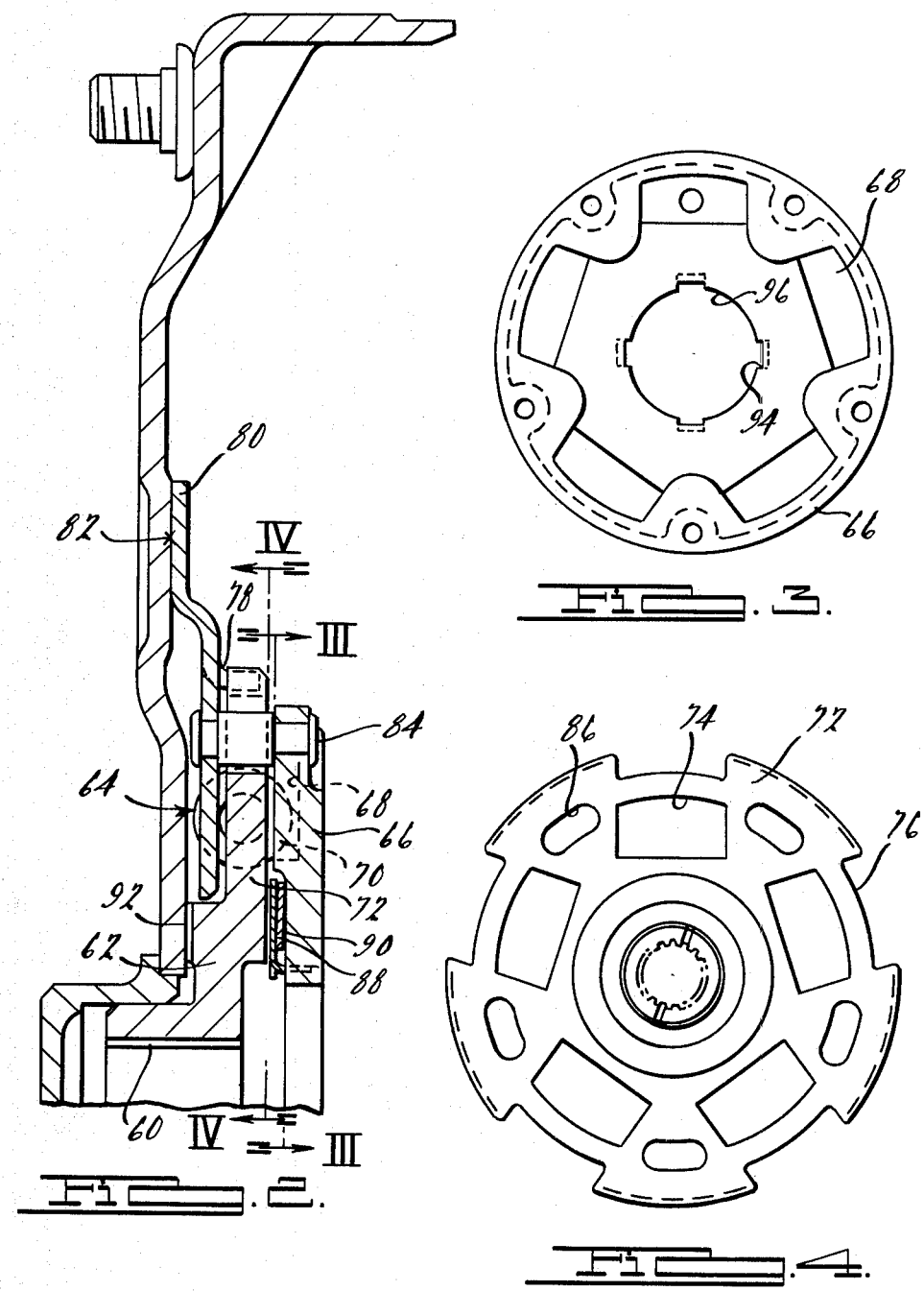

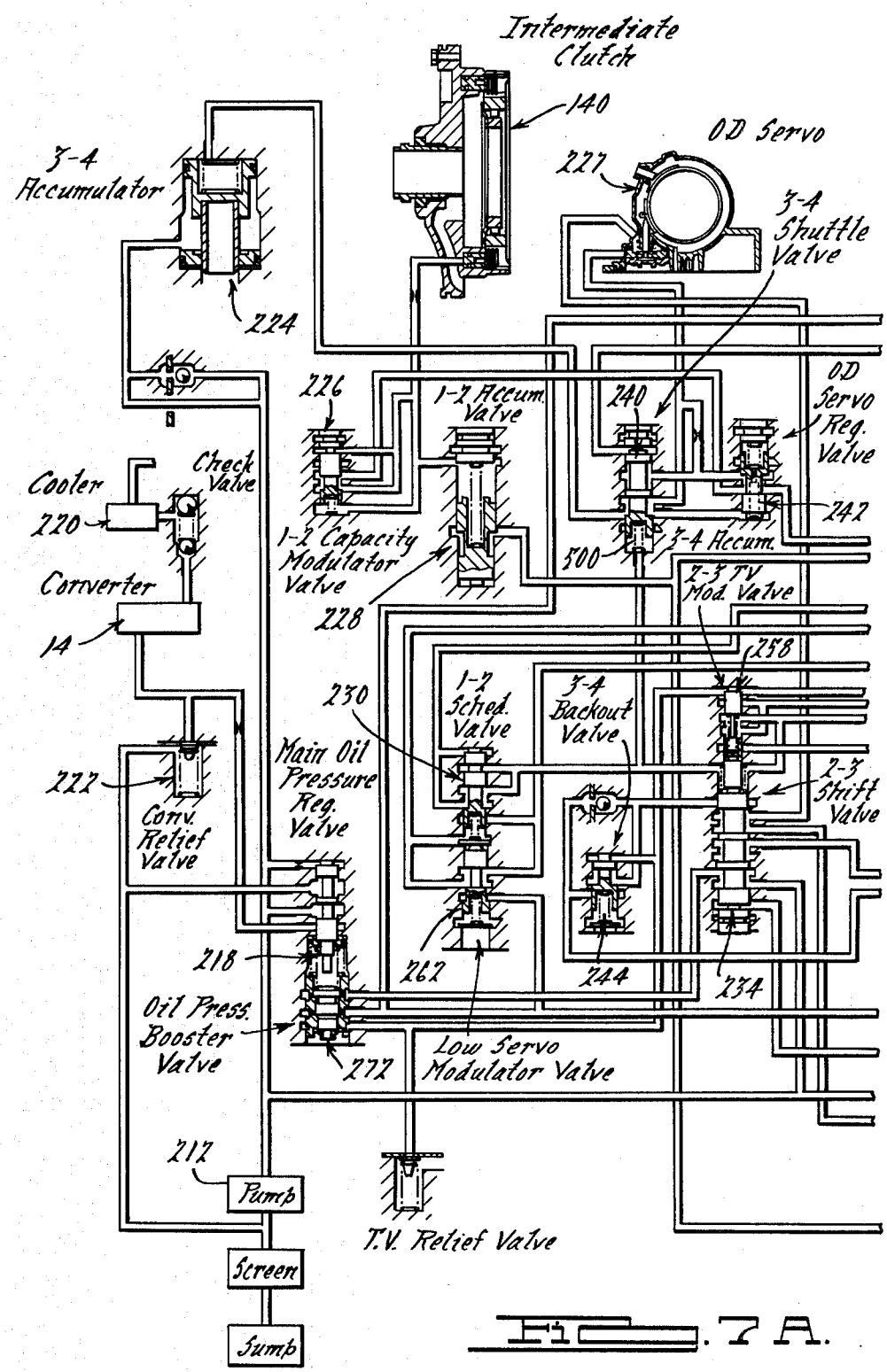

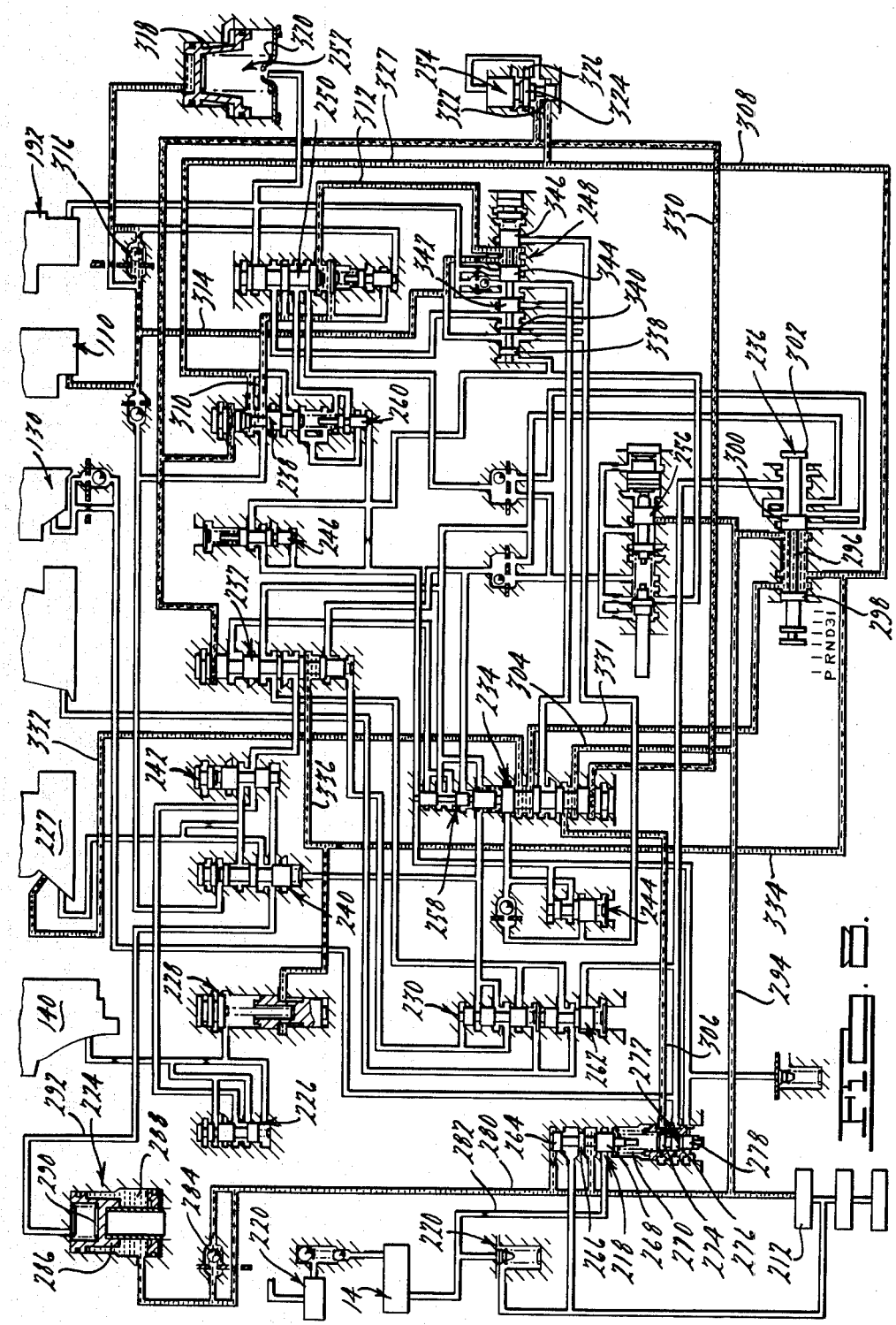

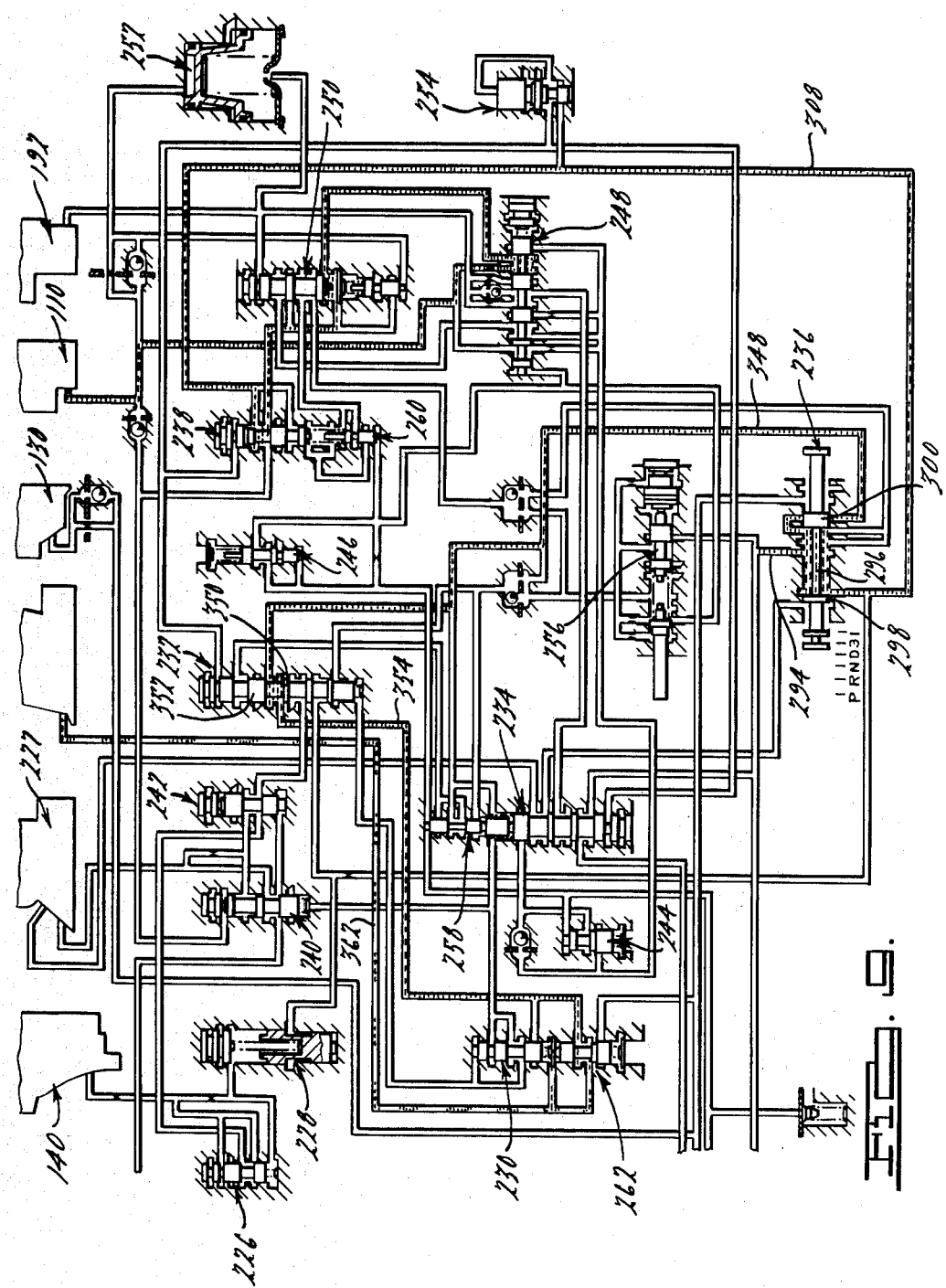

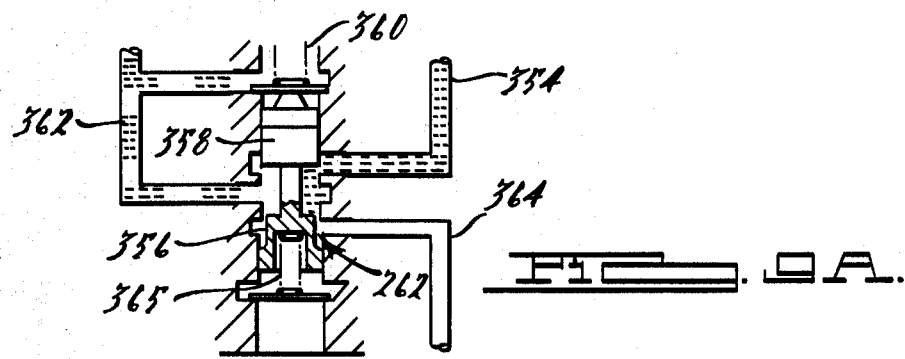
FIG. 9A.
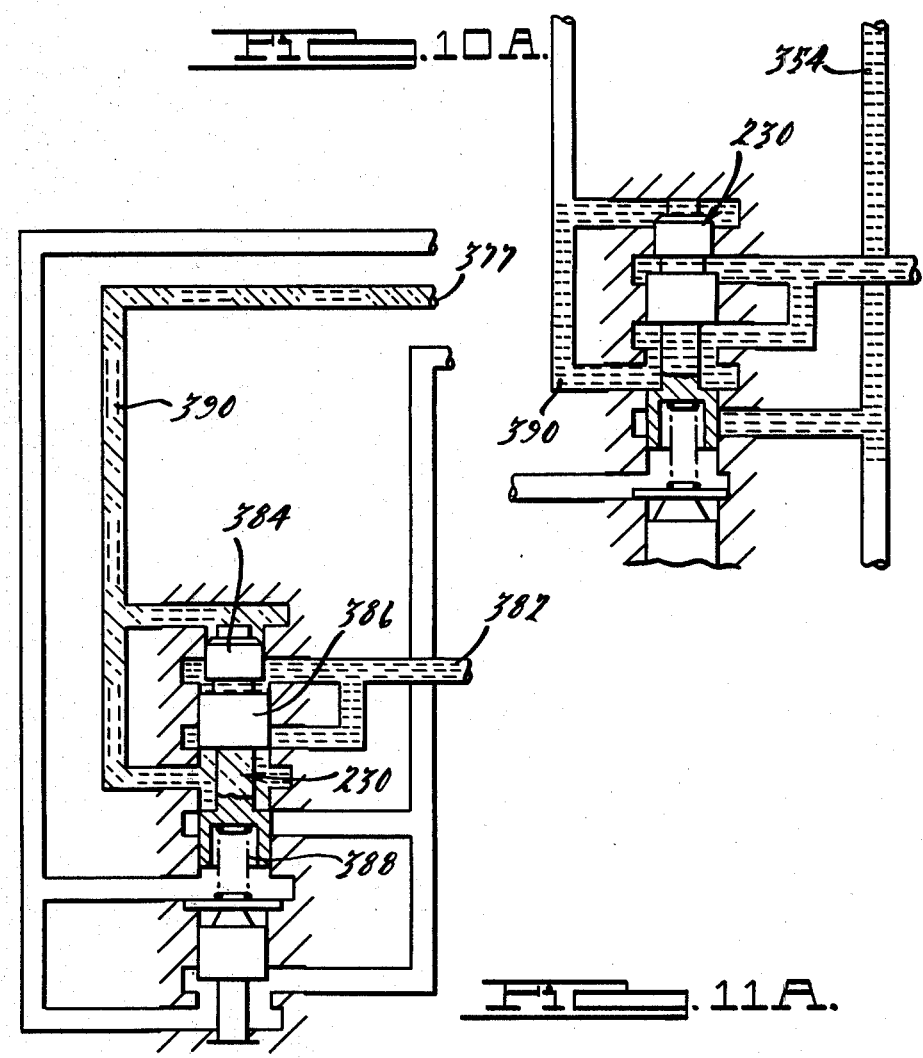
FIG. 10A.
FIG. 11A.

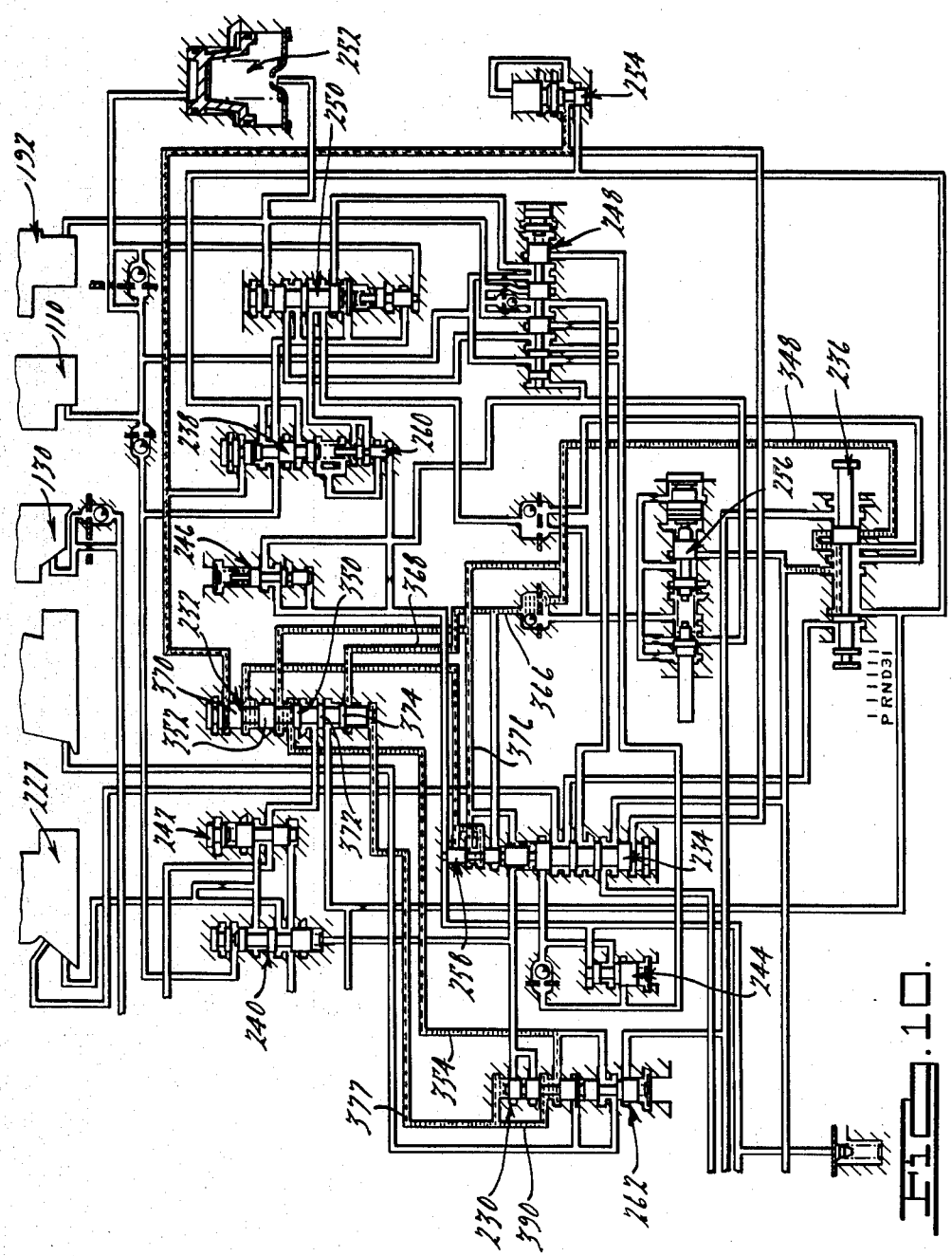

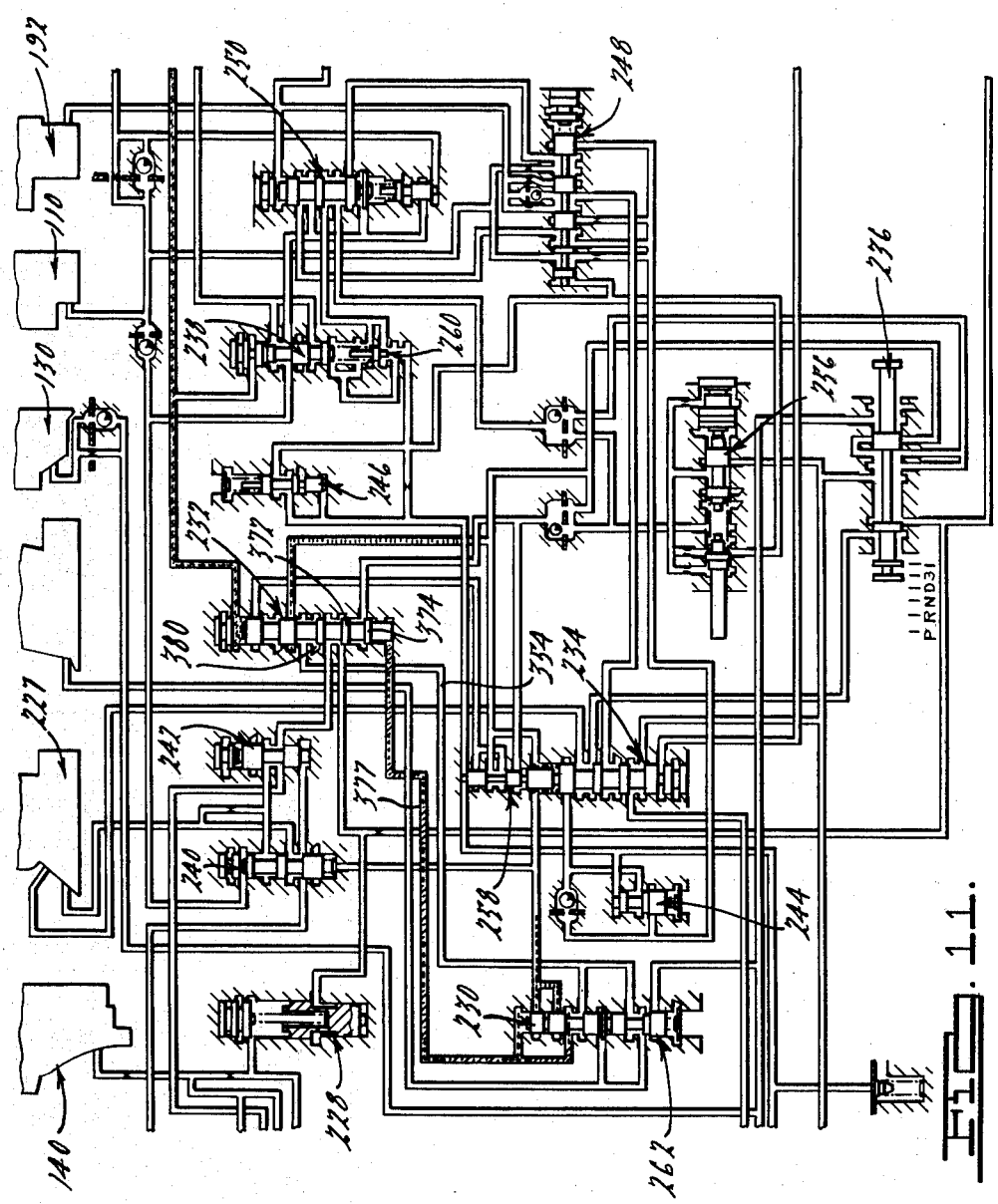

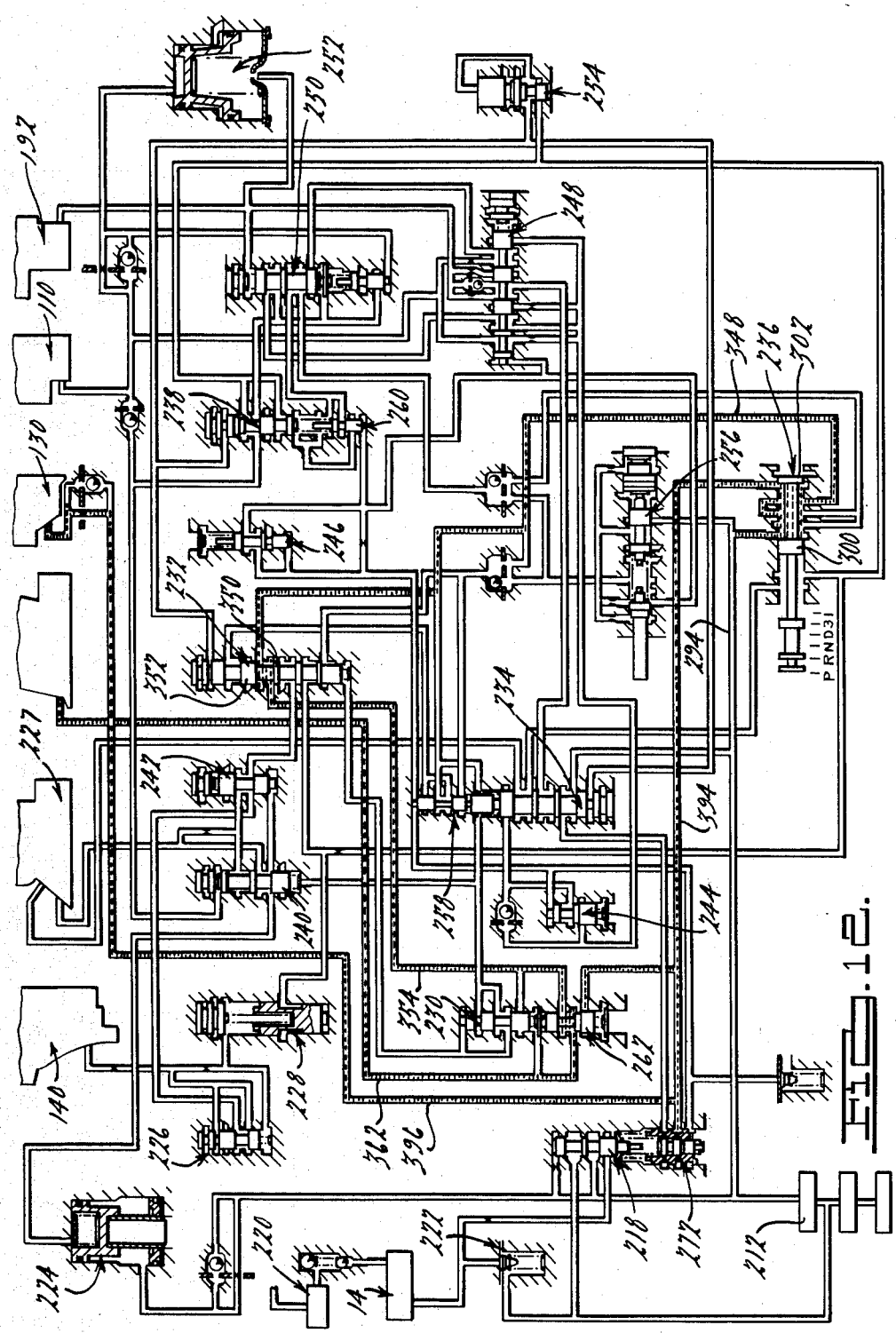

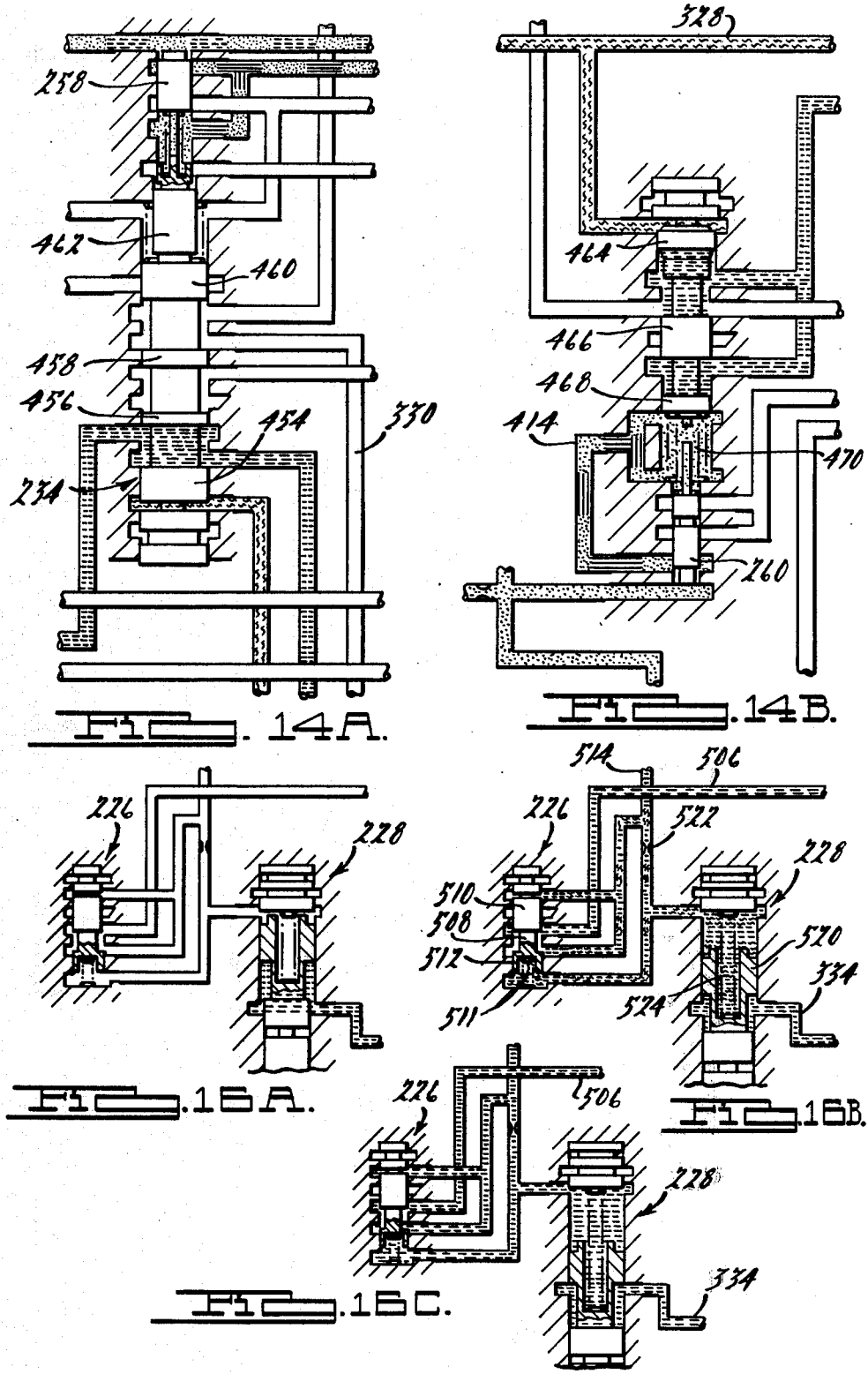

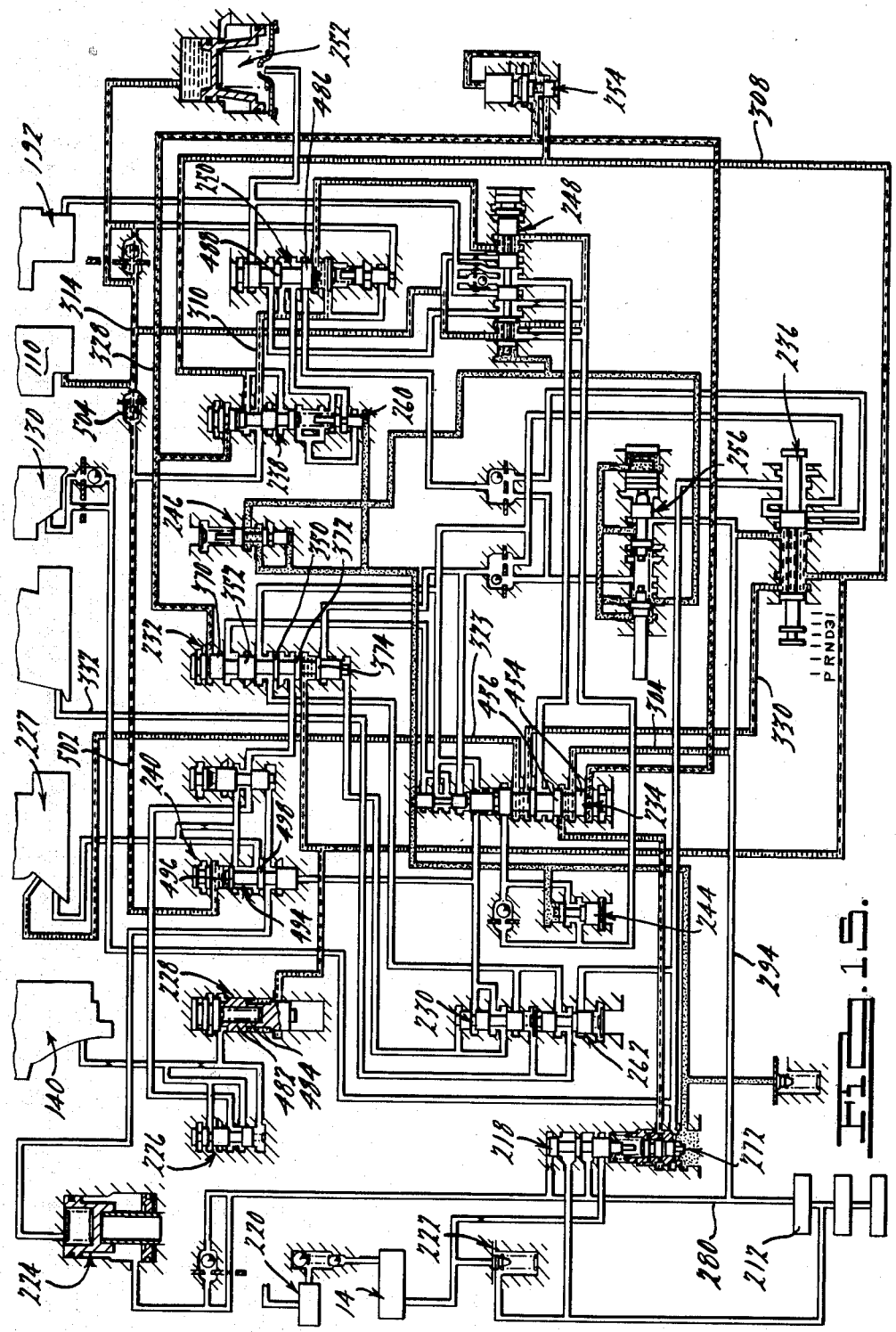

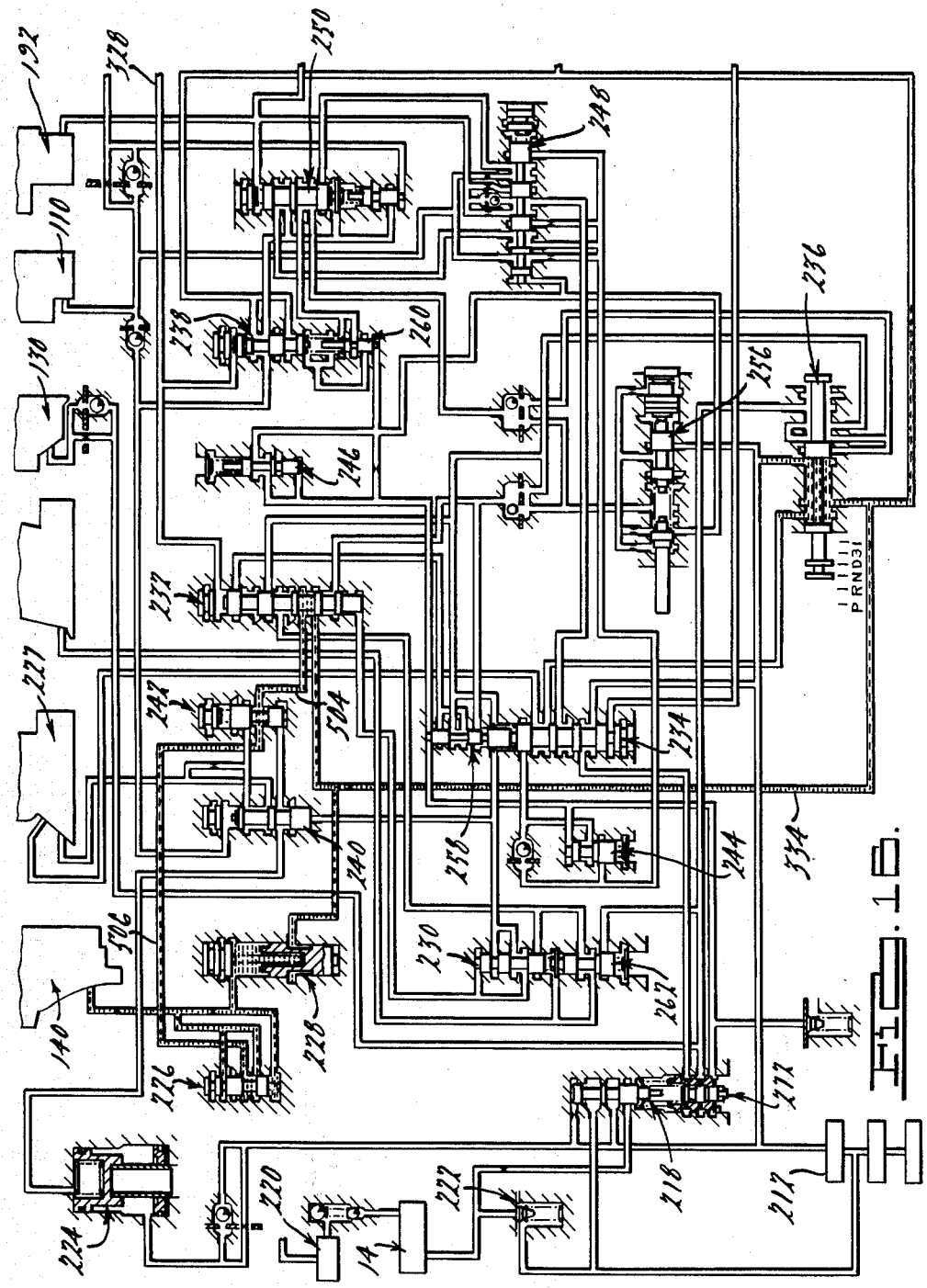

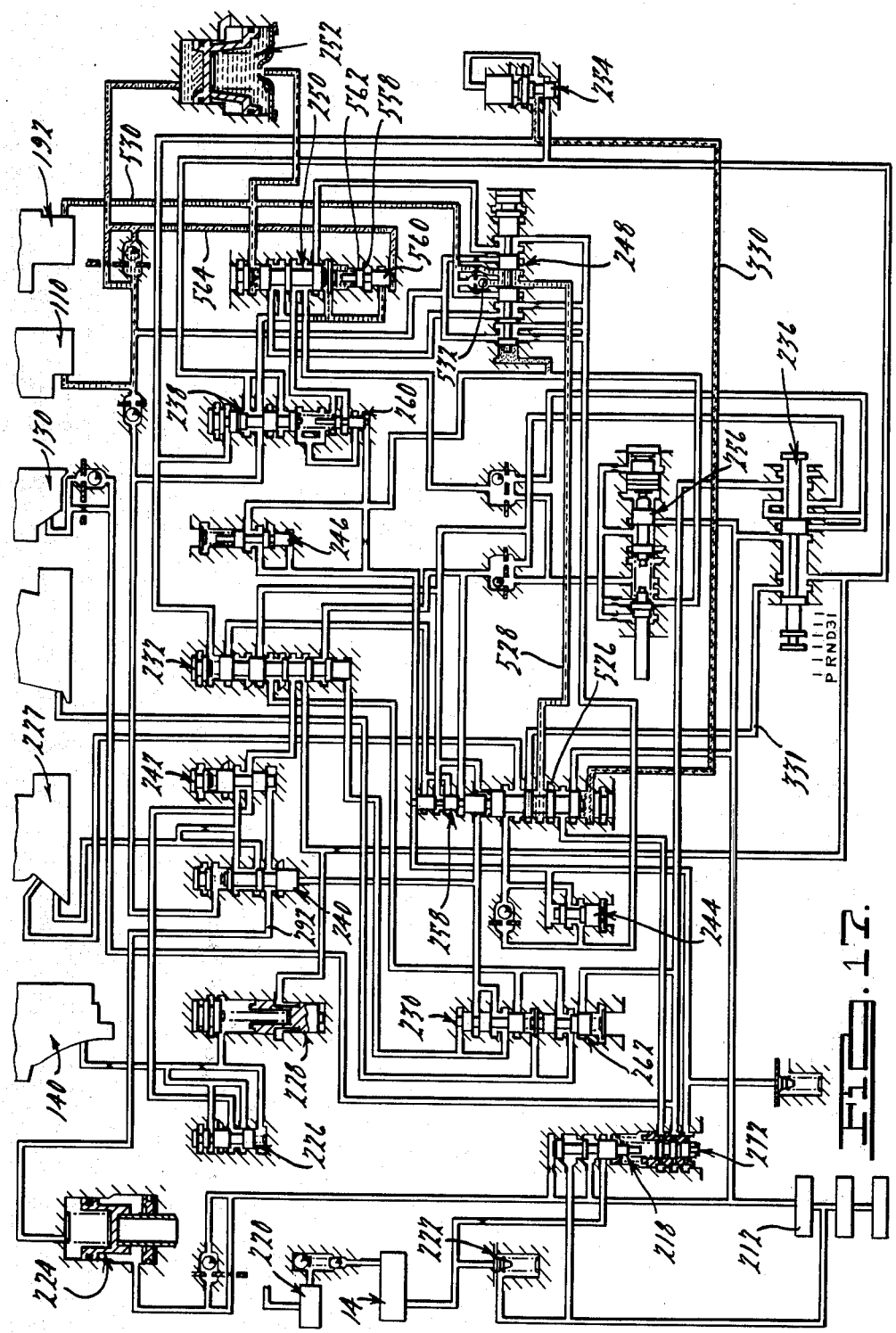

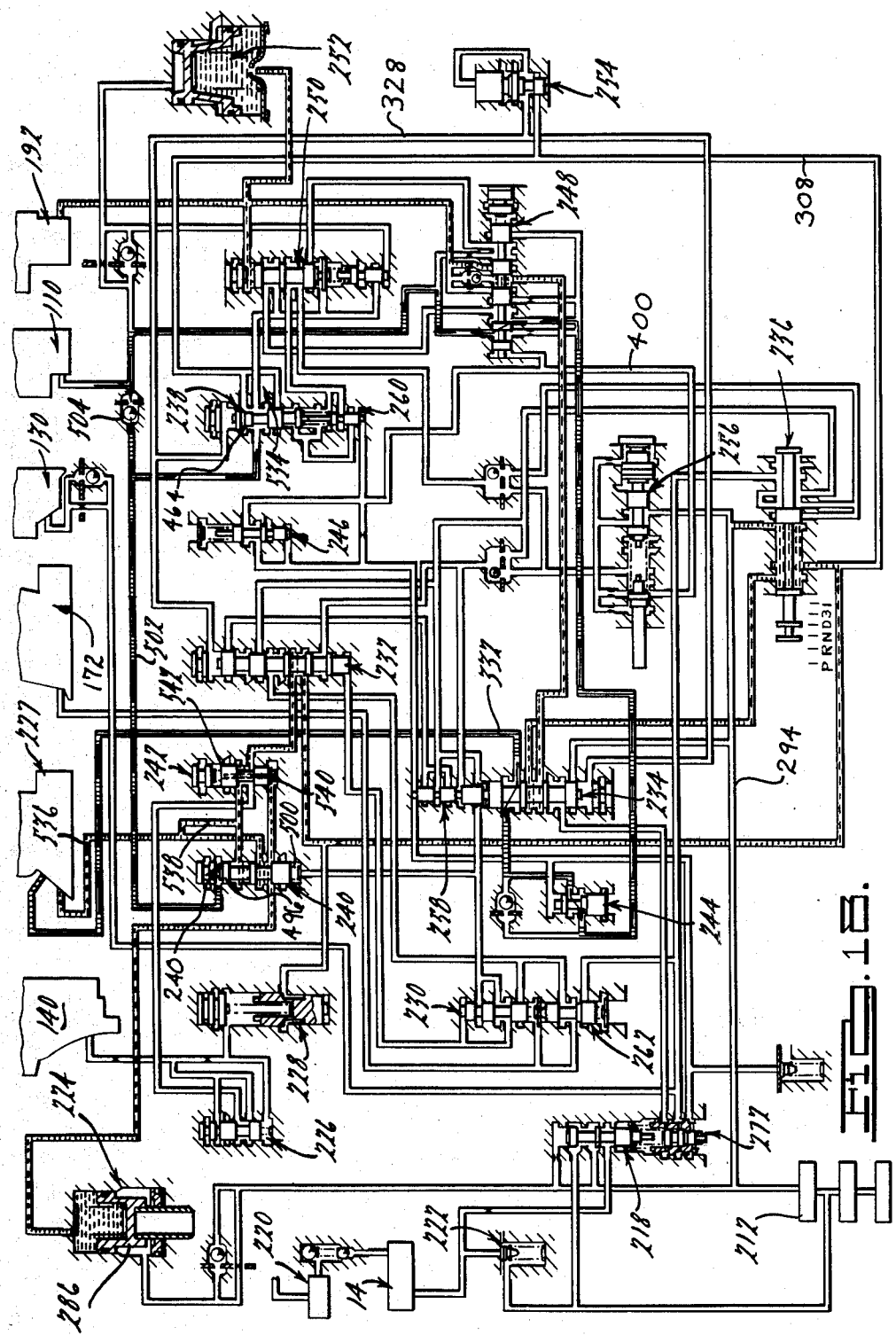

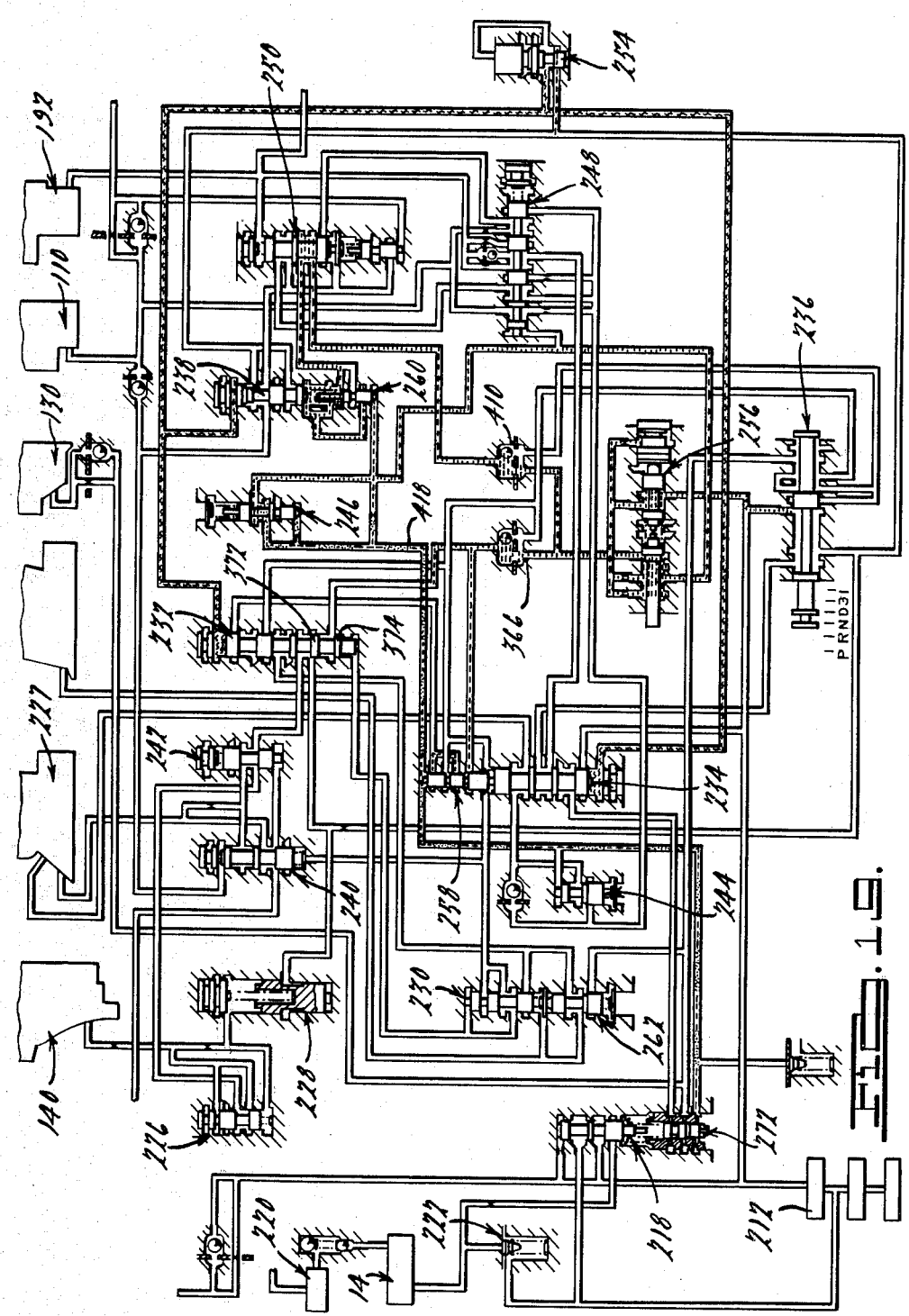

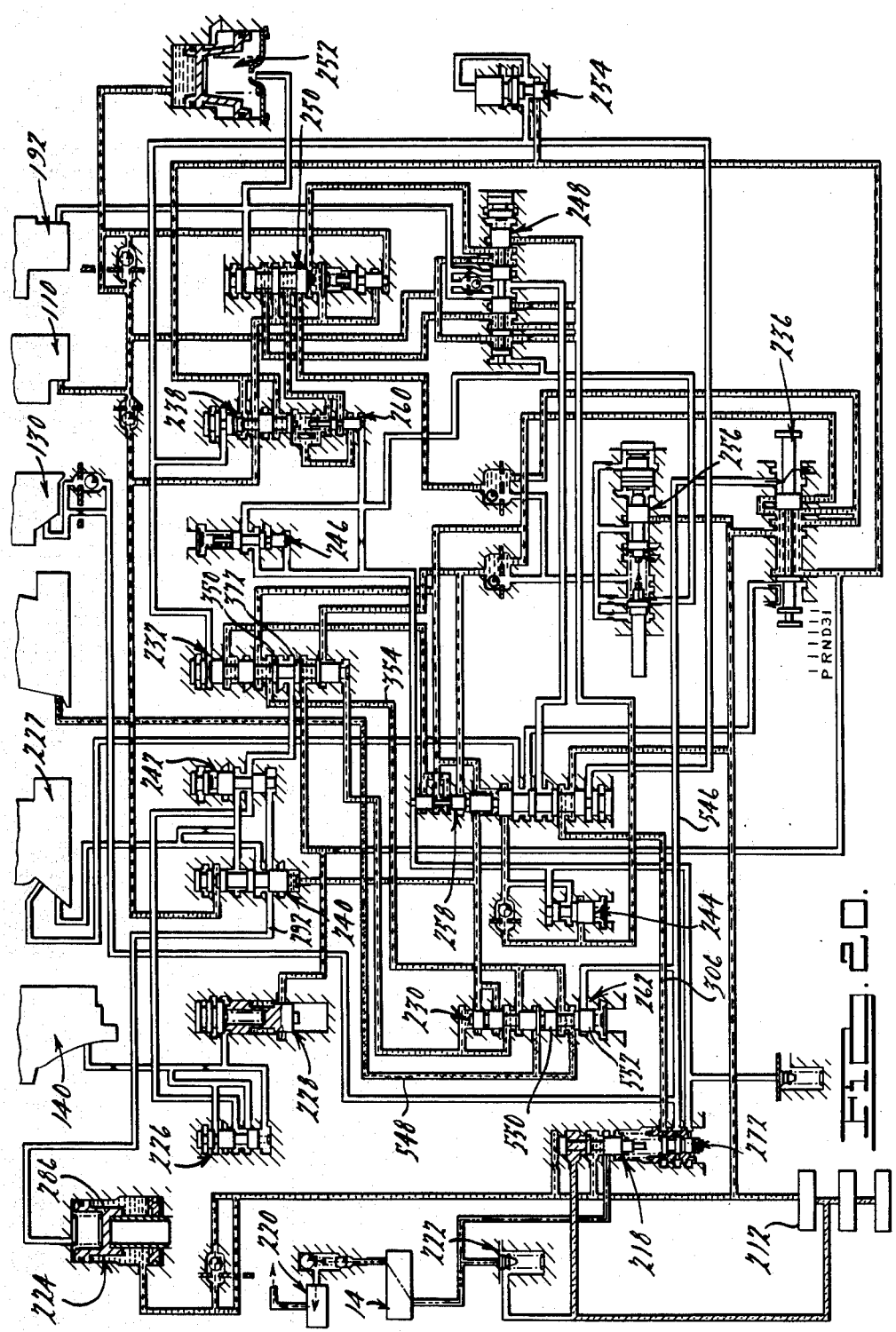

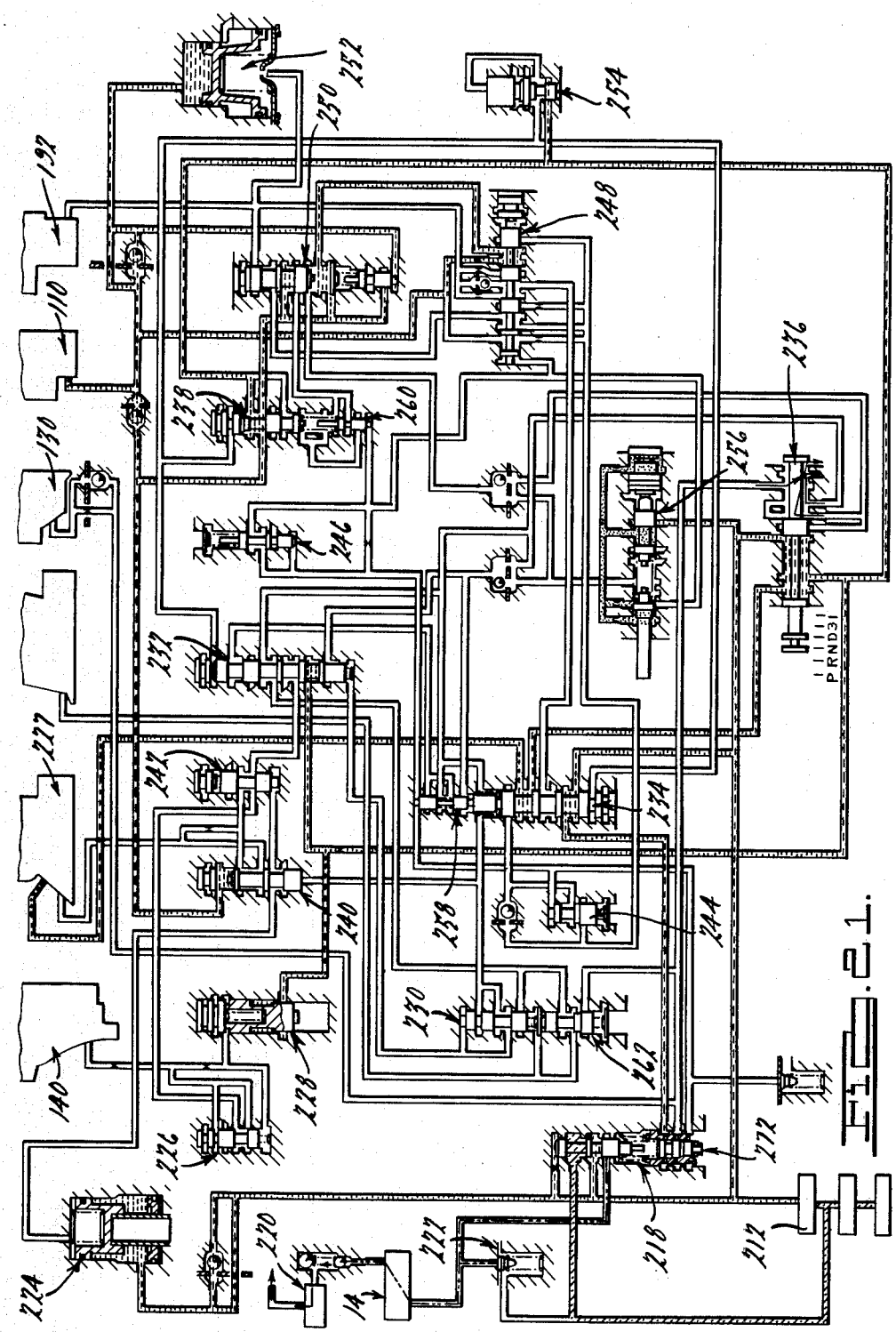

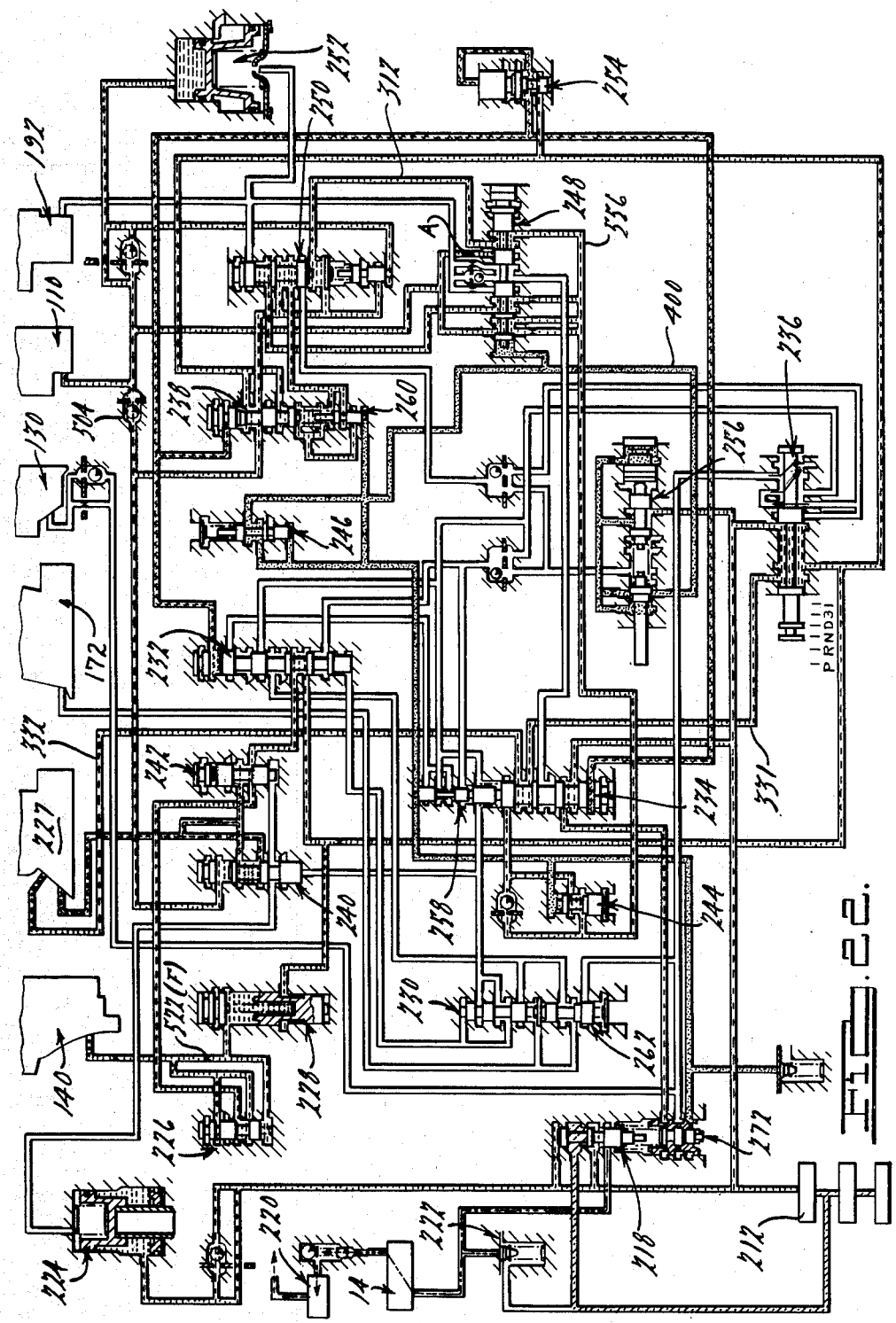

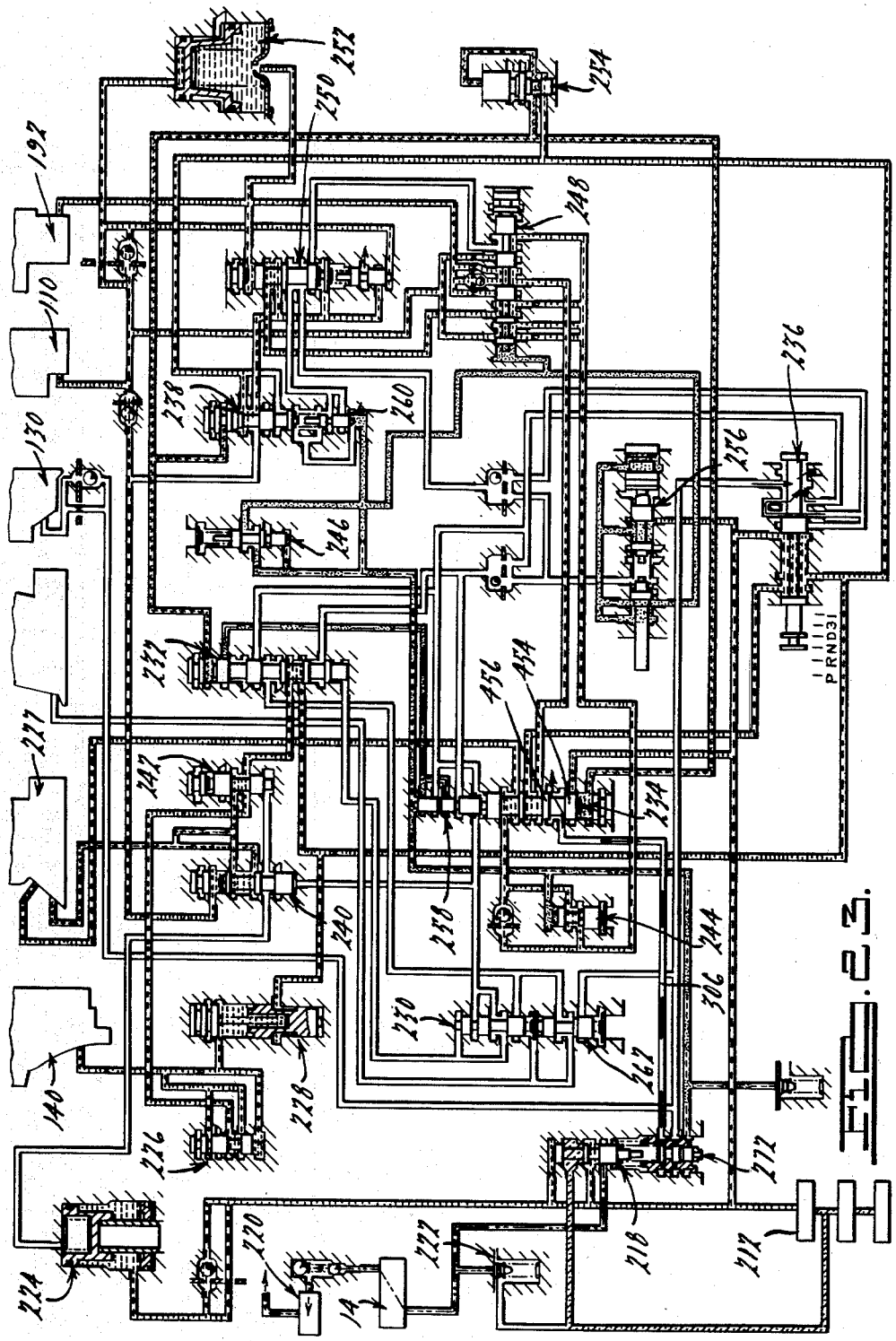

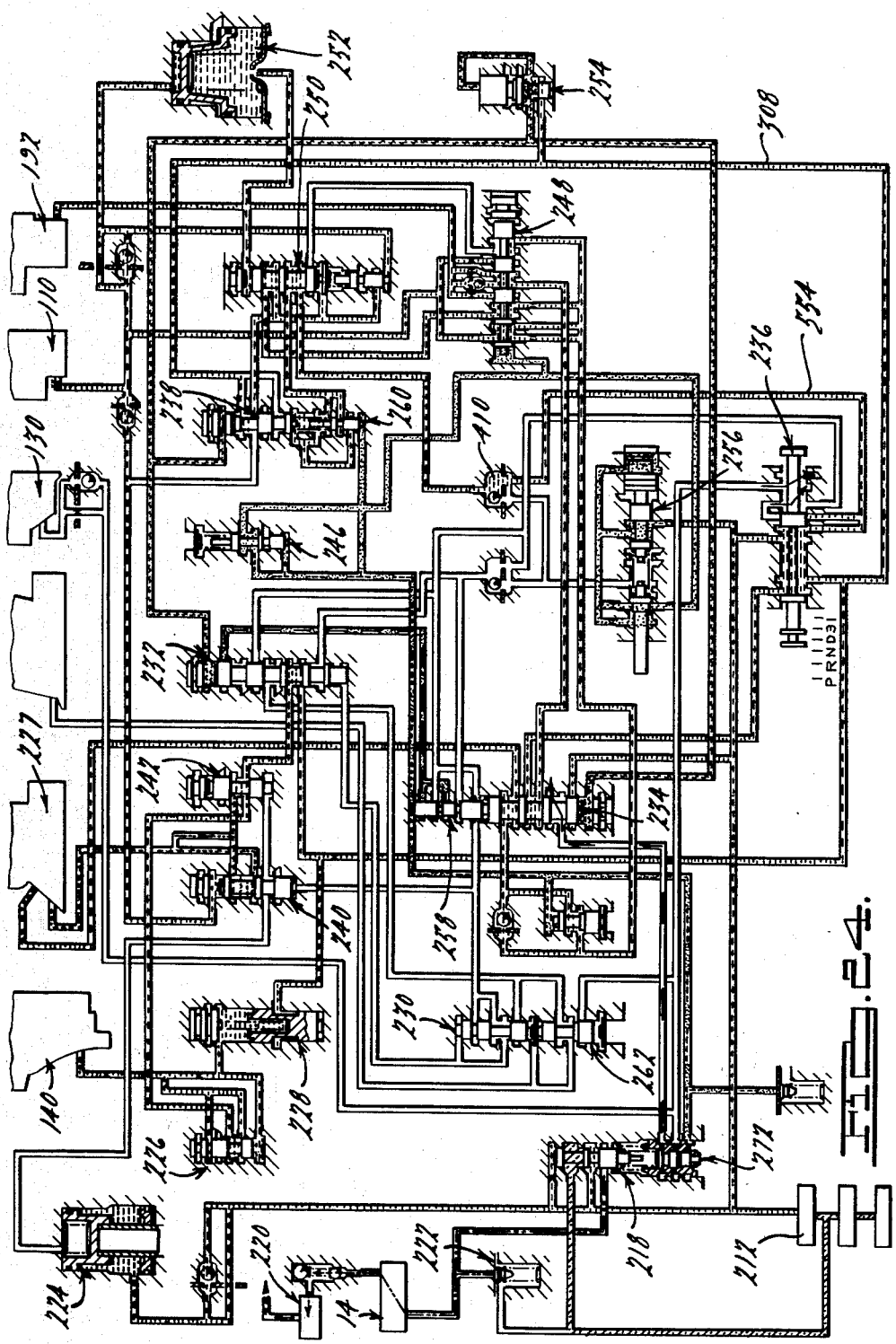

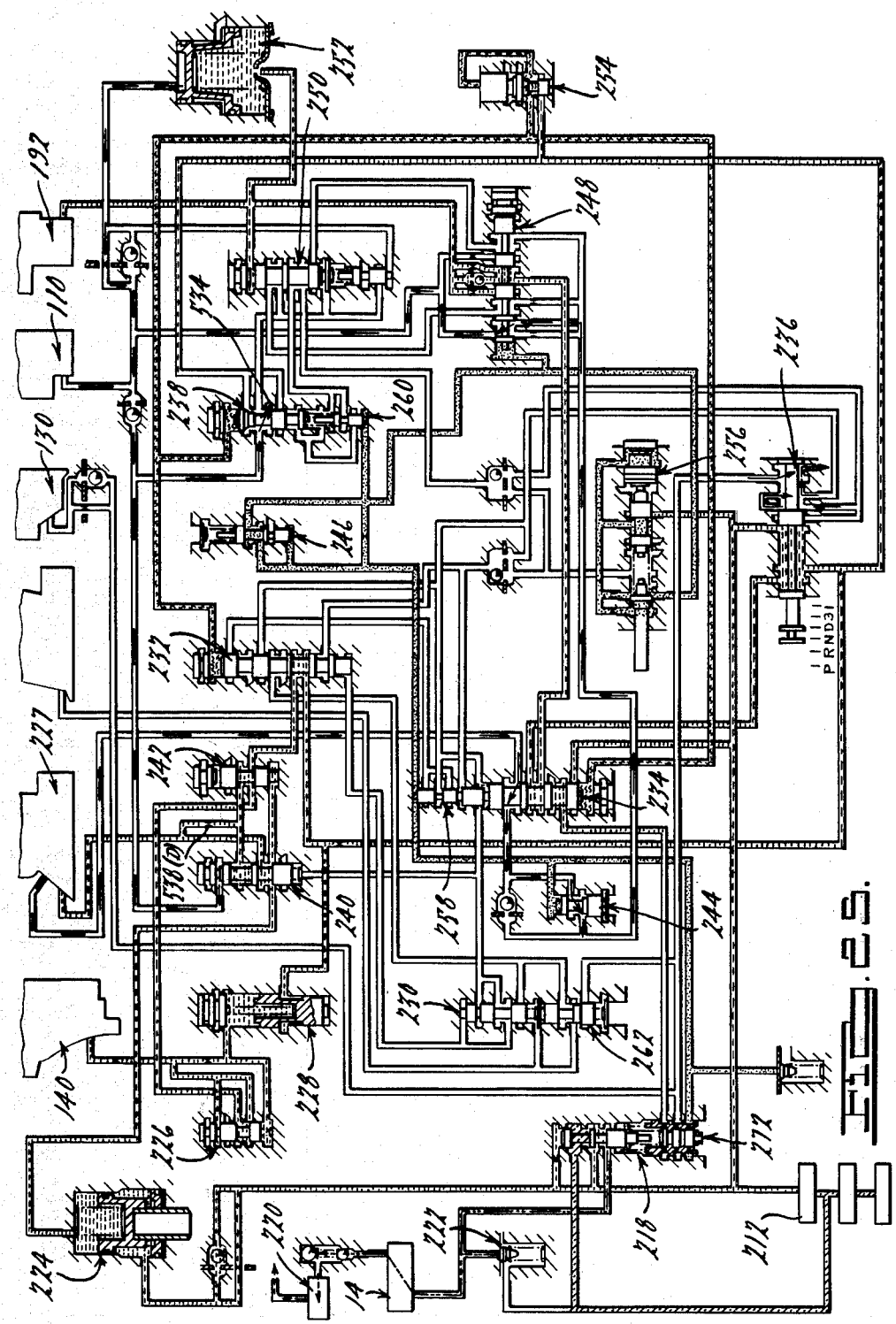

Function Of Orifices

| Orifice | Letter | Orifice Size | Function | Orifice Control Valve | Friction Element |
|---|---|---|---|---|---|
| Forward Engagement | A | .090" | Idle Engagement | ← | F.C. |
| 4-3 Torque Demand | B | .065" | 4-3 Power On | → | F.C. |
| 4-3 Coast | C | .080" | 4-3 Coasting | → | F.C. |
| 2-3 Backout | E | .045" | 2-3 Shift At Closed Th. | → | D.C. |
| Direct Clutch | K | .070" | 2-3 (Power On) | → | D.C. |

FIG. 28.

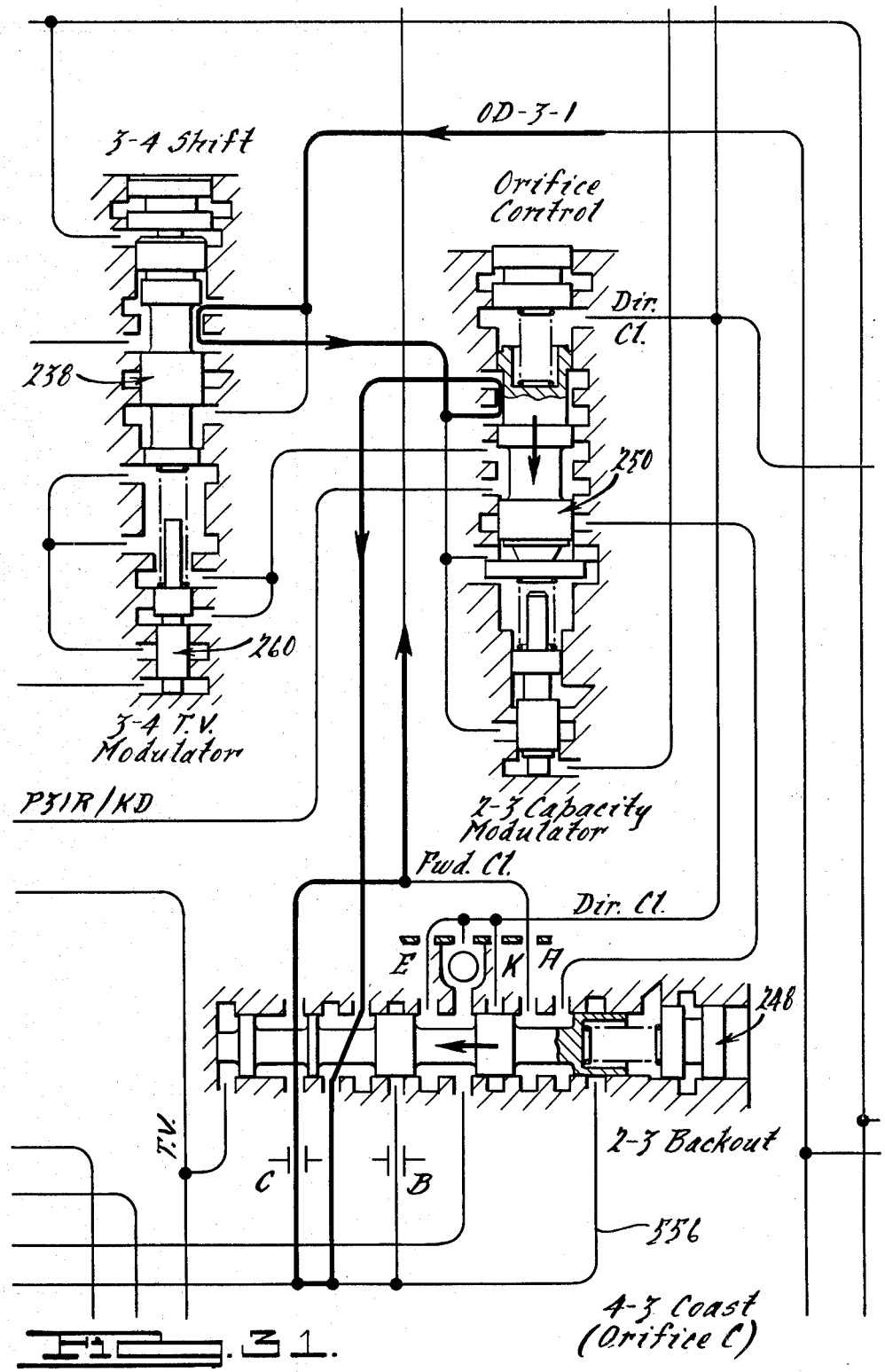

MULTIPLE RATIO OVERDRIVE TRANSMISSION

GENERAL DESCRIPTION OF THE INVENTION

Our invention comprises improvements in a hydrokinetic multiple ratio power transmission mechanism having two underdrive ratios, a direct drive ratio, an overdrive ratio and a control system for establishing the various drive ranges and shift patterns; more particularly it is an improvement in transmission mechanisms of the kind described in Konrad U.S. Pat. No. 3,491,617 and in Egbert U.S. Pat. No. 3,314,307. Those patent disclosures, as well as this disclosure, relate to transmission mechanisms for use with automotive internal combustion engines. The present improved mechanism includes a hydrokinetic torque converter and a compound planetary gear set having two sun gears of differential diameter, a pair of planet pinions and a ring gear that serves as the torque output element. The impeller of the converter is drivably connected to the crankshaft of the engine, and the turbine of the converter is adapted to be clutched to the sun gear of smaller pitch diameter during operation in the lowest speed ratio. The turbine and the crankshaft are adapted to be connected to separate gear elements through friction clutches during operation in the direct drive ratio whereby a portion of the torque is distributed hydrokinetically through one clutch and through the gear system to the output ring gear, and the balance of the torque is distributed directly to the output member while bypassing the converter. The carrier for the planetary gear unit serves as a reaction member during low speed ratio operation, and the larger sun gear serves as a reaction member during intermediate speed ratio operation.

A fourth ratio, which is an overdrive ratio, is obtained by braking the larger sun gear while the impeller is connected directly through a friction clutch to the carrier thus causing the ring gear to overspeed the impeller. This overdrive function, which in effect is a fourth forward driving ratio, is achieved while using a minimum number of friction clutches and brakes. In this respect the overdrive gear system is simplified in comparison to known overdrive systems that require separate overdrive gearing in combination with the normal gearing used for forward drive speed reductions.

To simplify the shift sequence and to provide smooth ratio transitions during upshifts and downshifts between the first ratio and the second ratio and between the second ratio and the third ratio, overrunning brakes are used to anchor the carrier and to anchor the larger sun gear, the latter overrunning brake being in series relationship with respect to an intermediate friction brake that is used to establish a torque reaction point during intermediate speed ratio operation.

The control system used for establishing the shift sequences includes a throttle valve mechanism that is connected mechanically to the engine carburetor throttle and which is adapted to establish a pressure signal that is proportional in magnitude to the engine throttle movement. That signal thus is a general indication of the torque demand, and it is used to establish shift points. In addition to that signal a speed signal is obtained from a governor valve drivably connected to the driven portions of the mechanism. Both signals are applied to pressure signal sensitive distributor valves to control distribution and release of pressures to and from fluid operated servos for the clutches and brakes that are used to control the relative motion of the gear elements.

In an arrangement of this type it is necessary to establish precise shift points, and for this reason the valves that establish timing of the engagement and release of the servos must be triggered at the instant that a change of throttle pressure occurs. In a control system of the kind disclosed in the prior art reference patents mentioned previously a vacuum signal is used to control the throttle valve. The vacuum signal is obtained from the engine intake manifold and the magnitude of that signal determines the magnitude of the pressure signal developed by the throttle valve of the transmission. The throttle pressure signal thus is in indicator of the engine manifold pressure. If the engine throttle is relaxed, the manifold pressure immediately decreases; thus there is an abrupt change in the magnitude of the throttle pressure signal that is applied to the shift timing valve elements. The pressure system of the present invention, however, does not use a manifold pressure responsive actuator for the throttle valve in the transmission. Thus the relationship between engine torque and magnitude of the throttle pressure signal is such that there normally wouldn't be an abrupt change in the throttle pressure signal upon a decrease in the angle of the engine carburetor throttle. According to one feature of the invention, we have provided an improved throttle valve system that has a position-pressure characteristic that will generally correspond to the characteristic that is inherent in a vacuum throttle valve system of earlier designs whereby a sharp change in the torque signal made available to the shift timing valves will be produced when the engine throttle is relaxed; for example, during coasting upshifts.

According to another feature of the invention we have provided a capacity modulator valve, orifice control valve and accumulator for regulating the magnitude of the pressure that is available to the direct drive clutch during the application of the clutch and to the forward clutch during initial forward clutch engagement. The 2-3 capacity modulator valve acts in cooperation with an orifice control valve and an accumulator for effecting optimum timing of the engagement of the direct clutch on a shift from the intermediate ratio to the direct-drive ratio under minimum torque conditions as well as during engagement of the clutch during normal acceleration of the torque as the speed signal increases.

The control system includes a main pressure regulator that is sensitive to the position of the engine throttle by reason of the fact that the transmission throttle valve signal is transferred to the main pressure regulator. A development of excessive pressure by the regulator is avoided, however, by the strategic disposition of a throttle pressure limit valve that prevents application of full throttle pressure to the pressure booster portions of the main regulator valve. Development of a pressure in excess of that which is required to maintain clutch and brake engagement thus is avoided.

Other features of the invention will become apparent from the following description.

BRIEF DESCRIPTION OF THE FIGURES OF THE DRAWINGS

FIGS. 1A, 1B and 1C show, respectively, the torque converter portion, the main gearing portion and the tailshaft extension housing for an automatic power transmission mechanism capable of embodying the improvements of the invention.

FIG. 1D is a schematic representation of the transmission mechanism of FIGS. 1A, 1B and 1C.

FIG. 1E is a chart that shows the clutch engagement and release pattern during ratio changes for the transmission mechanism of FIGS. 1A, 1B and 1C.

FIG. 2 is a cross-sectional view of a partial assembly of a cover and damper which form a part of the converter mechanism shown in FIG. 1A.

FIG. 3 is a cross-sectional view as seen from the plane of section line 3—3 of FIG. 2.

FIG. 4 is a cross-section view as seen from the plane of section line 4—4 of FIG. 2.

FIGS. 7A and 7B show a control valve circuit for controlling the ratio shift pattern for the transmission mechanism of FIGS. 1A, 1B and 1C.

FIG. 8 is a subassembly view of the valve arrangement for FIGS. 7A and 7B illustrating the valve positions during initial engagement of the forward drive clutch.

FIG. 9 is a partial drawing of the valve circuit showing the valve positions during start-up in the manual-low range.

FIG. 9A shows an enlarged view of the low servo modulator valve seen in FIG. 9.

FIG. 10 shows the control valve circuit condition for second ratio lockout in the manual-low range.

FIG. 10A is an enlarged view of the 2-1 scheduling valve shown in the circuit of FIG. 10.

FIG. 11 is a partial valve diagram of the valve system when it is conditioned for distribution of a scheduling pressure to the 1-2 shift valve.

FIG. 11A shows the operation of the 2-1 scheduling valve during the mode of operation of FIG. 11.

FIG. 12 shows a partial valve diagram illustrating the reverse brake servo and clutch when the valve system is conditioned for reverse drive range.

FIGS. 14A and 14B show the operation of the 2-3 shift valve and the 3-4 shift valve, respectively, during delay of the upshifts.

FIG. 15 shows the valves conditioned for upshift control in the overdrive range when the gearing is adapted for low speed ratio operation.

FIG. 16 is a view similar to FIG. 15 with the valves in the overdrive range and conditioned for an automatic 1-2 upshift.

FIGS. 16A, 16B and 16C show the function of the 1-2 capacity modulator valve and the 1-2 accumulator valve.

FIG. 17 shows a valve system in the overdrive range when it is in condition for a 2-3 upshift at part throttle.

FIG. 18 is a partial view of the valve system in the overdrive range when it is in condition for a 3-4 upshift.

FIG. 19 shows a kick-down valve system when the throttle valve is advanced to its maximum setting.

FIG. 20 is a view of the valve system when it is in condition for manual-low, first gear ratio operation.

FIG. 21 shows the valve system when it is in condition for first gear engagement in the overdrive range at closed throttle.

FIG. 22 shows the valve system when it is in condition for second gear operation in part throttle in the overdrive range.

FIG. 23 shows the valve system when it is in condition for third gear operation at ¾ engine throttle setting in the overdrive range.

FIG. 24 is a view of the valve system when it is in condition for third gear operation at ¾ engine throttle in drive range number 3.

FIG. 25 is a view of the valve system when it is in condition for fourth gear operation at part throttle.

FIG. 28 is a chart that shows the orifices in the 2-3 backout valve that are effective for various driving conditions indicated in the chart.

FIG. 31 shows a coasting downshift condition for the orifice control valve on the 2-3 capacity modulator as the downshift occurs from the overdrive ratio to the direct drive ratio.

PARTICULAR DESCRIPTION OF THE INVENTION

Figure 1A:
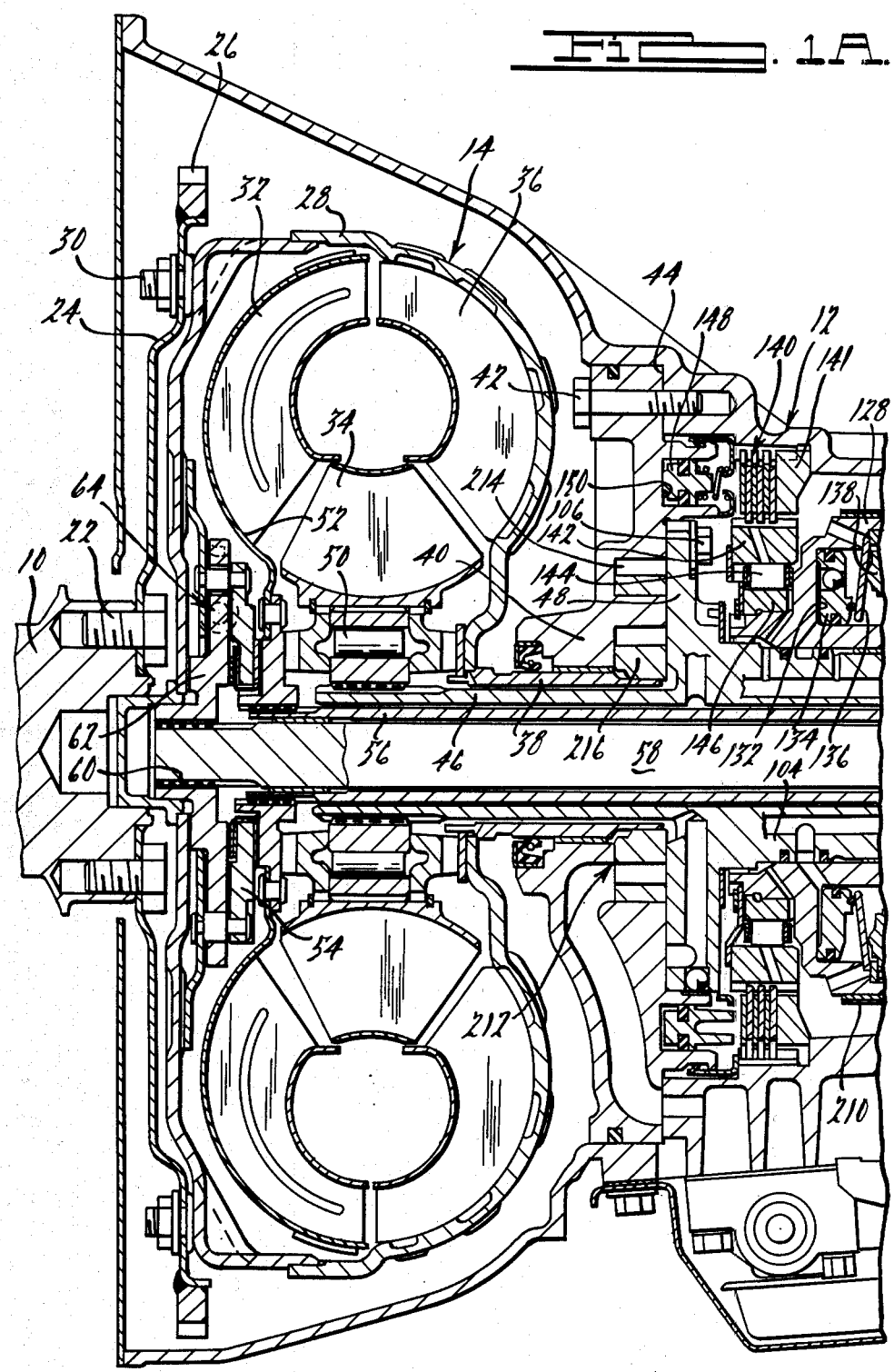

The operation of the converter, the gearing and the clutch-and-brake engagement and release sequences will be described with reference to FIGS. 1A through 1E. Reference numeral 10 in FIG. 1A shows the end of an engine crankshaft for an internal combustion engine. Reference numeral 12 generally designates a unitary cast aluminum housing which encloses a hydrokinetic torque converter 14 and a planetary gear portion 16. A tailshaft extension housing 18 is mounted on the right-hand end of the housing 12 and is secured thereto by bolts 20.

Crankshaft 10 is bolted at 22 to impeller drive plate 24, which carries a starter ring gear 26 on its periphery. Impeller housing 28 is bolted at a radially outward location 30 to the drive plate 24. Impeller housing 28 encloses a bladed turbine 32 and a bladed stator 34, the latter being situated between the flow exit region of the turbine 32 at the flow entrance region of the impeller blades shown at 36. The hub of impeller housing 28 is drivably connected to impeller support sleeve shaft 38 which is journalled in an opening formed in the pump housing 40. Housing 40 is secured by bolts 42 against an internal shoulder 44 formed in the transmission housing 12. A stator support sleeve shaft 46 is disposed within impeller sleeve shaft 38. It forms a part of pump cover plate 48. Bladed stator 34 is mounted on the stator sleeve shaft 46 by overrunning brake assembly 50, the latter permitting freewheeling motion of the bladed stator 34 in the direction of rotation of the impeller but preventing rotation of the bladed stator in the opposite direction.

Turbine 32 includes an outer shroud 52 which is secured to turbine hub 54, which in turn is splined to turbine sleeve shaft 56 located concentrically within the sleeve shaft 46. Direct drive shaft 58 is splined at 60 to the hub 62 of an internal damper assembly 64. This damper assembly 64 forms a resilient connection between the direct drive shaft 58 and the impeller housing 28.

The damper assembly can best be seen by referring to FIGS. 2, 3 and 4. It includes a spring retainer plate 66 which has recesses on one side thereof, as seen at 68, for retaining damper springs 70. The hub 62 forms a part of a radially outward drive plate 72 which is formed with angularly disposed openings 74 for receiving the springs 70. The outer margin of plate 72 is formed with recesses or notches 76 which receive drive tabs 78 formed on drive plate 80, the latter in turn being spot welded at 82 to the inner wall of the impeller housing. Drive plate 80, the radial plate 72 and the end plate 66 are joined together by rivets 84 to form a unitary assembly. The plate 80 and the plate 66 form an assembly that is adapted to move angularly with respect to the plate 72. That movement is resisted by the springs 70 which are seated with a preload on the ends of the spring openings 74. The plate 72 is provided with elongated slots 86 through which the rivets or pins extend thereby accommodating relative motion between the plates 78 and 66 with respect to the plate 72.

A friction washer 88 with friction material on one side thereof is urged into engagement with the damper hub 62 by a circular Belleville spring washer 90 situated between the hub 62 and the plate 66. Friction material 92 is formed also on the opposite side of the hub 62. Thus the Belleville washer 90 provides a so-called coloumb effect to provide frictional energy absorption which, in combination with the damping effect of the springs 70, provides an inertia damper for cushioning the ratio shift from a hydrokinetic drive to either a partial or a mechanical drive as the transmission is in condition for direct drive operation or overdrive operation.

A washer 88 has tabs that are received in recesses 94 formed in a central opening 96 of the plate 66. The right-hand end of the turbine sleeve shaft 56 is splined at 98 to the hub of clutch member 100, which is journalled at 102 on stationary support sleeve shaft 104 that forms a part of pump cover plate 48 bolted by bolts 106 to the pump housing 40. Clutch member 100 defines an annular cylinder 108 for forward clutch assembly 110. An annular piston 112 is situated in the cylinder 108 and defines a pressure chamber that can be pressurized selectively by the control system to effect engagement of the clutch assembly 110. Clutch member 100 is provided with internal splines that carry externally splined clutch discs 114. These register with internally splined clutch discs 116 carried by externally splined clutch member 118, the latter in turn being splined to sun gear sleeve shaft 120 for the planetary gear unit 16. Clutch return spring 122 situated between the clutch member 118 and the piston 112 normally urge the piston 112 out of engagement with the clutch discs.

Clutch member 100 is provided also with an externally splined portion that carries internally splined clutch discs 124. These are arranged in registry with externally splined clutch discs 126 that are carried by an internally splined portion of the reverse clutch element 128, which is journalled rotatably on the stationary sleeve shaft 104. Clutch discs 124 and 126 form a part of a reverse clutch assembly identified by reference character 130.

Reverse clutch element 128 defines an annular cylinder 132 which receives an annular piston 134. Belleville spring lever 136 provides a force multiplying connection between the piston 134 and the pressure plate 138 that activates the clutch discs.

An intermediate clutch assembly 140 comprises externally splined friction discs that register with splines or grooves formed in the housing 12. A stationary backup ring for the intermediate clutch or brake, which is shown at 141, engages an internal shoulder on the housing 12. Internally splined friction discs of the clutch assembly 140 are carried by an externally splined overrunning brake race 142 of an overrunning brake assembly 144. The inner race 146 for the brake assembly 144 is secured to the reverse clutch element 128.

The friction discs for the clutch assembly 140 can be applied by an annular piston 148 located in an annular cylinder 150 formed in the pump housing 40.

When fluid pressure is admitted to the annular cylinder 150, the force developed on the piston 148 applies the intermediate clutch or brake thereby anchoring sun gear 152 of the planetary gear assembly 16. Sun gear 152 is connected to reverse clutch element 128 through a drive shell 154, which is a sheet metal torque transfer member surrounding the forward clutch assembly 110.

The compound planetary gear assembly 16 includes, in addition to the sun gear 152, a sun gear 156 which is of a smaller pitch diameter than the sun gear 152. A first set of planetary pinions 158 engages sun gear 152 and a second set of planetary pinions 160 engages the sun gear 156. The pinions 158 and 160 engage each other. Also pinions 158 engage ring gear 162. Both sets of pinions 158 and 160 are journalled on pinion shafts that are shown at 164 and 166, which form a part of carrier assembly 168.

A brake drum 170 is formed integrally with the carrier assembly 168. It is surrounded by multiple wrap brake band 172. A fluid pressure operated brake servo which is shown schematically in the circuit drawings to be described later, is adapted to apply and release the brake band 172. The reaction torque for the brake band 172 is absorbed by the transmission housing 12.

An overrunning brake 174 is situated in series disposition with respect to the brake band 172. It includes an outer race 176 carried by brake drum 170, an inner race 178 and overrunning brake rollers 180 that register with cam surfaces formed in the race 176. Inner race 178 is secured to the housing 12 by brake support plate 182.

Brake drum 170 forms a part of a compound planetary gear carrier 168. Carrier 168 includes a sleeve that is journalled on sun gear shaft 186. It includes also an end plate 184 which is journalled on sleeve 187 which forms a part of direct drive clutch element 188. Sleeve 187 is splined directly to the direct drive shaft 58. Plate 184 is splined also to direct drive clutch element 190, which carries internally splined clutch discs 192 which are situated adjacent to externally splined disc 194, the latter being carried by element 188. Element 188 defines an annular cylinder 196 within which is situated an annular piston 198 which is adapted to engage the discs 192 and 194 when fluid pressure is admitted to the cylinder 196. Piston return spring 200 urges normally the piston 198 to a clutch release position.

Output shaft 202 is provided with an extension 204 that is received within sleeve 187 and journals the clutch element 188. Shaft 202 is supported by a bushing within a bearing sleeve 206 which forms a part of the end wall 208 of the housing 12.

Figure 1B:
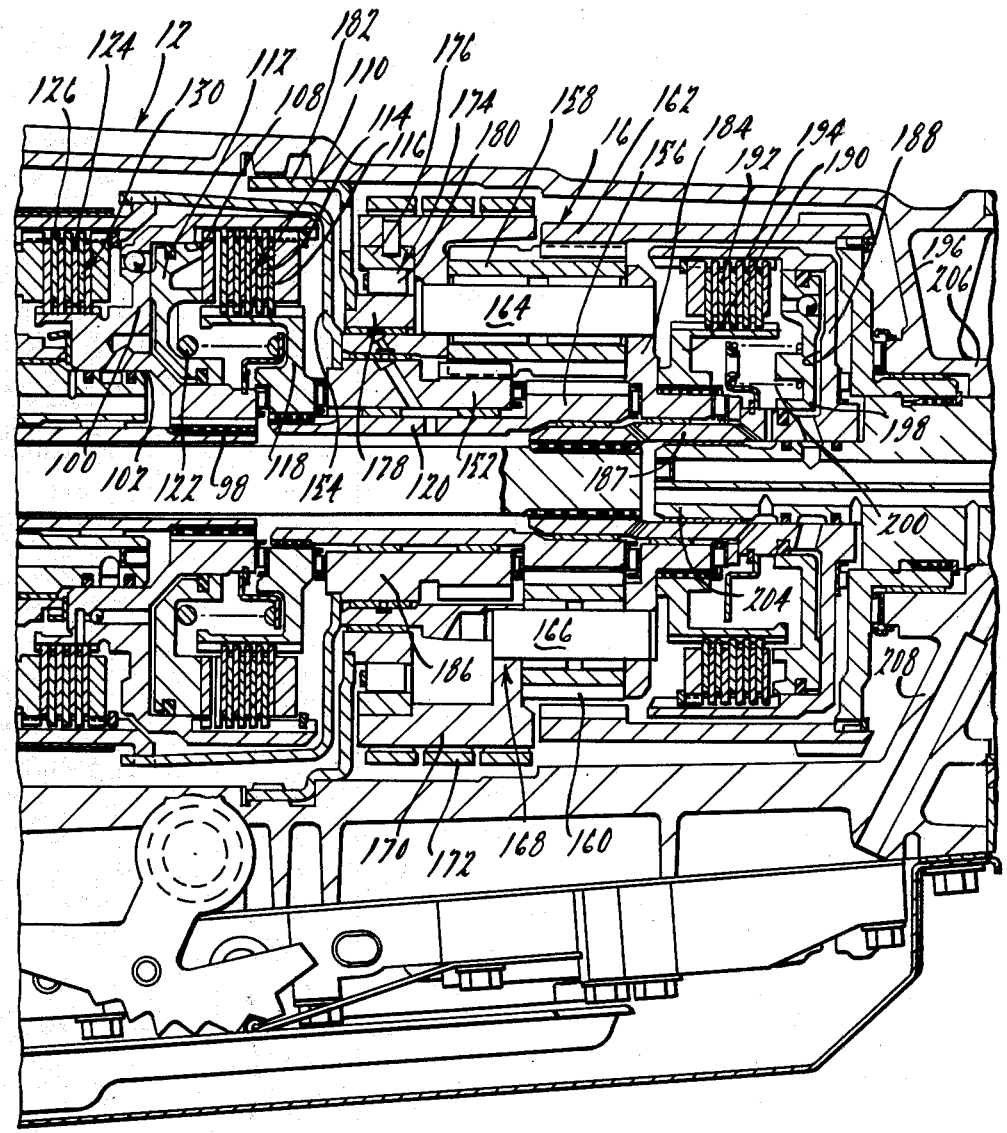

The converter and gear system disclosed in FIGS. 1A, 1B and 1C is illustrated schematically in FIG. 1D. The mode of operation of the converter and gear system can best be understood by referring to FIGS. 1D and 1E. To condition the mechanism for operation in the lowest speed ratio, it merely is necessary to engage the forward clutch identified by the symbols C1 in FIGS. 1D and 1E. At that time turbine torque from the converter 14 is distributed through the clutch C1 to the small sun gear 156. The overall speed reduction that occurs is 2.4:1 as the ring gear drives the output shaft, and the carrier torque is absorbed through the overrunning clutch 174 (C4). If torque reaction in the opposite direction is desired, it merely is necessary to engage brake band 172, which is the driving mode that is referred to in the following description of the control circuit as the manual low drive range.

To effect an automatic upshift from the lowest ratio to the intermediate second speed ratio, it merely is necessary to engage the intermediate clutch or brake 140. Reaction torque then is distributed from reaction sun gear 152 through the overrunning clutch 144 to the engaged friction brake 140 (C5). The overrunning clutch 174 (C4) freewheels under these conditions, thus providing an automatic pick-up shift. A speed ratio change to the third speed ratio, which is approximately a direct drive, is achieved by engaging the direct drive clutch 192 (C3). Clutches 192 and 110 being engaged simultaneously, the transmission mechanism is in condition for operation with a 1:1 ratio, except for the effect of converter slip, since all the elements of the gearing rotate together in unison. At that time, however, torque is distributed directly from the input shaft 10 to the carrier through the direct drive clutch 192 (C3). The balance of the torque is distributed hydrokinetically through the turbine 14 since the turbine of the converter 14 is connected through the forward clutch 110 (C1) to the small sun gear 156. Because only a portion of the driving torque is distributed hydrokinetically, the resulting increase in the overall mechanical efficiency of the transmission is improved in comparison to transmission mechanisms of the kind disclosed in the previously described reference patents where the hydrokinetic torque converter is fully active in each of the four driving ranges.

During a ratio change from the second ratio to the third ratio, it is necessary to engage only a single friction device, namely the clutch 192 (C3). The clutch overrunning clutch 144 (C6) automatically freewheels as the clutch 192 (C3) is engaged. Thus an automatic pickup shift from the second ratio to the third ratio is achieved in a nonsynchronous fashion. The valve mechanism that is used to establish this shift will be described subsequently.

A ratio change from the third direct drive ratio to the overdrive ratio is obtained by engaging the overdrive brake band shown at 210 in FIG. 1A and by releasing the front clutch. The corresponding reference symbol in FIGS. 1D and 1E is B1.

The overdrive brake band 210 surrounds clutch member 130; and since clutch member 130 is connected through the drive shell 154 to the larger sun gear 152, sun gear 152 acts as a reaction point during overdrive operation as torque is delivered from the engine crankshaft through the shaft 58 and through the clutch 192 (C3) to the carrier for the planetary gear unit. This overruns the ring gear 162 and the output shaft 202 relative to the speed of the crankshaft.

Reverse drive is obtained by engaging clutch 130 (C2) and engaging brake band 172 (B2). With the carrier braked by the brake band B2, it acts as a reaction point and the sun gear 152 acts as a torque input element thus driving the ring gear 162 in a reverse direction.

Figure 7B:
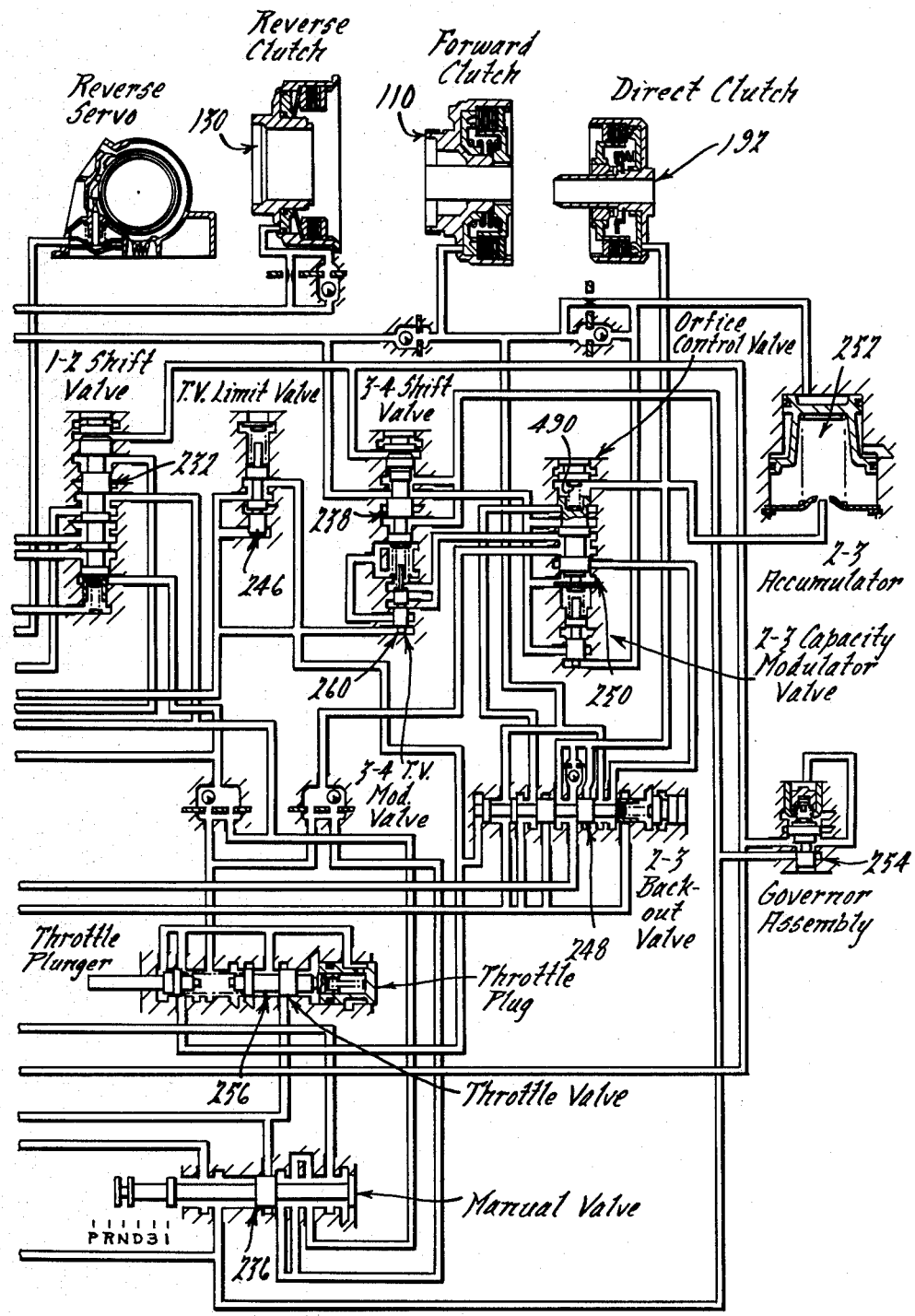

The control valve system for controlling the ratio changes and driving modes for the transmission mechanism of FIGS. 1A, 1B and 1C is illustrated schematically in FIGS. 7A and 7B. The function of the various valve elements of FIGS. 7A and 7B will be described subsequently with reference to FIGS. 8 through 27. For purposes of identifying the various valve elements of the circuit, reference now will be made in a general fashion to FIGS. 7A and 7B.

The source of pump pressure for the control circuit is pump 212. It comprises internal pump gear teeth 214 which mesh with the external pump gear teeth for pump 216, the gear teeth 216 being driven by impeller support sleeve shaft 38 as shown in FIG. 1A.

The pressure developed by the pump 212 is regulated by the main pressure regulator valve 218. A first regulated output pressure from the main oil pressure regulator valve 218 is distributed to the converter 14. The fluid supplied to the converter 14 circulates through the converter and transfers to cooler 220 and to the lubrication circuit for the transmission mechanism. Converter relief valve 222 located on the upstream side of the converter 14 prevents overpressure in the converter torus circuit.

One of the elements of the control circuit that controls the timing of the ratio change from direct to overdrive is the accumulator 224 which has a piston, one side of which is subjected to the apply pressure on one side of an overdrive servo 227 for brake band 210, the other side of which is subjected to pressure regulated by the main regulator valve 218.

A ratio change from the lowest ratio to the intermediate ratio occurs upon application of the intermediate clutch 140, the shift quality and timing of that shift is controlled by 1-2 capacity modulator valve 226 and by the 1-2 accumulator valve 228. During operation in the manual low range to be described, a ratio change from the intermediate ratio to the lowest ratio is timed by the 2-1 scheduling valve 230, which is a regulator valve that distributes a pressure to the lower end of the 1-2 shift valve 232, the latter in turn controlling distribution of pressure to the intermediate clutch 140 through the 1-2 capacity modulator valve.

Ratio changes from intermediate to direct drive ratio are controlled by the 2-3 shift valve 234, which is in communication with manual valve 236, the latter receiving regulated pressure from the pump and distributing it to the 2-3 shift valve and the 1-2 shift valve. The manual valve selects the drive mode that is desired, as will be explained subsequently.

Ratio changes from the direct drive ratio, which is a split torque drive as explained previously, to the overdrive ratio is controlled by 3-4 shift valve 238 through the intermediary of the 3-4 shuttle valve 240 and the overdrive servo regulator valve 242.

Reduced throttle and zero throttle ratio changes from the third ratio to the fourth ratio are controlled by 3-4 upshift pressure control backout valve 244, which is sensitive to throttle pressure received from throttle valve pressure limit valve 246. A reduced engine throttle or zero engine throttle ratio change from the second ratio to the third ratio is controlled by 2-3 upshift pressure control backout valve 248 which regulates the timing of the engagement and disengagement of the direct clutch 192.

The timing and shift timing of the ratio change from the intermediate ratio to the direct drive ratio upon movement of the 2-3 shift valve, the quality of the shift being controlled in part by 2-3 accumulator 252. A speed signal which is used for the various shift functions is developed by a governor assembly 254 which, as explained previously, is drivably connected to the output shaft 202 shown in FIG. 1C. That signal cooperates with a torque signal referred to in the specification as a throttle valve signal which is developed by throttle valve 256. The torque signal received from the throttle valve 256 acts upon the shift valves, more particularly the modulator valves for the shift valves. A ratio change from the second ratio to the direct drive ratio is timed by the output signal received from 2-3 modulator valve 258 which regulates the TV limit pressure received from the TV limit valve 246 before it is distributed to the spring side of the 2-3 shift valve 234. Similarly, TV modulator valve 260 controls the magnitude of the throttle pressure made available to the 3-4 shift valve 238, thus providing the necessary shift delay during acceleration. The 2-3 throttle pressure modulator valve 258 also is directed to the 1-2 shift valve 232 and similarly delays the 1-2 upshift.

The pressure made available to low-and-reverse brake servo 130 is regulated by a low servo modulator valve 262 which reduces the magnitude of the pressure in the servo as the mechanism is conditioned for low speed ratio operation but which allows a pressure buildup to occur during reverse drive operation. Brake band 172 is applied both in low and reverse.

Referring next to FIG. 8 I have shown a composite view of the valve elements and have indicated by appropriate shading those elements that are actuated and which are pertinent to the conditioning of the mechanism for forward drive operation following initial engagement of the forward drive clutch. The pump 212 distributes pressure to the main regulator valve 218 which comprises a valve spool having three spaced valve lands 264, 266 and 268. The valve spool regulates the pressure at a value that is determined by the value of the force of springs 270 acting in an upward direction on the valve spool. That force is complemented by the forces distributed to the valve spool by oil pressure booster valve 272, which comprises three spaced valve lands 274, 276 and 278 of progressively decreasing diameter. Pressure is regulated by the main regulator valve 218 and distributes the regulated pressure to passage 280. The pressure is made available to the main pressure regulator valve 218 in passage 282, which extends to the converter 14. Passage 280, which contains regulated pressure, communicates through a check valve control orifice plate 284 with the 3-4 accumulator which comprises a piston 286 that cooperates with accumulator chamber 288 to define opposed pressure chambers. When the lower pressure chamber is pressurized, the piston 286 moves upwardly against the force of accumulator spring 290. Pressure is distributed to the upper end of the accumulator piston through passage 292.

Line pressure passage 294 extends from regulated line pressure passage 280 to the manual valve 236 which includes a valve spool 296 having valve lands 298, 300 and 302. Valve spool 296 can be shifted to any one of the positions indicated in FIG. 8 by reference characters P, R, N, D, 3 and 1. When the manual valve 236 is positioned as shown in FIG. 8, it is capable of conditioning the control valve system for automatic operation in any of the four forward drive ranges.

Control pressure is distributed to the manual valve 236 from line 280 through passage 294 to the space between the valve lands 296 and 298, which causes control pressure to be distributed to throttle valve 256 and to the 2-3 shift valve 234. Pressure is distributed through the 2-3 shift valve 234 through passage 304 and through that valve to passage 306 which extends to the oil pressure booster valve 272. The pressure in passage 306 acts on the differential area of lands 274 and 276 which produces a force that augments the force of the valve spring 270 so that upon a 2-3 upshift the regulated pressure made available to the control circuit is reduced to a value that is not in excess of the pressure that is required to maintain direct clutch engagement.

Line pressure from the main pressure regulator valve 218 is distributed also through the manual valve 236 to passage 308 which extends to the governor assembly 254 and to the 3-4 shift valve 238. That pressure passes through the 3-4 shift valve 238 to the orifice control valve 250, passage 310 providing the fluid communication between the 3-4 shift valve 238 and the orifice control valve 250. Pressure in passage 310 passes directly from the orifice control valve 250 to the 2-3 backout valve 248 through passage 312. The fluid connection on the downstream side of the 2-3 backout valve 248 is provided by passage 314 which extends to the forward clutch 110 and pressurizes the annular piston for the forward clutch. The same pressure is distributed through check valve 316 to the upper side of piston 318 for the 2-3 accumulator 252. The pressure in the accumulator chamber on the upper side of the piston 318 develops a force that opposes the accumulator spring force of spring 320. As the clutch pressure builds up in the forward clutch, corresponding pressure builds up on the top side of the piston 318 and strokes the piston 318 in a downward direction against the opposing force of the spring 320 thus providing a gradual pressure increase that cushions clutch engagement.

An orifice A (see FIGS. 29-31) is located in passage 314 and pressure distributed through the 2-3 backout valve 248 from passage 312 to passage 314 must pass through that orifice, which controls the rate of engagement of the forward clutch.

Regulated line pressure is distributed to the governor assembly 254. This governor assembly 254 comprises a pair of spaced valve lands 322 and 324 of differential area. It includes also an exhaust orifice 326 controlled by valve land 324. A valve spring urges the valve lands in a radially inward direction, thus producing a modulated pressure in governor pressure passage 327. This is a measure of the rotating speed of the output shaft 202. For a particular description of a governor assembly of the kind shown in FIG. 8, reference may be made to U.S. Pat. Nos. 3,431,928; 2,711,749; 2,889,844; 2,911,987; 3,048,184 and 3,139,102.

Governor pressure in passage 327 is distributed to the upper end of both the 1-2 shift valve 232 and the upper end of the 3-4 shift valve 238. Governor pressure is distributed also through governor pressure passage 330 to the lower end of the valve spool for the 2-3 shift valve 234.

Reference will be made in the following description of FIGS. 9 through 27 to the various control functions. Some of these functions are similar to those functions described in prior art U.S. Pat. Nos. 3,336,815; 3,424,037; 3,327,554; 3,400,612; 3,593,598; 3,095,755; 3,446,098; 3,393,585 and 3,295,387. Those functions that are not described in those prior art patents will be described more particularly in this specification. More particularly this specification will describe the function and operation of the throttle valve system and the relationship of the throttle valve system to the 2-3 backout valve 248 and the 3-4 backout valve, 244 the fail-safe feature of the throttle valve system and the throttle pressure versus travel characteristic of the throttle valve assembly. It will describe also the function of TV limit valve 246, the 3-4 backout valve 244, the 2-3 backout valve 248, and the 2-3 capacity modulator 248 and its relationship to the 2-3 accumulator 252. The orifice control valve 250 which acts in combination with the 2-3 capacity modulator valve 558 and the 2-3 accumulator 252 also will be described in particular.

The overdrive brake band is applied by servo 227 as explained previously. That servo includes a piston 328 (see FIG. 7A) positioned in an overdrive servo cylinder in cooperation with a cylinder to define two pressure chambers indicated in FIG. 7A as the release pressure chamber and the apply pressure chamber, the former being above the piston 328 and the latter being below the piston 328. Pressure is distributed from the manual valve 236 when it is positioned as shown in FIG. 8 to the 2-3 shift valve 234 through passage 331 and through the 2-3 shift valve 234 to passage 332 and the release side of the servo piston 328 thereby disengaging the overdrive servo 227 and maintaining it in an off position. Line pressure from the manual valve 236 is distributed also through passage 334 to the 1-2 accumulator valve 228 and through connecting passage 336 to the 1-2 shift valve 232. The presence of pressure in passage 334 will cause the 1-2 accumulator valve 228 to be stroked in an upward direction to condition the accumulator valve 228 for controlling the subsequent upshift from the low ratio to the intermediate ratio as will be explained subsequently.

The 2-3 backout valve 248 comprises a valve spool having spaced valve lands 338, 340, 342, 344 and 346. A valve spring acts on the land 346 to urge normally the valve spool of the 2-3 backout valve 248 in the left-hand direction as seen in FIG. 8. When it is in that position, communication is established between passages 312 and 314 through the orifice A (FIGS. 29-31) previously. In FIG. 9 I have shown the condition of the valve elements for a control system when the manual low valve 236 is shifted to the manual low start position No. 1. At that time regulated line pressure from passage 294 is distributed to passage 308 through the space between valve lands 298 and 300, thus controlling the application of the forward clutch 110 as explained previously with reference to FIG. 8. When the manual valve spool 296 is positioned as shown, however, pressure is distributed around valve land 300 to line pressure passage 348 which extends to the 1-2 shift valve 232. Shift valve 232 comprises a valve spool having a valve land 350 and a valve land 352 which accommodate transfer of pressure from passage 348 to passage 354 extending to the low servo modulator valve 262.

Modulator valve 262 is best seen in FIG. 9A. It comprises a valve spool having lands 356 and 358 of differential diameter. The pressure of passage 362 creates a pressure force on the differential diameter which opposes the force of valve spring 365. This produces a regulated reduced pressure in passage 362 on the downstream side of the valve 262, reverse pressure passage 364 acting at this time as an exhaust port. The regulated pressure in passage 362 is distributed to the low-and-reverse servo 172. The reduced pressure in passage 362 acts on the top of land 358 to oppose the force of the spring 365. Thus the low-and-reverse servo 172 becomes applied with a reduced pressure that is sufficient to maintain manual low operation. The pressure that is applied to the low-and-reverse servo 172 is lower than the pressure that is necessary for reverse drive operation. Hence, excessive pressure is not used because of the operation of the low servo modulator valve 262. The overrunning brake 174 will not overrun when the band is applied. Thus the transmission is capable of engine braking. When the valve system is in a condition as shown in FIG. 9, the mechanism is incapable of shifting to the second ratio. This function can be understood best by referring to FIG. 10. As seen in FIG. 10, the control pressure is made available to passage 348 and is distributed to the 1-2 shift valve 232. It passes through the 1-2 shift valve 232 to the passage 354, as explained previously. Pressure in passage 348 is distributed through 3-way check valve 366 to passage 368 to the lower end of the 1-2 shift valve 232.

The 1-2 shift valve 232 includes, in addition to the valve lands 350 and 352, a valve land 370 of larger diameter than the diameter of land 352, a land 372 and a land 374. Pressure in passage 368 is distributed to the lower end of the land 374 and urges the 1-2 shift valve 232 in an upward direction against the opposing force of governor pressure acting on the upper end of the land 370. Line pressure also is distributed from passage 348 and through passage 376 to the 2-3 TV modulator valve 258. It passes through that valve to the differential area of lands 352 and 370, thus contributing to the upward force acting on the 1-2 shift valve spool 232.

Pressure passes through passage 354 to the 2-1 scheduling valve 230 as described earlier. Pressure from passage 368 is distributed also to the lower end of land 374 to supplement the upward hydraulic force on the 1-2 shift valve 232. When the 2-1 scheduling valve is in the downward position, line pressure from passage 354 is distributed directly to passage 377, which causes the 1-2 shift valve 232 to move in an upward direction and to be locked in that position. For purposes of clarity the 2-1 scheduling valve 230 has been shown in an enlarged form in FIG. 10A. The 1-2 shift valve 232 then will be incapable of effecting a ratio change to the intermediate ratio regardless of the magnitude of the governor pressure acting on the upper end of the land 370.

If the manual valve 236 is moved to the manual low position from either the overdrive range of the direct drive range, the transmission will shift first to the second ratio, assuming that the vehicle is traveling at a cruising speed in third or fourth ratio. As the speed decreases, an automatic downshift will occur to the first ratio. To control this shift the 2-1 scheduling valve 230 shown in FIG. 11 and in FIG. 11A is used. The 2-1 scheduling valve 230 determines the pressure under which a 1-2 shift valve will move to the downshift or first ratio position.

In FIGS. 11 and 11A it is seen that the 1-2 shift valve 232 first is moved during cruising in the third ratio or the fourth ratio to the upshift position under the influence of governor pressure. When it is upshifted, passage 354 becomes exhausted through exhaust orifice 380 in the 1-2 shift valve. Passage 376, which is pressurized with line pressure as explained with reference to FIG. 10, communicates with passage 382 through the 2-3 modulator valve 258, thus distributing pressure to the 2-1 scheduling valve 230. The pressure acts on the differential area of lands 384 and 386 of the 2-1 scheduling valve 230. The force produced by the pressure on that differential area is opposed by the force of valve spring 388. Thus the valve 230 acts as a regulator valve to produce a 2-1 scheduling valve pressure in passage 390 which is distributed to the lower end of the 1-2 shift valve land 374. The 1-2 shift valve is controlled by the magnitude of the 2-1 scheduling valve pressure in passage 390, line pressure is made available to the 2-1 scheduling valve 230 through passage 354.

With the regulated pressure acting on the shift valve land 374, the shift valve 232 will move to the low ratio position. Thus the transmission will be locked in the low ratio as explained with reference to FIG. 10. Full line pressure thus acts on the lower end of land 374 since passage 382 is brought into communication with passage 390 and with passage 377.

The 2-1 scheduling valve 230 acts as a pressure regulator for producing a shift point establishing pressure for the 1-2 shift valve 232 as the vehicle is coasted from a cruising condition to a low speed condition following movement of the manual valve to the number 1 range. Upon a decrease in governor pressure to a calibrated value, the 2-1 scheduling valve 230 functions merely to transmit line pressure to the lower end of the land 374 as shown in FIGS. 10A and 10.

FIG. 12 shows the condition of the control circuit when it is in a condition for reverse drive operation with the reverse clutch 130 engaged and the low-and-reverse brake band 172 applied. The manual valve 236 is shifted to the position R as indicated in FIG. 12. Line pressure from the line pressure line 294 is transferred through the manual valve space between lands 300 and 302, thus pressurizing passage 348 which extends to the space between the lands 350 and 352 of the 1-2 shift valve 232. That pressurizes passage 354 which extends to the low servo modulator valve 262. Pressure is distributed also from line pressure passage 294 through the manual valve 236 to the passage 394, which also extends to the low servo modulator valve 262. A fluid connection to the low servo modulator valve 262 and the 1-2 shift valve 232 at this time is established by the pressurized passage 354. The output side of the low servo modulator valve 262 communicates with the low-and-reverse brake servo 172 through passage 362 previously described, so that the low-and-reverse servo 172 is pressurized with a maximum line pressure, unreduced by the low servo modulator valve 306.

Passage 394 which is pressurized upon movement of the manual valve 236 to the reverse position R communicates with reverse clutch feed passage 396. Passage 394 also communicates with the oil pressure booster valve 272 and acts on the differential area of lands 276 and 278, thereby supplementing the force of the valve spring 270 to produce an augmented circuit pressure during operation in reverse drive.

Figure 13:
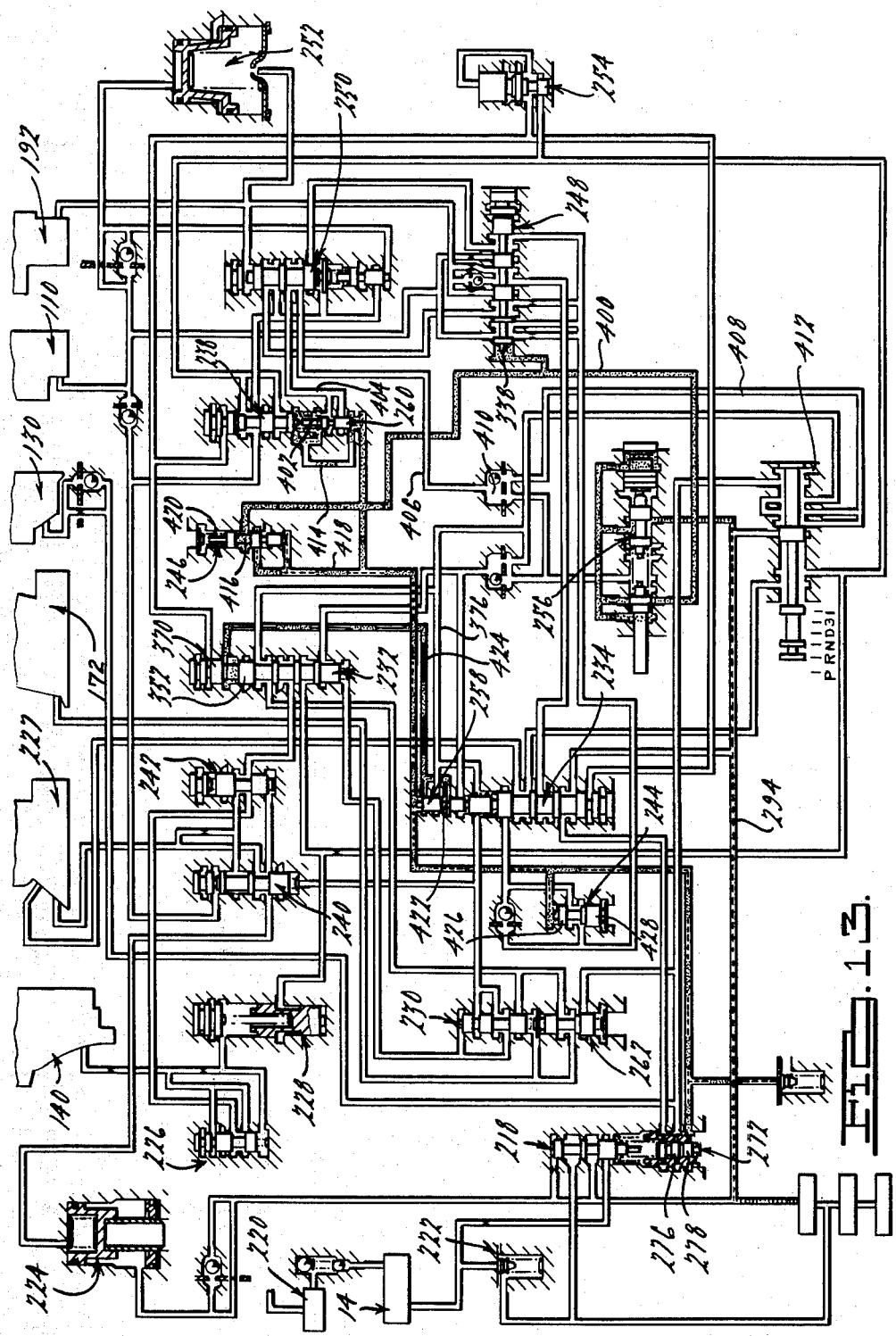
FIG. 13 shows the throttle valve system in combination with the valve circuit as a whole.

In FIGS. 13, 13A, 13B and 13C I have shown the throttle valve system and its relationship to the other elements of the circuit. Throttle valve assembly 256 is supplied with line pressure through passage 294, as explained previously. Throttle valve pressure passage 400 communicates with the output side of the throttle valve assembly 256. The throttle pressure in passage 400 is distributed to the left hand side of 2-3 backout valve 248 and acts on the end of valve land 338 to urge the 2-3 backout valve in a right hand direction as seen in FIG. 13. Passage 400 distributes also throttle pressure to the lower end of the 3-4 TV modulator valve 260 at the base of the 3-4 shift valve 238. The 3-4 TV modulator valve 260 is a valve spool that is subjected to the spring force of valve spring 402 in the 3-4 shift valve assembly. The same spring 402 acts in an upward direction on the 3-4 shift valve 238. Passage 404 communicates with the valve chamber in which the 3-4 TV modulator valve 260 is situated and extends to the orifice control valve 250. In the condition shown in FIG. 13, passage 404 is exhausted through the orifice control valve 250 and through passage 406, which communicates with passage 408 through 3-way check valve 410, passage 408 being exhausted through the manual valvve exhaust port 412. Thus, the 3-4 TV modulator valve 260 modulates the pressure in throttle pressure passage 400 to produce the shift pressure signal in passage 414 which acts on the lower end of the 3-4 shift valve 238 to supplement the force of the valve spring 402.

Passage 400 communicates directly with the TV limit valve 246. This valve comprises a valve spool 416 having spaced valve lands which provides communication between passage 400 and the TV limit pressure passage 418 and which provides also a differential diameter on which the output pressure in passage 418 may act to oppose the force of the spring 420.

The TV limit valve 246 establishes an upper limit for the pressure in passage 418. When the pressure in passage 400 exceeds an established limit determined by the calibration of the TV limit valve 246, the valve spool 416 will move upwardly so that it begins to regulate and produce a modified pressure in passage 418. Passage 418 extends to the 2-3 TV modulator valve 258 located at one end of the 2-3 shift valve 234. Valve spring 422 acts on the 2-3 shift valve as well as the 2-3 modulator valve 258. The 2-3 modulator valve 258 thus is capable of establishing a modulated pressure in passage 424, which acts on the upper end of the 2-3 shift valve 234 and on the differential area of the 1-2 shift valve defined by valve lands 352 and 370, thus producing a shift delay force on the 1-2 shift valve. Under the condition shown in FIG. 13, the exhaust path for passage 424 is passage 376 since it communicates with exhausted passage 408.

The TV limit pressure in passage 418 is distributed also to one end of the 3-4 backout valve 244. That valve comprises a valve spool having differential diameter valve lands 426 and 428. The TV limit valve pressure in passage 418 is distributed also to the lower end of the oil pressure booster valve 272 and acts on the differential diameter of lands 274 and 276, thus providing an increased circuit pressure upon an increase in the value of the throttle pressure. The influence of the throttle pressure on the circuit pressure, however, is limited by the TV limit valve 246. Line pressure from the pump is supplied to the throttle valve 256 whenever the engine is running and throttle pressure is developed in passage 400. As soon as the engine throttle is opened slightly, the throttle pressure that is developed in passage 400 produces a force on the 2-3 backout valve 248 that causes the 2-3 backout valve 248 to move in a right-hand direction. The upper limit for the throttle pressure that is established by the TV limit valve 246 in one operating embodiment of this invention is about 85 psi. If the TV pressure falls below 85 psi, it will distribute unregulated TV pressure to the passage 418. If the TV pressure in passage 400 exceeds 85 psi, the pressure in passage 418 will not rise above that value. The TV pressure is applied also to the 3-4 TV modulator valve 260 to produce the 3-4 shift and the output of the TV limit valve 246 is applied to the 2-3 modulator valve 258 to produce a modulated TV pressure for controlling the 2-3 shift and the 1-2 shift. The 3-4 backout valve 244 also is controlled by the TV pressure at closed throttle when the TV pressure in passage 400 is zero.

The 3-4 backout valve 244 regulates the pressure in the overdrive servo release chamber as apply pressure is applied to the overdrive servo as will be explained subsequently, thereby cushioning the operation of the overdrive servo 227 during a so-called minimum or zero throttle backout ratio change from the third ratio to the fourth ratio.

TV limit pressure in passage 418 acts on the differential diameter of lands 276 and 278 of the oil pressure booster valve 272, thereby increasing the circuit pressure as throttle pressure increases, thus line pressure will be boosted in proportion to the TV pressure up to about 85 psi TV pressure. But beyond that there is no other boost due to increases in throttle valve pressure. This avoids the possibility of development of excessive line pressures which will cause damage to the pump and to the clutches and brake servos.

Figure 13A:
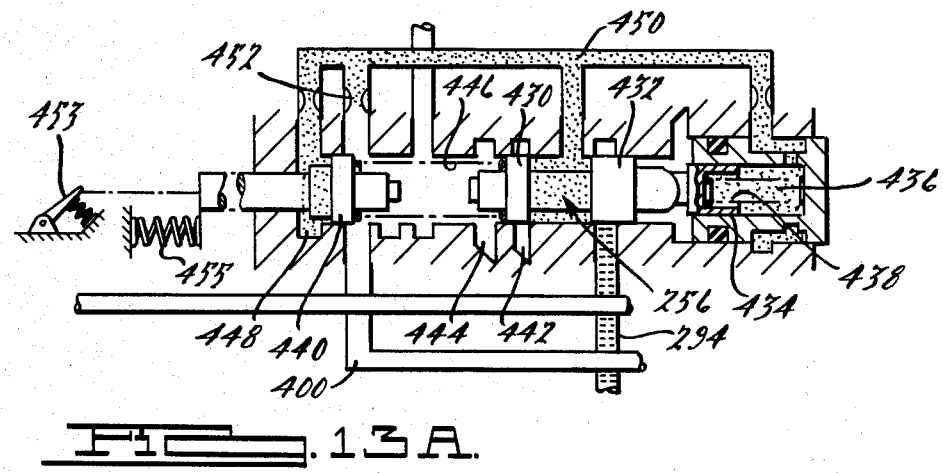
FIGS. 13A, 13B and 13C show a sub-assembly view of the throttle valve elements for the system of FIG. 13.
Figure 13B:
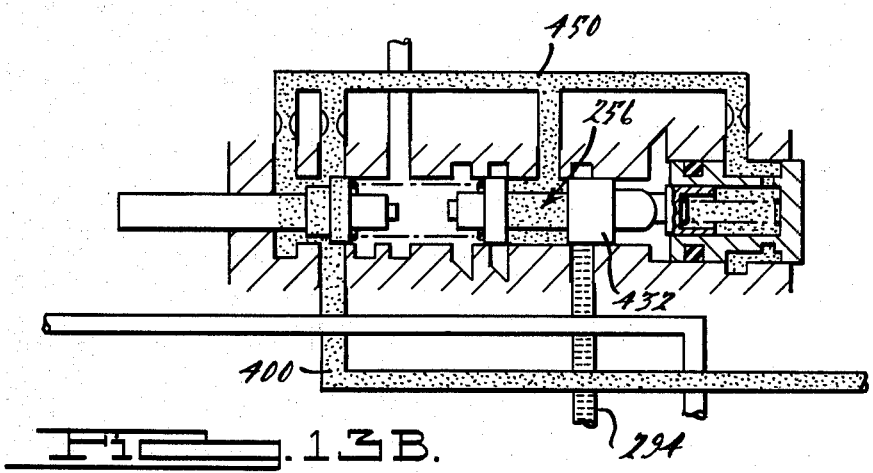
Figure 13C:
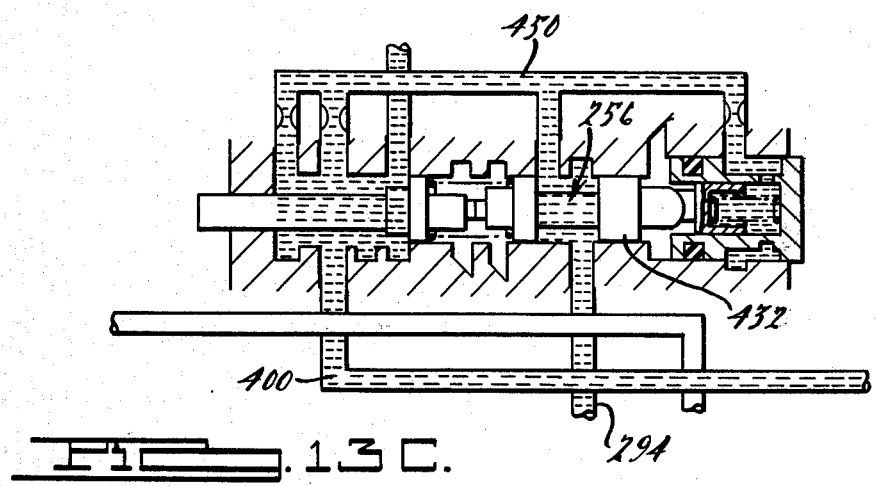

As seen in FIGS. 13A, 13B and 13C the throttle valve 256 comprises a valve spool with two spaced valve lands 430 and 432. A third valve land 434 on a separate valve element is situated in a valve sleeve which defines a pressure chamber 436 in which is disposed throttle valve spring 438. A throttle valve plunger 440 is located in alignment with the valve spool of throttle valve 256, and it comprises a single valve land slidably situated in the throttle valve bore. Pressure is distributed through the throttle valve bore to passage 294. Exhaust ports are located in the throttle valve bore adjacent land 430, as shown at 442, and at a location intermediate lands 440 and 430 as shown at 444. Valve spring 446 is located between the throttle plunger that carries land 440 and the valve spool for throttle valve 256.

Pressure chamber 436 communicates with pressure chamber 448 and with the space between the valve lands 430 and 432, crossover passage 450 providing such communicating. Passage 450 communicates also with the space between lands 440 and 430. An orifice 452 is located between crossover passage 450 and the space between lands 440 and 430.

As the engine throttle control 453 (FIG. 13A) is advanced, the throttle plunger moves the land 440 and compresses the spring 446 thereby causing the throttle valve spool 256 to modulate the pressure in passage 294 to produce a resultant throttle pressure in passage 400. The regulated throttle pressure acts on the left hand side of the land 440 thereby assisting in the movement of the throttle plunger and eliminating the high driver effort that is sometimes necessary to actuate a transmission throttle valve upon movement of the engine throttle.

A mechanical linkage mechanism is disposed between the engine carburetor throttle and the throttle plunger and the magnitude of the TV pressure is determined by the force of the TV spring 446. The effort required to compress the spring is reduced by the so-called pressure feedback feature and a uniform actuating force then is available since the greater compression of spring 446 is offset by the increase in the pressure force acting on the left hand side of the valve land 440. The linkage interposed between the throttle plunger and the engine carburetor throttle includes a torsion spring (schematically shown at 455 in FIG. 13A) which tends to move the throttle plunger toward the wide open throttle position if the linkage from the carburetor should become disconnected. The torsion spring, whenever the engine is running, will move the plunger towards the wide open throttle position thus tending to increase the throttle pressure to its maximum valve. This, of course, results in a maximum line pressure and that maximum line pressure is then available whenever a linkage failure occurs, thereby preventing the clutches and brake bands of the transmission from slipping and failing if the engine is operated under these conditions at heavy throttle.

FIG. 13A illustrates the closed throttle condition. At that time the throttle plunger assumes its maximum leftward position. The force of the spring 446, even when the engine throttle is closed, is sufficient to overcome the force of the preload spring 436 acting on the right hand end of the throttle valve land 434. The regulated throttle pressure acts on the right hand end of the land 434 to resist the movement of the plunger thus producing a regulating action. The orifice 452 at closed throttle tends to leak a certain amount of throttle pressure through the exhaust port 444. At closed throttle passage 400 is in communication with the space between lands 440 and 430, and since that space is exhausted through exhaust port 444 the magnitude of the throttle pressure in passage 400 made available to the control circuit also is zero. Movement of the engine throttle from the closed throttle setting to an initial small movement will cause the land 440 to block the flow through the orifice 452. Thus the throttle valve pressure in passage 400 will rise immediately from a value of zero to whatever value exists in the passage 450. This is the condition that exists in the FIG. 13B.

FIG. 13C shows the condition of the valves during wide open throttle or kick down condition. When the engine is operated at full throttle, the throttle linkage positions the plunger as shown in FIG. 13C and the plunger contacts the throttle valve 256 and moves it out of its regulating position so that it opens up the line pressure in passage 294 to the throttle pressure passage 400. Thus the throttle pressure in passage 400 immediately rises to the full line pressure that exists in passage 294.

Figure 14:
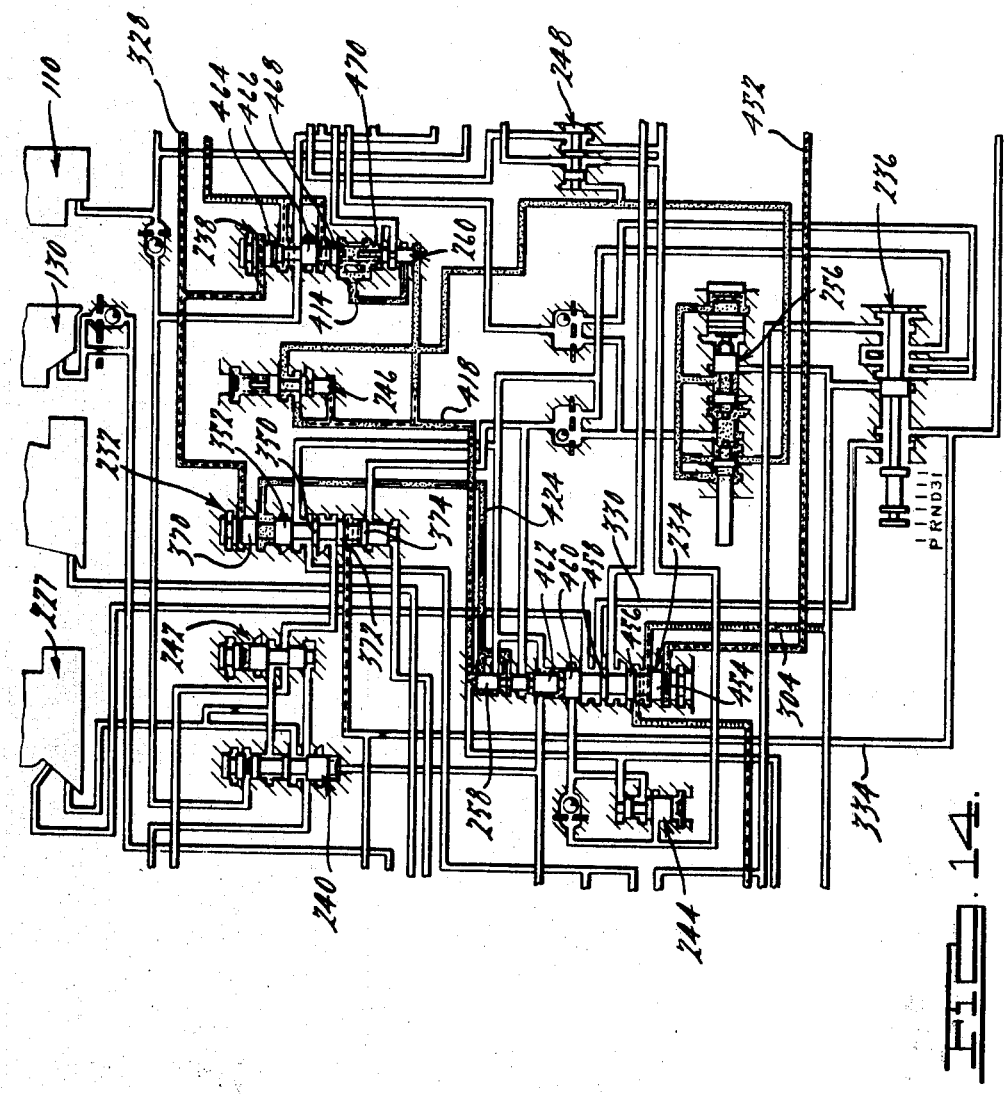
FIG. 14 is a partial valve diagram showing the modulated TV pressures used for delaying upshifts to the second ratio, to the third ratio and to the fourth overdrive ratio.

In FIG. 14, 14A and 14B there is illustrated the modulated pressures and other pressures that are used to delay the automatic upshifts for the 2-3 shift valve and the 3-4 shift valve 238 as well as for the 1-2 shift valve. Governor pressure in passage 452 acts on lower land 454 of the 2-3 shift valve 234. That valve includes also valve lands 456, 458, 460 and 462.

The 2-3 shift valve 234 is urged in a downward direction as seen in FIG. 14 by the valve spring disposed between the 2-3 modulator valve 258 and the land 462 and by a valve spring that acts on the upper side of the land 460. Line pressure from passage 304 is distributed through the space between lands 456 and 454 to the passage 306 extending through the booster valve 272 as explained previously. Passage 330 extends to the space between lands 460 and 458, such space communicating with the valve in the position shown in FIG. 14 with passage 332 extending to the overdrive servo release chamber on the upper side of the piston 328 of servo 227. The 3-4 shift valve 238 has three valve lands as shown at 464, 466 and 468 in FIG. 14. It includes also a valve spring 470 that moves the valve 238 in an upward direction as seen in FIG. 14 against the opposing force of governor pressure. Governor pressure passage 328 transfers governor pressure to the upper end of the land 464. The modulated throttle valve pressure in passage 414, previously described with reference to FIG. 13, establishes a downshift force on valve land 468. Passage 404 acts as an exhaust passage for 3-4 TV modulator valve 260 since it is exhausted under the conditions shown in FIG. 14 through the orifice control valve 250, 3-way check valve 410 and passage 408. The 3-way check valve 410 communicates with the orifice control valve 250 in passage 406.

The 2-3 modulator valve 258 is a single diameter valve spool that is subjected to the TV limit pressure in passage 418. It produces a pressure force on the 2-3 shift valve that opposes the governor pressure force due to the governor pressure in passage 452. The magnitude of the modulated pressure acting on land 462 is determined by the TV limit pressure and the spring force.

The modulated pressure in passage 424 for the 2-3 shift valve 234 acts also on the 1-2 shift valve 232. The 1-2 shift valve comprises spaced valve lands 370, 352, 350, 372 and 374 as seen in FIG. 14. The modulated pressure in passage 424 acts on the differential area defined by lands 370 and 352 to create a downshift force or a shift delay force on the 1-2 shift valve 232 that opposes the force of the governor pressure in passage 328. Line pressure in passage 334 and in passage 336 acts on the differential area of lands 372 and 374 to create a further shift delay. Passage 334 is not shown in a pressurized state in FIG. 14, however, since the manual valve 236 in that Figure is shifted to the neutral position rather than position D.

A shift delay pressure on the 2-3 shift valve 234, in addition to the shift delay produced by the modulated pressure in passage 424, is developed by the line pressure in passage 304 which acts on the differential area of shift valve lands 456 and 454.

Shift delay pressures acting on the 3-4 shift valve 238, in addition to the shift delay pressure developed by the modulated pressure in line 414, are the pressure forces due to the pressure in passage 308. That pressure acts on the differential area of lands 464 and 466 and on the separate differential area defined by lands 466 and 468.

In FIG. 15 there is shown an operating mode of the control valve circuit when the manual valve 236 is shifted to the drive range position when the vehicle is in first gear ratio. This is the operating mode that conditions the mechanism for automatic ratio changes as will be explained with reference to FIGS. 16, 17 and 18. Line pressure in the FIG. 15 mode is distributed to the 1-2 shift valve 232 through passage 336 and 334 and that line pressure is blocked by lands 372 and 374. Pressure is distributed also from passage 336 to the lower end of the 1-2 accumulator valve 228 thus causing the 1-2 accumulator valve piston 482 to be stroked in an upward direction against the opposing force of spring 484 in preparation for a 1-2 automatic upshift.

Line pressure is distributed also from passage 304 to the 2-3 shift valve 234 at the space between valve lands 456 and 454 as seen in FIG. 15. Line pressure from passage 330 extends through the 2-3 shift valve 234 to the passage 323 which extends to the release side of the overdrive servo 227. The forward clutch also is applied as pressure is distributed through passage 308, through the 3-4 shift valve to crossover passage 310 and through the orifice control valve to passage 312 and hence through the 2-3 backout valve 248 to the passage 314. This circuit was described previously with reference to FIG. 8. It should be noted that the orifice control valve 250 is urged in an upward direction at this time, as seen in FIG. 15, as the pressure in passage 310 acts on lower valve land 486. The orifice control valve 250 includes, in addition to the land 486, valve land 488 and a valve spring 490 which urges the valve in a downward direction as seen in FIG. 15. Pressure in passage 310, which is distributed to the forward clutch 110 through the circuit previously described, is made available also to the upper end of the 2-3 accumulator 252 which was described also with reference to FIG. 8. The accumulator 252, as shown in FIG. 15, is fully stroked in contrast to the position that is illustrated in FIG. 8.

During initial engagement of the forward clutch 110 the time required to stroke the accumulator piston delays the pressure buildup in the forward clutch 110 and causes a cushioned clutch application. The 3-4 shuttle valve 240 also is in condition for operation. It is comprised of a valve spool 494 having spaced valve lands 496 and 498. The valve spool is biased in an upward direction, as seen in FIG. 15, by valve spring 500 seen in FIG. 8 but not in FIG. 15. The 3-4 shuttle valve spool 494 is pressurized at its upper end with line pressure which is distributed to it through passage 502. This passage communicates with passage 314 through one-way check valve 503, passage 314 being pressurized as described previously with reference to FIG. 8.

The shift valves receive a speed signal pressure as described in FIG. 8, but the magnitude of that signal is not sufficient to cause them to shift against the opposing shift delay pressures and against the opposing forces of the shift valve springs. It will be observed in FIG. 15 that the forward clutch 110 receives its pressure through the 3-4 shift valve 238 so that when the latter is upshifted to fourth ratio position, the forward clutch 110 will become disengaged.

The throttle pressure developed by the throttle pressure valve 256 is distributed in the condition shown in FIG. 15 throughout the valve circuit in the same fashion described previously with reference to FIG. 13. Throttle pressure causes the backout valves, both the 3-4 backout valve and the 2-3 backout valve to be shifted against their respective springs. It should be noted also in FIG. 15 that distribution of control pressure through the 2-3 shift valve 234 to passage 306 occurs to develop a line pressure boost. Distribution of pressure through that passage 306 is interrupted, however, immediately upon upshift of the 2-3 shift valve 234 to its direct drive position, thus causing a cutback in the magnitude of the regulated line pressure output of the main regulator valve. It should be noted also in FIG. 15 that throttle pressure from the throttle valve 226 is distributed to the lower end of the land 278 of the oil pressure booster valve.

Line pressure is distributed from passage 334 to passage 336 to the space between lands 372 and 374 on the 1-2 shift valve thereby conditioning the 1-2 shift valve for a subsequent 1-2 upshift.

Line pressure from pump 212 is distributed through the passage 280 to the differential area on the 3-4 accumulator 224 in the manner described with reference to FIG. 8.

The condition of the automatic control valves during an automatic 1-2 upshift, when the manual valve 236 is in the overdrive range position D, is shown in FIG. 16. The 1-2 shift valve 232 responds to an increased governor pressure in passage 328 and shifts to the upshift position against the force of the shift valve spring acting on the lower end of the 1-2 shift valve 232. This allows control pressure to be distributed from passage 334 to the overdrive servo regulator valve 242 through passage 504. Line pressure passes through that valve to passage 506 which extends to the 1-2 capacity modulator valve 226. Before a 1-2 ratio shift begins, the 1-2 capacity modulator valve and the 1-2 accumulator valve shown at 226 and 228, respectively, assume the positions shown in FIG. 16A. After the 1-2 shift begins but before it is completed the 1-2 capacity modulator valve 226 and the 1-2 accumulator valve 228 assume the position shown in FIG. 16B. At that instant in the shift interval line pressure is distributed to the 1-2 capacity modulator valve spool 508 which has two regulating valve lands 510 and 512. Valve spool 508 is urged in an upward direction by valve spring 511. Pressure is fed back to the top of land 510 through the capacity modulator output passage 514 and to the lower end of the land 512.

The regulated pressure that is produced in passage 514 is distributed to the upper end of the cylinder 520 of the 1-2 accumulator valve 228. The magnitude of the pressure in line 514 is about 5 psi higher than the pressure on piston 520. The upper side of the accumulator piston 520 is supplied through the orifice 522. The pressure in the top of the 1-2 accumulator valve forces the accumulator piston 520 in a downward direction and assists the accumulator valve spring 524. Those forces are opposed by the force produced by the pressure in passage 334 which is applied to the differential area of the two lands for the accumulator piston 520. This pressure regulation continues during intermediate clutch pressure buildup until the accumulator piston 520 is fully bottomed. When that occurs, there is no longer any pressure increase in passage 514 and the capacity modulator valve 226 then ceases to modulate. The pressures in the 1-2 capacity modulator valve 226 and the 1-2 accumulator valve 228 then rise to the full line pressure value. This condition is shown in FIG. 16C.

The condition of the valves during an automatic 2-3 upshift while the manual valve 236 is in the overdrive range is shown in FIG. 17. Governor pressure acts on the base of the 2-3 shift valve 258 and moves it to the upshift position. This allows pressure to pass from line 331 to passage 528 which extends to the 2-3 backout valve 248. Vent port 526 then is sealed from passage 528.

Line pressure from passage 528 passes through lands 342 and 344 of the 2-3 backout valve 248 and through orifice K (see FIGS. 29-31) in the 2-3 backout valve 248 to direct clutch feed passage 530. The pressure in passage 530 is distributed to the top of the orifice control valve 250 to cause the latter to move in a downward direction. That pressure is applied also to the lower end of the piston for the 2-3 accumulator 252 causing that piston to stroke in an upward direction, the effective pressure area on the lower end of the piston being greater than the effective pressure on the upper end of the piston. Pressure is forced through orifice K because of the fact that check valve 532 in the 2-3 backout valve 248, which normally bypasses the orifice K as well as orifice E, is closed by the pressure in passage 528.

As explained with reference to FIGS. 15 and 16, the piston of the 2-3 accumulator 252 was held in a downward direction by the clutch pressure in the forward clutch during operation in the first and second ratios. During the 2-3 upshift, however, the accumulator piston moves up and the pressure downstream of the orifice K assists the accumulator spring to force the piston of accumulator 252 upward. This causes an intensified back pressure flow from the smaller upper end of the accumulator chamber. This seats the check valve 316. The only escape for the flow from the upper side of the 2-3 accumulator is past the 2-3 capacity modulator valve 558. The modulator valve 554 moves outwardly and regulates that pressure. This regulation controls the force on the accumulator valve 558 and, therefore, controls the direct clutch apply pressure during the 2-3 shift interval. When the accumulator piston reaches the end of its travel, there is no longer any flow from the upper end of the accumulator piston; and direct clutch apply pressure then rises to the full line pressure.

A shift to the overdrive range during the automatic upshift mode is illustrated in FIG. 18. This requires a release of the forward clutch, the exhausting of the overdrive servo release pressure and the control of the overdrive servo apply pressure. The direct clutch remains applied, as explained with reference to FIG. 17. The 3-4 shift valve 238 moves under the influence of governor pressure in passage 328 which acts on the land 464 of the 3-4 shift valve assembly. That opens the forward clutch circuit to restricted exhaust. As the exhaust port 534 in the 3-4 shift valve assembly is brought into communication with passage 502, check valve 504 opens and permits flow from the forward clutch to the passage 502 and to the 3-4 shift valve exhaust port 534. At the same time it blocks distribution of line pressure from passage 308 to the forward clutch.

The exhausting of pressure from the forward clutch takes place through the check valve 504 and through the 3-4 shift valve 238. The flow path for this exhausting of fluid is designated in FIG. 18 by arrows. The exhaust flow path for the release side of the overdrive servo 227 takes place as flow from the release side is passed through passage 332, through the 2-3 shift valve 234 and then through the 3-4 backout valve, 244 the 2-3 backout valve 248 and the check valve 504 to the exhaust orifice 534 in the 3-4 shift valve 238. The pressure that acts on the upper end of the 3-4 shuttle valve land 496 also communicates through the same flow path followed by fluid from the forward clutch 110 to the 3-4 shift valve vent port 534.

The 3-4 shuttle valve 240, which is in the downward position during operation in the first, second and third ratios in the overdrive range, moves up under the influence of the spring 500 at the base of the valve during a ratio change to the fourth ratio position. This allows the output pressure from the overdrive servo regulator valve 242 to pass through the shuttle valve 240 to the base on the overdrive servo regulator valve 242 causing it to cease regulating. Pressure then is distributed through orifice 528 and passage 536. Pressure from the overdrive servo 227 regulator valve 242 to the apply side of the overdrive servo passes through orifice 538 as well as to the upper side of the 3-4 accumulator piston 286. This causes the accumulator piston 286 to move downwardly, thereby causing the pressure to be less than line pressure during its movement. The pressure on the underside of the 3-4 accumulator piston 286 is line pressure. The control pressure on the upper side of the 3-4 accumulator piston is applied to the overdrive servo piston and provides a controlled and cushioned overdrive band engagement to effect a smooth 3-4 upshift. As soon as the accumulator 224 is fully stroked, the control pressure rises to full line pressure.

Prior to the 3-4 upshift sequence, the overdrive regulator valve functions as a regulator valve and produces in the passage 536 a regulated pressure. This regulation occurs by the spaced valve lands 540 and 542. The lower end of the land 540 is connected to the upper end of the overdrive servo regulator valve 242 by an internal orifice that is shown in dotted lines in FIG. 18. The valve is urged normally downwardly by a valve spring as indicated. Land 542 is larger than land 540 so that the line pressure supplied to the overdrive servo regulator valve 242 is modulated to produce a controlled, reduced pressure in passage 536. This modified servo-apply pressure is available whenever the 1-2 shift valve 232 moves to the upshift position as line pressure is distributed through the space between valve lands 372 and 380 of the 1-2 shift valve 232 to the regulator valve 218.

In FIG. 19 I have illustrated the condition of the valves when the throttle valve is moved to the full wide-open engine throttle position. At that time line pressure in passage 294 is distributed directly through the throttle valve assembly 256 to the throttle pressure passage 400 so that throttle pressure is equal to line pressure. The output side of the TV limit valve 246 continues to distribute modified TV limit pressure in passage 418, as previously described, regardless of the rise in the magnitude of the pressure in passage 400 to full line pressure which comes through the bore in the orifice control valve during kickdown. In the FIG. 19 condition the high pressure passes through the 3-4 TV modulator valve 260 to the base of the 3-4 shift valve 238 causing it to upshift against the opposing influence of governor pressure. This, as explained previously, causes release of the overdrive brake servo 227. Line pressure is distributed also through 3-way check valves 366 and 410 to the upper end of the 2-3 shift valve 234 and to the differential area on the lower two lands 372 and 374 of the 1-2 shift valve 232 as well as to the lower end of the 3-4 shift valve 238 through the orifice control valve 250. If the speed of the vehicle is sufficient so that the increased downshift forces on the 2-3 shift 234 valve and the 1-2 shift valve 232 are sufficient to overcome governor pressure, downshifts will occur to the second ratio or the first ratio. The condition shown in FIG. 19, however, illustrates merely a downshift from the fourth ratio to the third ratio.

FIG. 20 illustrates the condition of the valve circuit when the transmission manual valve 236 is moved to the manual low position at closed throttle while the vehicle is standing still. The forward clutch 110 is applied at that time as well as the low-and-reverse brake band 172 to permit engine braking. The overrunning clutch or brake 174 complements the braking torque of the brake band 172 during forward drive operation in manual low under torque. The 3-4 accumulator 224 is stroked in an upward direction since the upper side of the piston 286 is exhausted through passage 292 and through the exhaust port in the 1-2 shift valve located between lands 350 and 372 on the 1-2 shift valve 232. Line pressure acts on the lower ends of the 3-4 shift valve 238, the 1-2 shift valve 232 and on the upper end of the 2-3 shift valve 258 forcing these valves to their downshift positions. When the 2-3 shift valve 258 is so positioned, line boost pressure is distributed to the oil pressure booster valve land 278 through passage 306, thus causing an increase in the regulated circuit pressure during manual low operation in low speed range (The same is true for the overdrive range).

Since the engine throttle is at the zero throttle setting in the FIG. 20 addition, throttle pressure is zero as explained previously.

The low servo modulator valve feed passage 546 is exhausted through the right hand end of the manual valve 236 so that the low servo modulator valve 262 cannot distribute line pressure to the apply side of the low and reverse servo 172. Pressure is distributed, however, to the low servo modulator valve 262 through the passage 354 which is pressurized by reason of the connection between passage 348 and passage 354 that is provided by the 1-2 shift valve 232. The low servo modulator valve 262 produces a low and reverse modulated pressure in passage 548 which extends to the low and reverse brake servo 172.

The low servo modulator valve 262 has a pair of regulating valve lands 550 and 552. The reverse servo feed passage 546 is exhausted and acts as an exhaust port for the low servo modulator valve 262. The regulating valve lands of the low servo modulator valve 262 are biased in an upward direction, as seen in FIG. 20, by a valve spring, thus causing the valve to regulate to produce a reduced pressure in passage 548, the magnitude of which is dependent upon the value of the spring for any given line pressure.

The forward clutch 110 is pressurized by line pressure distributed through the 3-4 shift valve 238 and the orifice control valve 250 in the fashion previously described.

The 1-2 shift valve 232 is locked in the position shown in FIG. 20 by line pressure acting on the spring end of the valve and to the line pressure acting on the differential areas of the valve lands. Similarly the 2-3 shift valve 234 is locked in place by the full line pressure extending to the upper end of that valve through the 2-3 TV modulator valve, and to the line pressure acting on the differential area of the valve lands of the 2-3 shift valve.

FIG. 21 shows the condition of the valve system during first gear engagement in overdrive range at closed throttle. The forward clutch 110 is applied as described previously with reference to FIG. 8 and the 2-3 accumulator 252 is fully stroked as shown as is the 3-4 accumulator 224.

FIG. 22 shows the condition of the valve system that exists during operation in second gear at part throttle in the overdrive range. FIG. 22, and also FIG. 21, show the valves in their respective positions just after the shift has been completed. The condition that exists during the shift interval for FIG. 22 was described previously with reference to FIG. 16, and FIG. 22 should be viewed simultaneously with FIGS. 16, 16A, 16B and 16C.

Main line pressure is regulated by the main oil pressure regulator valve 218 and distributed throughout the converter and lubrication system, as explained previously. The 3-4 accumulator valve 224 is moved upwardly by line pressure against the force of the accumulator valve spring. Since the 2-3 shift valve still is in the downshift position at this time, line pressure still is distributed to the boost valve 272 to cause an increase in the main oil pressure regulator valve output. Since throttle pressure now is available, as indicated in FIG. 22 in the passage 400, an auxiliary TV pressure force is exerted on the oil pressure booster valve 262 causing an increase in the line pressure because of the engine torque that accompanies the increased throttle pressure at this instant.

The TV pressure is now sufficient to actuate the TV modulator valves to produce a delayed upshift signal. The 3-4 backout valve 244 and the 2-3 backout valve 248 both are shifted to their inoperative positions as shown since throttle pressure acts on each of the backout valve ends.

Orifice A in the 2-3 backout valve 248 is bypassed through the shifted orifice control valve 250, passage 312, the 2-3 backout valve and to the forward clutch. Clutch apply pressure continues to hold the 2-3 accumulator valve 252 downward and to hold the 3-4 shuttle valve 240 against its spring force.

The governor pressure acting on the upper end of the 1-2 shift valve 232 is sufficient to move that valve against the opposing spring and hydraulic forces to permit a feed of line pressure through the overdrive servo regulator valve 242 and the 1-2 capacity modulator valve 226 to the intermediate clutch 140. The clutch apply pressure is distributed through orifice 522 (orifice F) to the spring end of the piston of the 1-2 accumulator valve 228. The accumulator 228, upon movement in a downward direction, cushions the application of the intermediate clutch 140. The release side of the overdrive servo 227 is pressurized because of the pressure that is distributed to it through passage 331 and the downshifted 2-3 shift valve 234 which connects passage 331 to passage 332. The overdrive servo regulator valve 242 continues to supply a modulated pressure to the apply side of the overdrive servo 227 as explained previously.

FIG. 23 shows the valve condition for third gear operation at ¾ engine throttle setting in the overdrive range after the shift has been completed. FIG. 17, in contrast, shows the upshift from the second ratio to the third ratio in the overdrive range at part throttle during the shift interval. Under the FIG. 23 condition, the 3-4 accumulator 224 is forced in an upward direction so that it can be conditioned for a subsequent 3-4 upshift. TV limit pressure from the TV limit valve 246 continues to be supplied to the main oil pressure booster valve 272 to provide a line pressure boost. The line pressure in passage 306 is exhausted through the exhaust port in the 2-3 shift valve 234 located between the lower valve land 454 and 456 on the 2-3 shift valve 234 which results in a reduction in the main oil pressure regulator valve output.

The 3-4 TV modulator valve 260 assumes a regulating condition under the influence of the throttle pressure acting on the lower end of that valve. This regulating action was explained with reference to FIGS. 14 and 15.

It will be seen that orifice K is in the fluid circuit that feeds the direct clutch as pressure is distributed to the 2-3 backout valve 248 through passage 528. Direct clutch pressure is distributed also at this instant to the bottom of the piston of the 2-3 accumulator 252 to cushion the shift to the third ratio as explained previously.

In FIG. 24 there is illustrated the condition that exists during operation in third gear at ¾ throttle when the manual valve 236 is in Range 3. The condition of the valves in FIG. 24 is similar to the condition of the valves in FIG. 23, but the fourth gear lockout is actuated through the passage 554 which communicates through check valve 410 and through the orifice control valve 250 to force the 3-4 shift valve 238 in an upward direction. The pressure that exists on the lower end of the 3-4 shift valve 238 is distributed through the check valve 410 and locks the shift valve 238 to prevent overdrive from occurring.

The upshift from the third ratio to the overdrive ratio is described with reference to FIG. 18. The valve system following the completion of that shift assumes the condition shown in FIG. 25. That is the condition that exists during normal cruising operation under steady state conditions with the transmission in the overdrive range. The 3-4 shift valve 238 in FIG. 25 has been shifted under the influence of governor pressure to its upshift position. This exhausts the forward clutch 110 through the exhaust port 534 in the 3-4 shift valve 238. The upper side of the 2-3 accumulator piston also is exhausted. Exhaust flow paths for the forward clutch 110 and the 2-3 accumulator piston are common and have been designated by arrows in FIG. 25. Similarly, the overdrive servo release pressure is exhausted through the 2-3 shift valve, through the 3-4 backout valve and through the 2-3 backout valve 248 as indicated also by the arrows in FIG. 25 that originate at the overdrive servo 227 and terminate at the 3-4 shift valve 238.

The 3-4 shift valve 238 has been moved downwardly in FIG. 25 against the opposing force of the spring by governor pressure as indicated thereby opening the exhaust flow path for the release side of the overdrive servo 227. Line pressure is supplied, as previously described, to the apply side of the overdrive servo 227 through the orifice 538 (orifice D). The 3-4 accumulator 224 cushions the shift since the accumulator piston has been stroked, as indicated, by the apply pressure for the overdrive servo 227.

Figure 26:
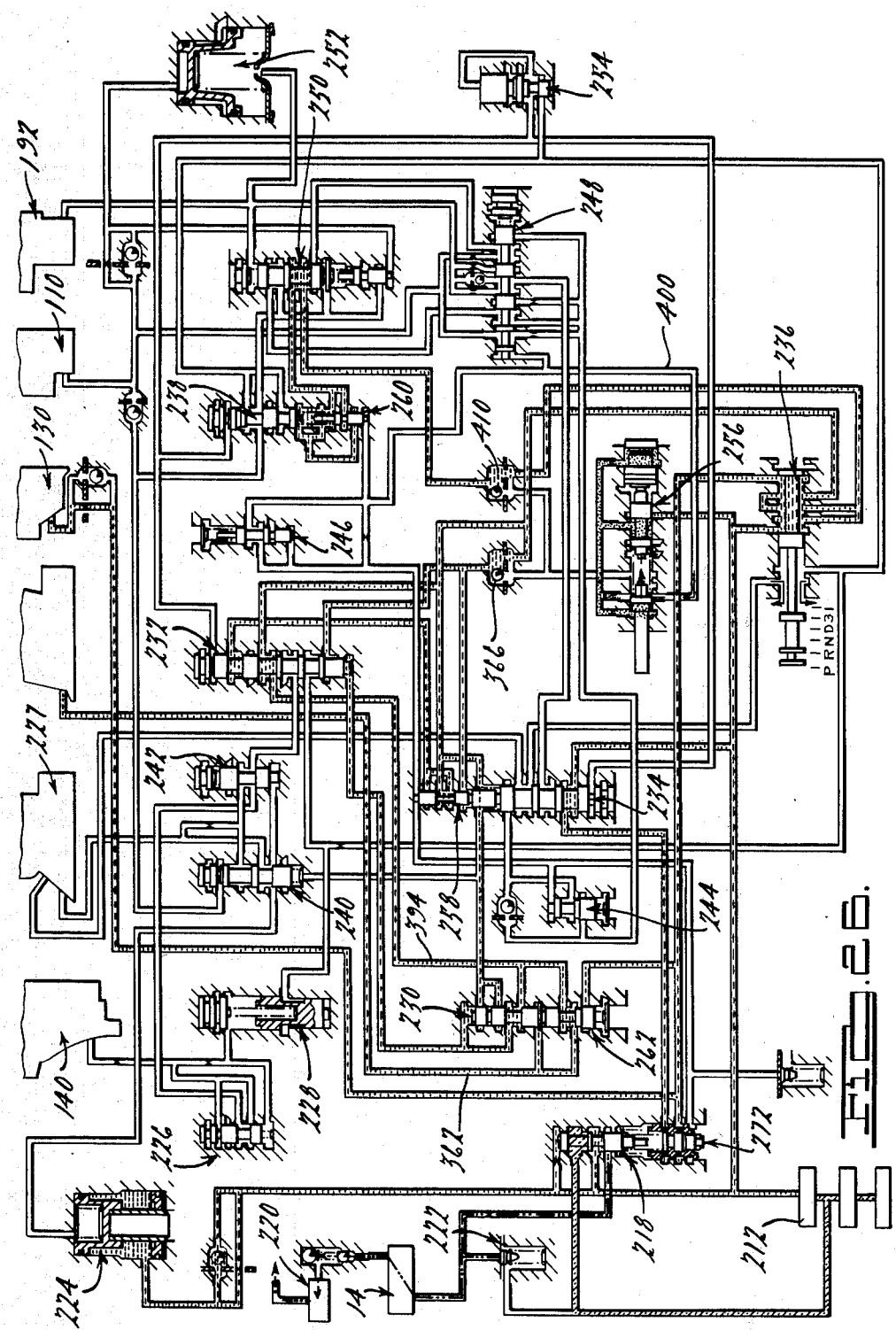
FIG. 26 is a view of the valve system when it is in condition for reverse drive operation at initial engagement at a closed engine throttle.

FIG. 26 shows the condition of the valve system during reverse drive at initial engagement with the throttle closed. The initiation of that shift before it is completed was illustrated in FIG. 12 and described earlier. In the FIG. 26 condition the low servo modulator valve 262 is moved to to establish a direct connection for delivering line pressure to the reverse servo feed passage 362. Governor pressure is absent in this drive mode and throttle pressure throughout the circuit is absent because of the closed throttle condition. Line pressure is distributed directly from the manual valve 236, which is in the reverse drive position R, to the check valve 410 and through the orifice control valve 250 to lock the 3-4 shift valve 238 in place. Pressure is distributed also through the check valve 366 to the various pressure lands on the 1-2 shift valve 232 which locks it in place. Similarly, the 2-3 shift valve 234 is locked in place by the same control pressure that is made available to the other shift valves.

Figure 27:
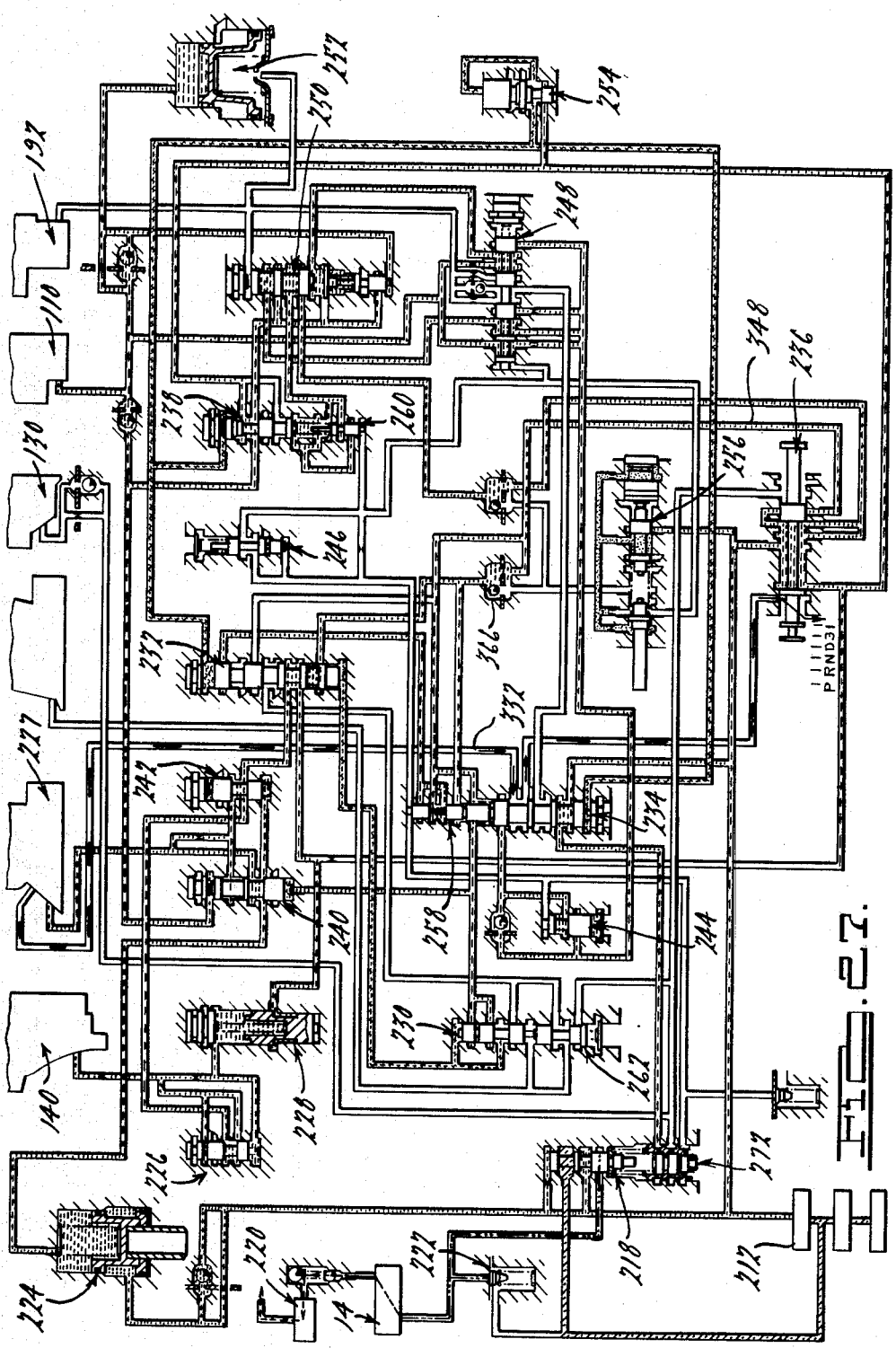
FIG. 27 is a view of the valve system when it is in condition for manual low operation at closed throttle above the 2-1 downshift speed.

FIG. 27 shows the condition of the valves during manual low operation with the manual valve in the No. 1 position at closed throttle when the vehicle is moving sufficiently fast so that the 2-1 downshift point has not been reached and the transmission operates in the second ratio. The throttle pressure in passage 400 under these conditions is absent because the engine throttle is closed. Thus the 2-3 backout valve 248 shifts in a left hand direction under force of its spring, and the 3-4 backout valve 244 shifts in an upward direction under the influence of its spring force. The forward clutch 110 remains applied under these conditions as it is supplied with fluid through the 3-4 shift valve 238, the orifice control valve 250, the 2-3 backout valve 248 and the orifice A (see FIGS. 29-31) in the 2-3 backout valve 248. Since the governor pressure is high enough to keep the 1-2 shift valve 232 in the upshift position, line pressure thus is available to hold the intermediate clutch 140 applied.

Line pressure is distributed from passage 348 and across the 2-3 shift valve 234 to the lower end of the 3-4 shuttle valve 240 so that the 3-4 shuttle valve 240 is held in an upward position. Line pressure acts on the overdrive servo regulator valve and holds it in a nonregulating condition, which is the downward position shown in FIG. 27. The line pressure on the apply side of the overdrive servo 227 thus is able to apply the overdrive servo. The release side of the overdrive servo 227 is exhausted through the flow path provided by passage 332 as indicated by the arrows. This flow path is defined in part by the 2-3 shift valve 234 and the end of the manual valve 236.

The 2-1 scheduling valve 230 produces a regulated pressure as described with reference to FIG. 11. That regulated pressure acts on the base of the 1-2 shift valve 232. This will cause the 1-2 shift valve 232 to downshift as governor pressure is reduced at lower road speeds.

Figure 6:
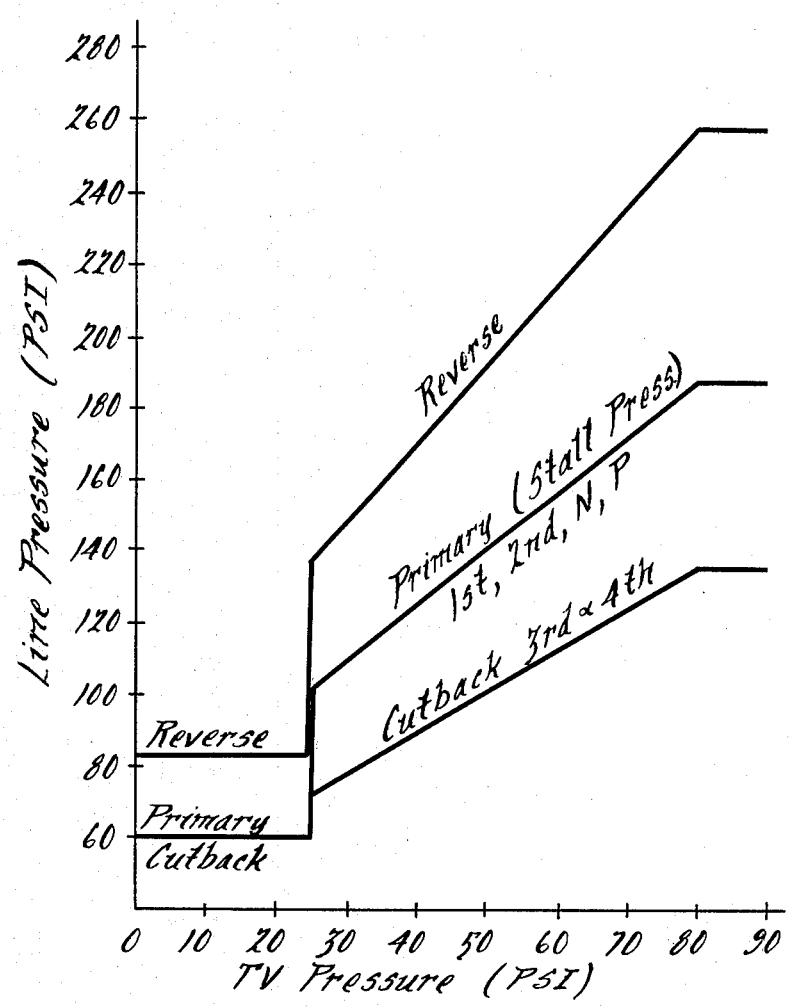
FIG. 6 is a chart that shows the relationship between line pressure and throttle pressure for reverse drive operation, first and second speed operation and cutback operation in third and fourth ratios.
Figure 5:
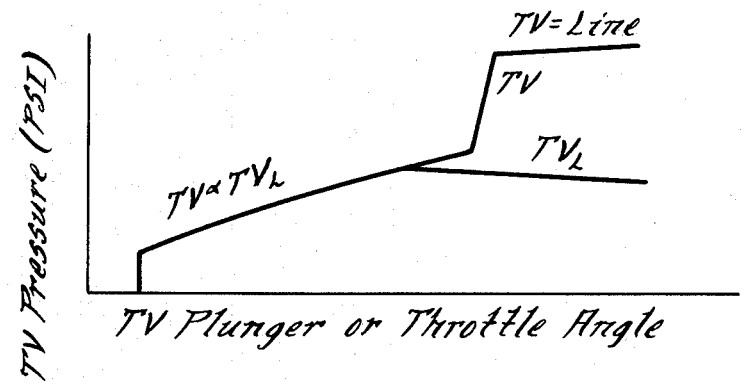
FIG. 5 is a chart that shows the relationship between carburetor throttle angle at the engine and the throttle valve pressure at the transmission.

In FIG. 6 I have illustrated the relationship between circuit pressure and throttle pressure during the reverse drive mode, during operation in first and second ratios, neutral and park modes and during operation in the third and fourth ratios. During operation in reverse, the reverse line pressure is effective on the main oil pressure booster valve 272 to augment the circuit pressure as explained with reference to FIG. 12. During operation in the third and fourth ratios, the 2-3 shift valve 234, upon moving, causes a cutback without the necessity for providing an additional cutback valve as in some conventional control circuits such as those illustrated in the reference citations mentioned in the beginning of this specification. The sharp rise in the curves of FIG. 6 beginning at a point corresponding approximately to 25 psi on the abscissa is due to the fact that the throttle pressure developed by the throttle valve system is not made available to the circuit until after the engine throttle advances to the preselected minimum travel condition which is described with reference to FIGS. 13A, 13B and 13C. That TV characteristic is shown, as mentioned earlier, in FIG. 5 where throttle pressure is plotted against plunger travel.

Figure 29:
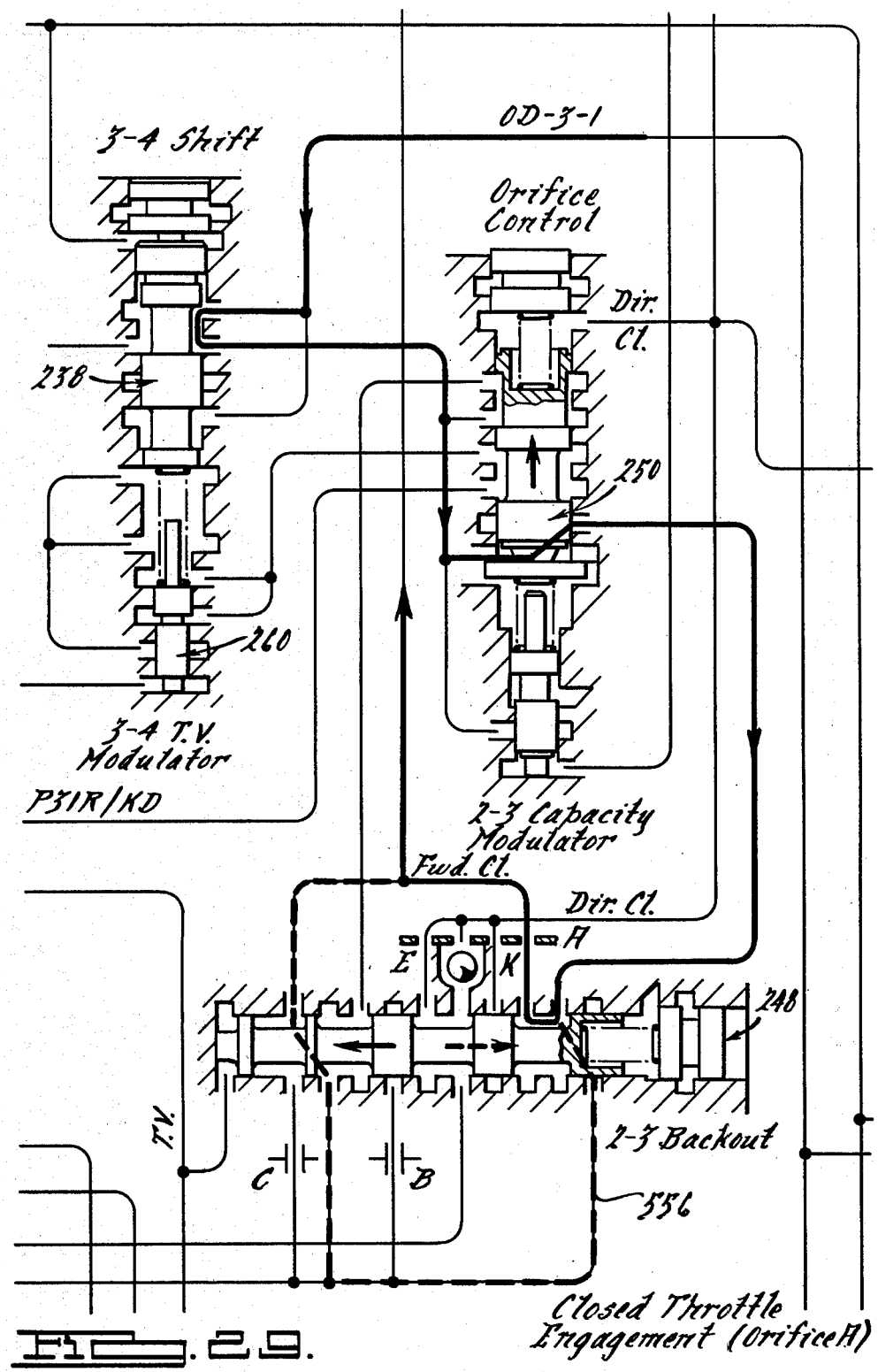
FIG. 29 is a partial view of the valve system showing the 2-3 capacity modulator valve and the orifice control valve during closed throttle engagement of the direct drive clutch, as well as during closed throttle clutch engagement under torque.
Figure 30:
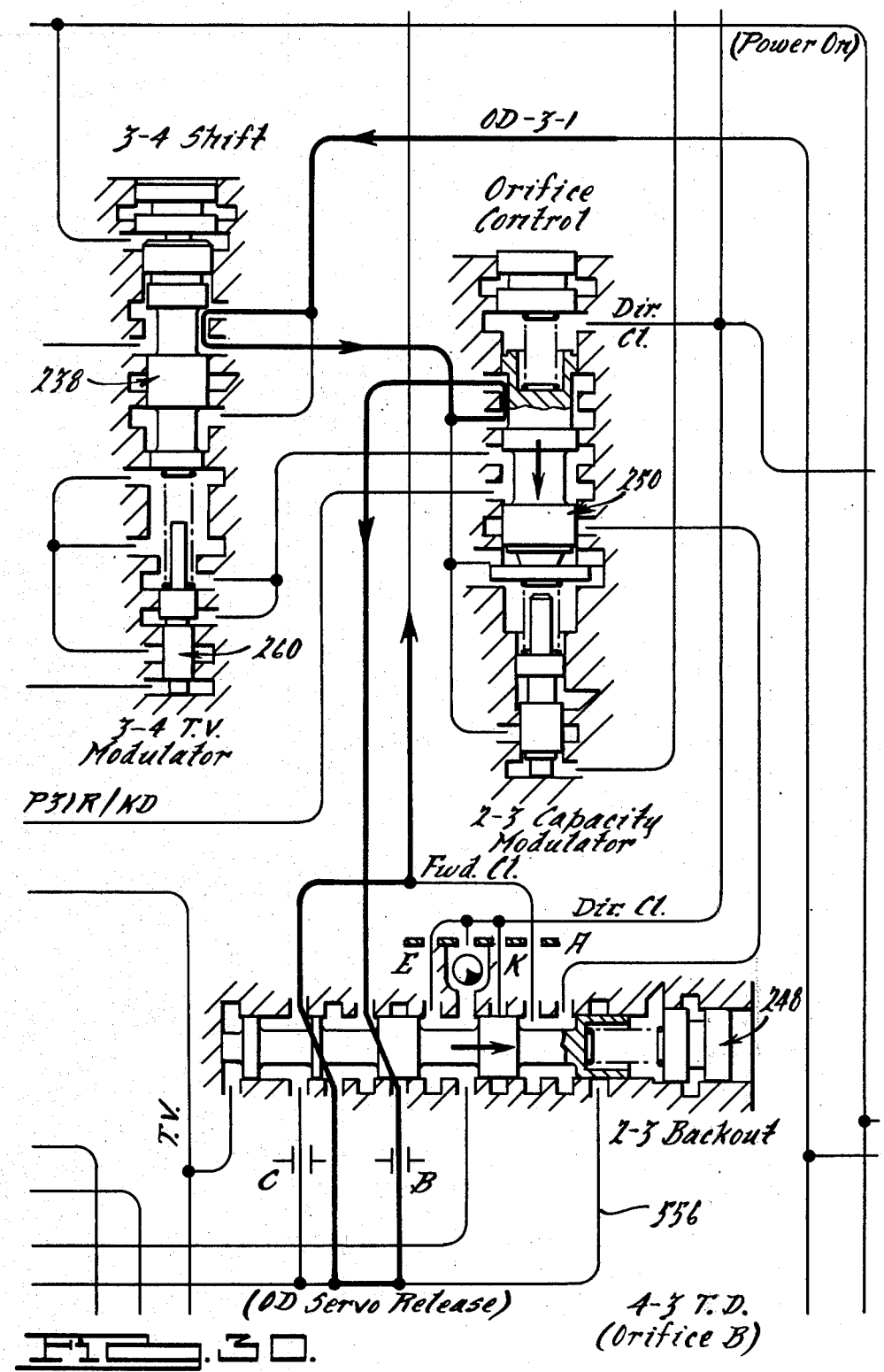
FIG. 30 is a view similar to FIG. 29 showing the valve positions during a 4-3 torque demand downshift.

The operation of the orifice control valve 250, which has been described previously, can be understood more clearly if reference is made to FIGS. 29, 30 and 31. During idle engagement of the front clutch, the flow path through the orifice control path is shown in FIG. 29 by the arrows. Pressure passes through the downshifted 3-4 shift valve 238 to the lower end of the orifice control valve 250 and hence to the 2-3 backout valve 244 and orifice A to the forward clutch 110. Throttle pressure during such closed throttle engagement is removed from the 2-3 backout valve 248 and that valve shifts in a left-hand direction as indicated in FIG. 29. The dotted lines and the dotted arrow in FIG. 29 show the flow path and the valve position during advanced throttle engagement when the throttle pressure is sufficient to shift the 2-3 backout valve 248 in a right-hand position.

During a 4-3 torque demand downshift, the orifice control valve 250 functions as shown in FIG. 30. It moves in a downward direction under the force of the orifice control valve spring. Line pressure feed flow thru passes through the downshifted 3-4 shift valve 238 and through the space between the upper valve lands on the orifice control valve 250 and through the 2-3 backout valve 248 and orifice B to the overdrive servo release pressure passage 332 and to the forward clutch 110. The 2-3 backout valve 248 is shifted in a right-hand direction because of the presence of throttle pressure on the left-hand end under a driving condition with torque applied.

Orifice C in the 2-3 backout valve 250 functions as shown in FIG. 31. This is the condition that exists during a coasting downshift from overdrive to the third ratio. The feed passage extends through the 3-4 shift valve 238 and through the orifice control valve 250, which is shifted downward in FIG. 31, and hence through the 2-3 backout valve 248 and orifice C to the forward clutch 110. The overdrive servo release circuit is fed before the flow passes through the orifice C (see FIG. 29) so that the servo releases quickly.

Engagement of the forward clutch 110 with advanced engine throttle occurs as previously explained. Under those conditions the 2-3 backout valve 248 is shifted in a right-hand direction and pressure is distributed through the 2-3 backout valve 248, as described with reference to FIG. 22. The feed passage in that case is the passage 556 as shown in FIG. 22. Orifice A is bypassed.

FIG. 28 is a chart that shows the functions of the various orifices A, B, C, E and K for the 2-3 backout valve 248. Orifice K is effective as explained with reference to FIG. 17 during a 2-3 upshift. As pressure is distributed from passage 528 through the 2-3 backout valve 248 to the feed passage 530 for the direct clutch 192. Passage 530 communicates with the lower end of the 2-3 accumulator 252. Thus the accumulator 252 is capable of two functions; namely, it cushions direct clutch application on an automatic 2-3 upshift and also cushions the front clutch application during the initiation of the shift sequence. It cushions the direct clutch application since the lower side of the accumulator piston communicates with the passage 530 as indicated in FIG. 17. This creates a pressure on the upper side of the piston that is in excess of the magnitude of the pressure on the lower side of the piston. The pressure on the upper side of the piston is regulated by the 2-3 capacity modulator valve 558 which comprises a valve spool having valve lands 560 and 562 that are urged in a downward direction by valve springs as indicated. The regulated pressure on the upper side of the accumulator piston is transmitted through passage 564, as shown in FIG. 17, to the lower side of the land 560 thereby allowing pressure regulation to occur as fluid flows out of the upper end of the 2-3 accumulation 252. When the accumulator piston reaches the end of its travel, there no longer is any flow, and direct clutch apply pressure rises to its full value.

Having described the invention, what we claim and desire to secure by U.S. Letters Patent is:

1. A power transmission mechanism comprising a hydrokinetic torque converter having a bladed turbine and a bladed impeller, a driven member, a driving member connected to said impeller, a planetary gear unit comprising a first sun gear and a second sun gear, the diameter of said first sun gear being larger than the diameter of said second sun gear, a ring gear connected to said driven member, a planet gear comprising a set of first planet pinions engaging said first sun gear and said ring gear, a set of second planet pinions engaging said second sun gear and said first planet pinions, a carrier rotatably supporting said pinions, first clutch means for connecting said turbine to said second sun gear to establish a forward drive, second clutch means for connecting said turbine to said first sun gear to establish reverse drive, third clutch means for connecting said driving member to said carrier, first brake means for anchoring said carrier to establish a torque reaction point during low speed ratio operation, second brake means for anchoring said first sun gear to establish a torque reaction point during second speed ratio operation, said second brake means including a friction brake and an overrunning brake in series relationship, third brake means for anchoring said first sun gear to establish a torque reaction point during overdrive operation, separate fluid pressure operated servos for actuating each of said clutch means and said brake means, a fluid pump, a valve circuit connecting said pump and said servos to actuate and release the servos during ratio changes, said third brake means comprising a double acting piston and a pressure cylinder, said piston and cylinder defining opposed release and apply pressure chambers, shift valve means for controlling pressure distribution to said third brake means to establish ratio changes between third speed ratio and overdrive ratio, overdrive servo regulator valve means between said shift valve means and said apply pressure chamber for modifying the actuating pressure for said third brake means to effect a smooth ratio transition between said overdrive and third ratios, said overrunning brake accommodating overrunning motion of said first sun gear as said third clutch means becomes applied, said circuit including a shuttle valve located between said apply chamber and said shift valve means and in communication with a high pressure part of said circuit, said shift valve means being adapted to distribute actuating pressure to said shuttle valve when it assumes an upshift condition, whereby said shuttle valve connects said high pressure part to said apply chamber.

2. The combination as set forth in claim 1 wherein said circuit includes an overdrive accumulator comprising a movable accumulator piston that is normally stroked in one direction prior to movement of said shift valve means to an overdrive position, said accumulator having a pressure chamber on one side of said piston in communication with said apply chamber whereby application of said third brake means is cushioned as said accumulator piston is stroked in the opposite direction.

3. A power transmission mechanism comprising a hydrokinetic torque converter having a bladed turbine and a bladed impeller, a driven member, a driving member connected to said impeller, a planetary gear unit comprising a first sun gear and a second sun gear, the diameter of said first sun gear being larger than the diameter of said second sun gear, a ring gear connected to said driven member, a planet gear comprising a set of first planet pinions engaging said first sun gear and said ring gear, a set of second planet pinions engaging said second sun gear and said first planet pinions, a carrier rotatably supporting said pinions, first clutch means for connecting said turbine to said second sun gear to establish a forward drive, second clutch means for connecting said turbine to said first sun gear to establish reverse drive, third clutch means for connecting said driving member to said carrier, first brake means for anchoring said carrier to establish a torque reaction point during low speed ratio operation, second brake means for anchoring said first sun gear to establish a torque reaction point during second speed ratio operation, said second brake means including a friction brake and an overrunning brake in series relationship, third brake means for anchoring said first sun gear to establish a torque reaction point during overdrive operation, separate fluid pressure operated servos for actuating each of said clutch means and said brake means, a fluid pump, a valve circuit connecting said pump said servos to actuate and release the servos during ratio changes, said third brake means comprising a double acting piston and a pressure cylinder, said piston and cylinder defining opposed release and apply pressure chambers, shift valve means for controlling pressure distribution to said third brake means to establish ratio changes between third speed ratio and overdrive ratio, overdrive servo regulator valve means between said shift valve means and said apply pressure chamber for modifying the actuating pressure for said third brake means to effect a smooth ratio transition between said overdrive and third ratios, said overrunning brake accommodating overrunning motion of said first sun gear as said third clutch means becomes applied, said circuit including an upshift pressure control backout valve between said release chamber and said shift valve means, and valve means for distributing selectively to said backout valve a signal pressure whereby it is activated and deactivated depending upon the presence of said signal pressure.

4. The combination as set forth in claim 1 wherein said circuit includes an upshift pressure control backout valve between said release chamber and said shift valve means, and valve means for distributing selectively to said backout valve a signal pressure whereby it is activated and deactivated depending upon the presence of said signal pressure.

5. The combination as set forth in claim 2 wherein said circuit includes an upshift pressure control backout valve between said release chamber and said shift valve means, and valve means for distributing selectively to said backout valve a signal pressure whereby it is activated and deactivated depending upon the presence of said signal pressure.

6. The combination as set forth in claim 3 wherein said circuit includes a throttle valve means for developing said signal pressure, the latter being dependent upon and related to the magnitude of the torque applied to said driving member, the output side of said throttle valve means being in communication with said upshift pressure control backout valve whereby the latter is shifted to an inactive position when driving torque is applied to said driving member and is shifted to a pressure regulating condition when said driving torque is decreased.

7. The combination as set forth in claim 4 wherein said circuit includes a throttle valve means for developing said signal pressure, the latter being dependent upon and related to the magnitude of the torque applied to said driving member, the output side of said throttle valve means being in communication with said upshift pressure control backout valve whereby the latter is shifted to an inactive position when driving torque is applied to said driving member and is shifted to a pressure regulating condition when said driving torque is decreased.

8. The combination as set forth in claim 5 wherein said circuit includes a throttle valve means for developing said signal pressure, the latter being dependent upon and related to the magnitude of the torque applied to said driving member, the output side of said throttle valve means being in communication with said upshift pressure control backout valve whereby the latter is shifted to an inactive position when driving torque is applied to said driving member and is shifted to a pressure regulating condition when said driving torque is decreased.

9. In a hydraulic control valve circuit for a power transmission mechanism having multiple ratio gearing and fluid pressure operated clutches and brakes for establishing and disestablishing each of the multiple ratios, a line pressure source, a main regulator valve means for maintaining a desired line pressure level for the pressure supplied by said source to said circuit, shift valve means for controlling distribution of pressure to said clutches and brakes, a throttle valve means for developing a throttle pressure comprising a line pressure regulating valve portion and a throttle plunger portion, said plunger portion being adapted to be connected to the engine throttle control for an engine, a spring located between said plunger portion and said regulating valve portion, a differential pressure area on said regulating valve portion, a feedback pressure port communicating with the output side of said regulating valve portion and adapted to distribute throttle pressure to said differential area, a throttle pressure passage communicating with said throttle valve means and adapted to distribute throttle pressure to said circuit to effect movement of said shift valve means, a low pressure port communicating with said feedback pressure port, said plunger having a valve land adapted to interrupt communication between said low pressure port and said feedback pressure port and to establish communication between said feedback pressure port and said throttle pressure passage upon movement of said plunger a predetermined distance corresponding to a partial engine throttle advance.

10. In a multiple torque ratio power transmission mechanism for a vehicle having a throttle controlled engine, a hydraulic control valve circuit having fluid pressure operated clutches and brakes for effecting torque ratio changes, said circuit comprising throttle valve means for developing a throttle pressure that is related to engine throttle movement, said circuit including throttle pressure sensitive valve elements, said throttle valve means including movable portions connected to said engine throttle for interrupting distribution of throttle pressure to said pressure sensitive portions during movement of said engine throttle at minimum throttle settings, said circuit including a throttle pressure passage extending to said pressure sensitive valve elements and said throttle valve means includes an exhaust port that communicates with said throttle pressure passage during initial movement of said engine throttle, said throttle valve means establishing communication between the output side of said throttle valve means and said exhaust port during such initial throttle movement and establishing communication between the output side of said throttle valve means and said throttle pressure passage during movement of said throttle valve means beyond an initial setting of said engine throttle.

11. In a multiple torque ratio power transmission mechanism for a vehicle having a throttle controlled engine, said mechanism having relatively movable gear elements connecting a driving member and a driven member, clutches and brakes for controlling the relative motion of said gear elements, a fluid pressure operated servo for actuating each clutch and brake, a pressure source, valve circuit means for controlling distribution of pressure from said source to said clutches and brakes, a first and a second of said clutches being adapted when engaged to connect together two of said gear elements to effect direct drive therethrough, said second of said clutches being adapted to connect a torque input gear element to said driving member, a first pressure feed passage for said first clutch, a second feed passage for said second clutch, a pressure accumulator, and one-way check valve means in said feed passages for connecting the accumulator in parallel disposition with respect to said first and second clutches whereby said accumulator cushions engagement of said first and second clutches when they are selectively applied, said accumulator comprising an accumulator piston, accumulator chambers of differential effective pressure area on opposed sides of said piston, spring means for biasing said accumulator piston toward the smaller chamber, said piston being stroked against the force of said spring when said second clutch is applied as clutch pressure for said second clutch is distributed to said smaller chamber and being stroked against the pressure in said smaller chamber as clutch pressure for said first clutch is distributed to the larger accumulator chamber.

12. The combination as set forth in claim 11 wherein said one-way check valve means prevents transfer of the full pressure in said smaller accumulator chamber to said second clutch as said first clutch becomes applied and a pressure capacity modulator valve means in communication with said smaller accumulator chamber for regulating the pressure in said smaller chamber during stroking of said accumulator upon application of said first clutch.

13. The combination set forth in claim 12 wherein said pressure capacity modulator valve comprises a valve spool, a valve spring biasing said spool in one direction, one end of said spool communicating with the smaller accumulator chamber, and a feedback pressure port registering with said valve spool whereby the pressure in the smaller accumulator chamber is maintained at a value greater than the pressure in said second clutch as said accumulator piston is stroked toward the smaller accumulator chamber.

14. The combination as set forth in claim 9 wherein said throttle valve means comprises a port connecting the regulated output pressure side of said regulating valve portion and one side of said plunger thereby establishing a hydraulic force assist that opposes the force of said spring.

15. In a multiple torque ratio power transmission mechanism for a vehicle having a throttle controlled engine, a hydraulic control valve circuit having fluid pressure operated clutches and brakes for effecting torque ratio changes, said circuit comprising throttle valve means for developing a throttle pressure that is related to engine throttle movement, said circuit including throttle pressure sensitive valve elements, said throttle valve means including movable portions connected to said engine throttle for interrupting distribution of throttle pressure to said pressure sensitive portions during movement of said engine throttle at minimum throttle settings said throttle valve means including a pressure area on said movable portion that is in communication with the regulated output pressure side of said throttle valve means to provide a force assist that reduces the force necessary to actuate said movable portion.

16. The combination as set forth in claim 10 wherein a movable part of said throttle valve means is connected to said engine throttle and includes a pressure area in fluid communication with the regulated pressure output side of said throttle valve means to provide a hydraulic force assist to activate said throttle valve means.

17. The combination as set forth in claim 14 wherein said throttle valve means includes a preload spring on said plunger that normally urges said plunger in a direction that tends to oppose the force of said spring, said preload spring and said force assist being sufficient to cause regulated throttle valve output pressure to rise to a high value if the connection between the engine throttle and said throttle valve means is disabled.

18. The combination as set forth in claim 15 wherein said throttle valve means includes a preload spring on said movable portion that urges it toward a maximum regulated pressure position if the connection between said engine throttle and said movable portion is disabled.

19. The combination as set forth in claim 16 wherein said throttle valve means includes a preload spring on said movable parts that urges it toward a maximum regulated pressure position if the connection between said engine throttle and said movable part is disabled.

20. In a multiple torque ratio power transmission mechanism having gear elements that establish plural torque delivery paths from a driving member to a driven member, fluid pressure operated clutches and brakes for controlling the relative motion of said gear elements to effect torque changes including an intermediate speed ratio brake and a direct drive clutch, a control circuit including a pressure source, regulator valve means for establishing a regulated pressure from said source, a first feed passage means extending to said intermediate speed ratio brake for pressurizing the same, a second feed passage means extending to said direct drive clutch for pressurizing the same, a direct drive shift valve means in said second feed passage for selectively distributing pressure to said direct drive clutch, separate calibrated flow control orifices in parallel branch positions of said second feed passage, a direct-to-intermediate ratio backout valve means including a shifted valve element for alternately blocking one orifice and opening the other as said shiftable valve element is moved from one position to another whereby the rate of engagement of said direct drive clutch can be controlled, a source of a throttle pressure signal that is related to the torque delivered to said driving member, and means for delivering said pressure signal to said shiftable valve element whereby the larger orifice is effective during engagement of said direct clutch under torque.

21. The combination as set forth in claim 20 wherein said shiftable valve element is spring biased in one direction to cause the smaller orifice to be effective and is moved by throttle pressure in the opposite direction by said pressure signal to cause the larger orifice to be effective thus making possible a faster rate of engagement of said direct drive clutch during an upshift to direct drive from the intermediate ratio.

22. The combination as set forth in claim 20 wherein said intermediate brake includes a friction brake and an overrunning brake arranged in series relationship, said gear elements including a reaction member adapted to be anchored by said overrunning brake and said friction brake when said direct clutch is disengaged, said reaction member overrunning stationary portions of said mechanisms when said direct clutch is applied.

23. The combination as set forth in claim 21 wherein said intermediate brake includes a friction brake and an overrunning brake arranged in series relationship, said gear elements including a reaction member adapted to be anchored by said overrunning brake and said friction brake when said direct clutch is disengaged, said reaction member overrunning stationary portions of said mechanisms when said direct clutch is applied.

24. In a power transmission mechanism having gear elements including a ring gear, sun gear, planet pinion and a carrier for said planetary pinion, said gear elements defining plural torque delivery paths from a driving member to a driven member to effect multiple torque ratios including an overdrive ratio and a direct drive ratio, clutches and brakes including a forward drive clutch means and an overdrive brake means for controlling the relative motion of said gear elements and an overdrive clutch means for delivering input torque to said carrier as an overdrive reaction gear element is braked by said overdrive brake means, said forward drive clutch means and said overdrive clutch means when applied connecting said gear elements together for rotation in unison, a valve control circuit for controlling engagement and release of said clutches and brakes including a pressure source and an overdrive and direct shift valve means for controlling application and release of said forward drive clutch means as said overdrive brake is released and applied, respectively, a feed passage for said forward drive clutch means communicating with said shift valve means whereby said shift valve means controls application of said forward drive clutch means, a pair of flow control orifices of different size in said feed passages and orifice control valve means including a 2-3 backout valve for directing fluid through the larger orifice during ratio shifts under torque from said overdrive ratio to said direct drive ratio and through the smaller orifice during a corresponding ratio shift with reduced torque, a source of a torque dependent throttle pressure and means for subjecting portions of said orifice control valve means to said throttle pressure to actuate the same.

25. The combination as set forth in claim 24 wherein said overdrive brake has a double acting brake servo with a piston that defines in part a servo release pressure chamber and a servo apply pressure chamber, said overdrive servo being released when both pressure chambers are pressurized, said shift valve means providing an exhaust flow path for said release chamber when it is shifted to the overdrive ratio position.

26. The combination as set forth in claim 24 wherein said forward drive clutch means is adapted to connect the driving member of said mechanism to a torque input gear element during forward drive operation, a feed passage for said forward drive clutch means, parallel portions of said forward drive clutch means feed passage communicating with said orifice control valve means, one parallel portion providing a greater flow restriction than the other, said orifice control valve means being in communication with said throttle pressure source and responding to throttle pressure to actuate said orifice control valve means to a position causing fluid to be distributed to said forward drive clutch through the reduced flow restriction passage portion, a reduction in throttle pressure below a calibrated low value causing said orifice control valve means to be conditioned for distribution of fluid to said forward drive clutch through the higher flow restriction passage portion.

27. In a power transmission mechanism having gear elements that define multiple torque delivery paths between a driving member and a driven member, an overdrive brake servo means for anchoring an overdrive reaction gear element, a forward drive clutch means and an overdrive clutch means for connecting two gear elements together for rotation in unison, said overdrive brake servo means and said overdrive clutch means when applied establishing overdrive operation, said brake servo means comprising a double acting piston, a servo cylinder enclosing said piston, said cylinder defining release and apply pressure chambers on opposed sides of said piston, a control pressure source, a valve circuit means for controlling distribution of pressure from said source to said brake servo means and to said clutch means, separate pressure feed passages extending to said release and apply chambers, a servo pressure regulator valve means for the feed passage extending to said apply chamber for maintaining a modified pressure therein to effect a smooth overdrive brake application and release, pressure distributor valve means including an overdrive shift valve for controlling exhaust of pressure from said release chamber to effect application of said brake servo means, a direct drive shift valve means for distributing pressure from said pressure source to said forward clutch, and an overdrive shuttle valve means in communication with said servo regulator valve means and the direct drive clutch means and responsive to the pressure in said direct drive clutch means to distribute said modified pressure to said apply chamber.

28. The combination as set forth in claim 27 wherein said shuttle valve means includes means for biasing the same against the force of the pressure in said forward drive clutch means, said shuttle valve means responding to a loss of pressure in said forward drive clutch to distribute pressure to said servo pressure regulator valve means to cause the same to allow full control pressure to be applied to said brake servo means apply chamber.

29. The combination as set forth in claim 27 wherein said valve circuit includes a pressure accumulator having a movable piston in an accumulator chamber, said accumulator chamber being in fluid communication with said brake servo means apply chamber to cushion application of said brake servo means, said accumulator piston being stroked as pressure increases in said apply chamber.

30. The combination as set forth in claim 28 wherein said valve circuit includes a pressure accumulator having a movable piston in an accumulator chamber, said accumulator chamber being in fluid communication with said brake servo means apply chamber to cushion application of said brake servo means, said accumulator piston being stroked as pressure increases in said apply chamber.

31. The combination as set forth in claim 29 wherein said accumulator chamber communicates with said shuttle valve means whereby control pressure is distributed through said shuttle valve means to said accumulator when said brake servo means becomes applied.

32. The combination as set forth in claim 29 wherein said accumulator is in communication with a high pressure portion of said vlave circuit means whereby said movable piston is stroked normally to decrease the volume of said accumulator chamber.

33. The combination as set forth in claim 30 wherein said accumulator is in communication with a high pressure portion of said valve circuit means whereby said movable piston is stroked normally to decrease the volume of said accumulator chamber.

34. The combination as set forth in claim 10 wherein said circuit including a main pressure regulator valve, a throttle pressure limit valve means communicating with said throttle valve means and said regulator valve for distributing throttle pressure to said regulator valve to increase the regulated pressure in said valve circuit upon an increase in engine throttle setting and for limiting the magnitude of the pressure distribution to said regulator valve from said throttle valve means thereby preventing an excessive circuit pressure at advanced engine throttle settings.

35. In a power transmission mechanism having gear elements that establish plural torque delivery paths of various torque ratios, clutches and brakes for controlling the relative motion of said gear elements to effect ratio changes, fluid pressure operated servo means for selectively activating said clutches and brakes, control circuit means for controlling the operation of said servos including a control pressure source, a main regulator valve means for establishing a regulated control pressure level in said circuit, first shift valve means for distributing regulated control pressure to one clutch to establish a first torque ratio in said mechanism, second shift valve means for distributing regulated control pressure to another clutch to establish a second torque ratio in said mechanism, said main regulator valve means being in fluid communication with said second shift valve means whereby distribution of regulated control pressure through said second shift valve means to said main regulator valve means affects the regulated pressure level in said circuit whereby a decrease in the regulated pressure level occurs upon a shift of said second shift valve means to its higher speed ratio position.

36. In a power transmission mechanism having gear elements that establish plural torque delivery paths of various torque ratios, clutches and brakes for controlling the relative motion of said gear elements to effect the various ratios, fluid pressure operated servo means for selectively activating said clutches and brakes, a control circuit means for controlling the operation of said servos including a control pressure source, a main regulator valve means for establishing a regulated control pressure level in said circuit, a shift valve means for distributing regulated control pressure to one servo to establish a torque ratio shift from a higher to a lower torque ratio, a feed passage structure extending from said shift valve means to said one servo, an accumulator in said circuit means comprising a piston and an accumulator chamber, means for urging said piston normally in a direction to decrease the volume of said accumulator chamber, a capacity modulator valve means in said passage structure for modulating the pressure delivered to said one servo as said one servo is applied, and a control orifice in said passage structure, one side of said orifice communicating with said accumulator chamber and the other side communicating with said one servo, said capacity modulator valve means also communicating with the one side of said orifice whereby the modulated output pressure of said capacity modulator valve that is applied to said one servo rises progressively as the accumulator piston is stroked, termination of the stroke of said piston resulting in application of full regulated control pressure to said one servo.

* * * * *

UNITED STATES PATENT AND TRADEMARK OFFICE
CERTIFICATE OF CORRECTION

PATENT NO. : 4,347,765
DATED : September 7, 1982
INVENTOR(S) : Allan S. Leonard et al It is certified that error appears in the above-identified patent and that said Letters Patent are hereby corrected as shown below:

In the ABSTRACT, line 6, after "ratio" insert -- and --.

Signed and Sealed this

Twenty-second Day of February 1983

[SEAL]

Attest:

GERALD J. MOSSINGHOFF

*Attesting Officer*     *Commissioner of Patents and Trademarks*